United States Patent
Machida et al.

[11] Patent Number: 6,060,756
[45] Date of Patent: May 9, 2000

[54] SURFACE SHAPE RECOGNITION SENSOR AND METHOD OF FABRICATING THE SAME

[75] Inventors: Katsuyuki Machida; Satoshi Shigematsu; Hiroki Morimura, all of Tokyo; Akihiko Hirata, Toko, all of Japan

[73] Assignee: Nippon Telegraph and Telephone Corporation, Tokyo, Japan

[21] Appl. No.: 09/263,678

[22] Filed: Mar. 5, 1999

[30] Foreign Application Priority Data

| Mar. 5, 1998 | [JP] | Japan | 10-053911 |
| May 18, 1998 | [JP] | Japan | 10-135036 |
| Jan. 6, 1999 | [JP] | Japan | 11-001170 |

[51] Int. Cl.[7] .................... H01L 29/82; H01L 31/0232; H01L 31/0203
[52] U.S. Cl. .................... 257/415; 257/414; 257/432; 257/434; 257/448; 257/459; 257/534; 382/124; 382/312
[58] Field of Search .................... 257/432, 434, 257/448, 459, 534, 415, 414; 382/124, 312

[56] References Cited

U.S. PATENT DOCUMENTS

| 5,757,278 | 5/1998 | Itsumi | 340/825.31 |
| 5,963,679 | 10/1999 | Setlak | 382/312 |
| 5,973,623 | 10/1999 | Gupta et al. | 341/33 |
| 5,991,467 | 11/1999 | Kamiko | 382/312 |
| 6,002,786 | 12/1999 | Hallibert et al. | 382/124 |
| 6,011,859 | 1/2000 | Kalnitsky et al. | 382/124 |

FOREIGN PATENT DOCUMENTS

| 3-266186 | 11/1991 | Japan . |
| 9-251530 | 9/1997 | Japan . |

OTHER PUBLICATIONS

FP12.3: A 390dpi Live Fingerprint Imager Based on Feedback Capacitive Sensing Scheme (P200–P201, P154–P155, P456), 1997 IEEE International Solid–State Circuits Conference.

Novel Fingerprint Scanning Arrays Using Polysilicon TFT's on Glass and Polymer Susbtrates, Electron Device Letters, vol 18, No 1, Jan. 1997.

*Primary Examiner*—Ngân V. Ngô
*Attorney, Agent, or Firm*—Blakely Sokoloff Taylor & Zafman

[57] ABSTRACT

A surface shape recognition sensor of this invention includes at least a plurality of capacitance detection elements having sensor electrodes arranged in the same plane on an interlevel dielectric film formed on a semiconductor substrate to be insulated/isolated from each other, capacitance detection means for detecting the capacitances of the capacitance detection elements, and a stationary electrode disposed on the interlevel dielectric film to be insulated/isolated from the sensor electrodes. When an object to be recognized touches the upper surface of the stationary electrode, the capacitances detected by the capacitance detection elements change in accordance with the recesses/projections on the upper surface.

28 Claims, 24 Drawing Sheets

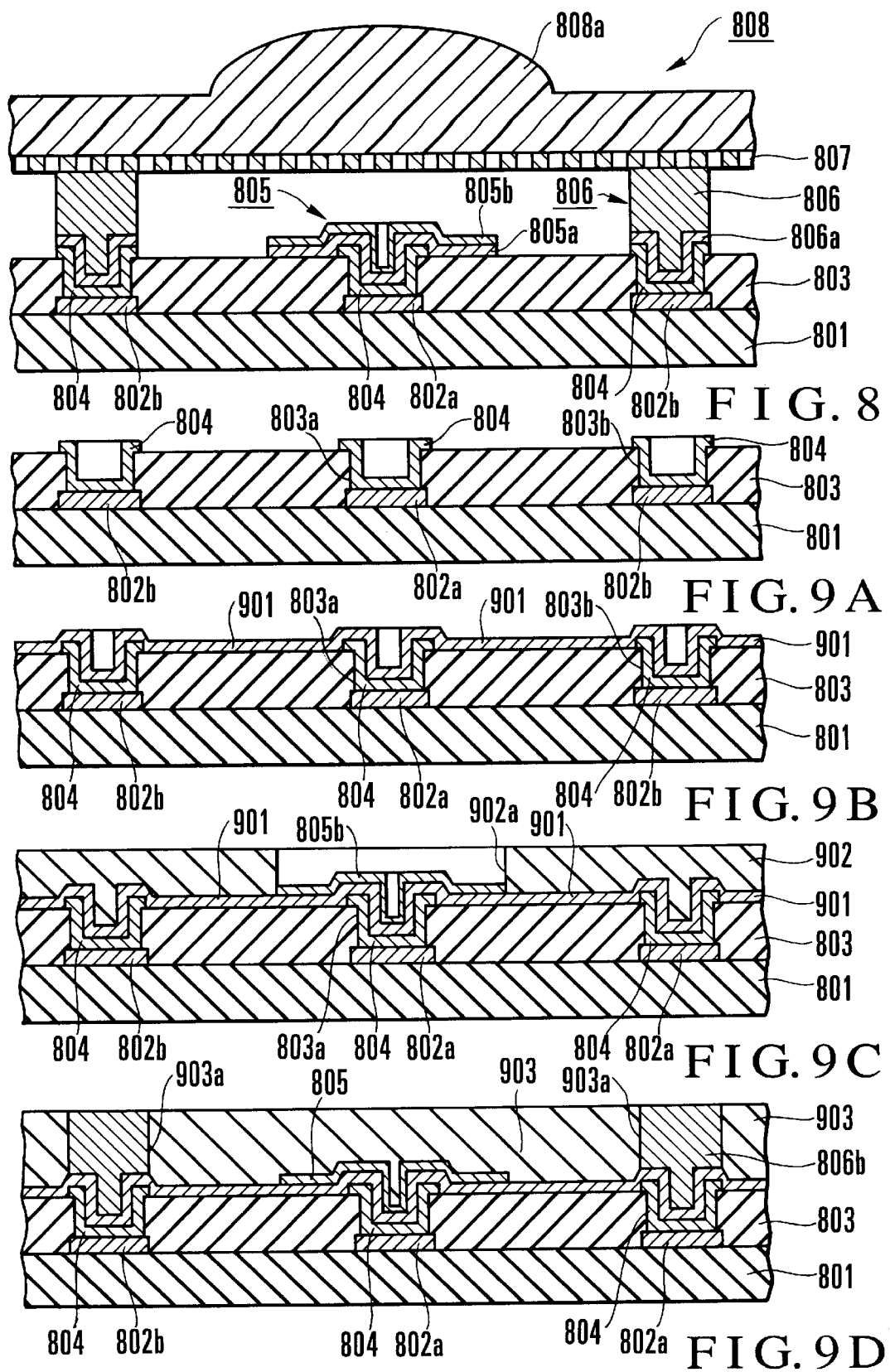

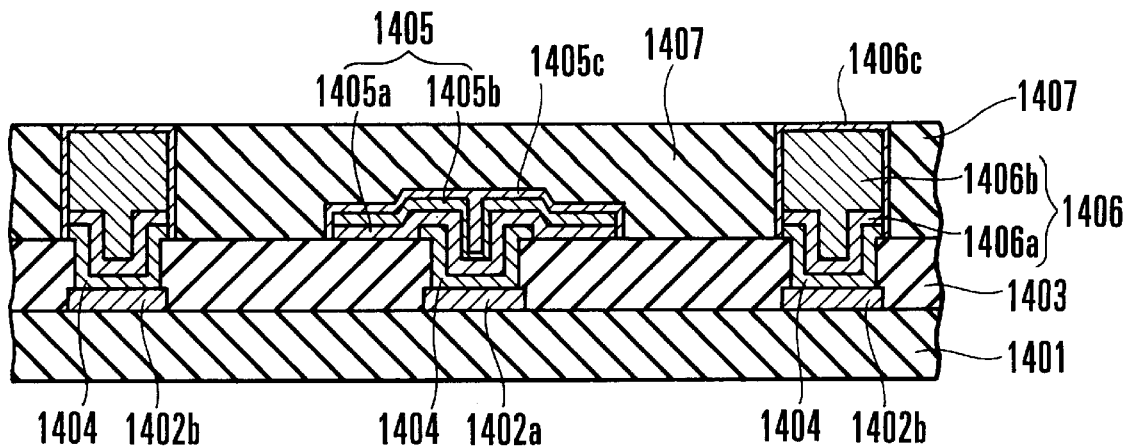
F I G. 14
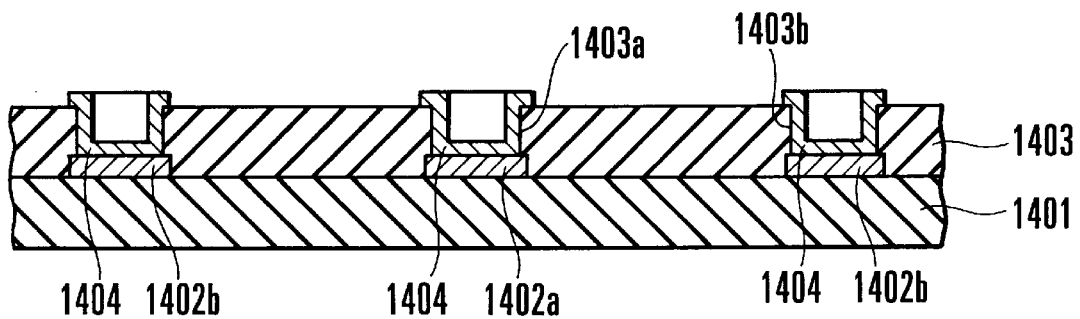
F I G. 15 A
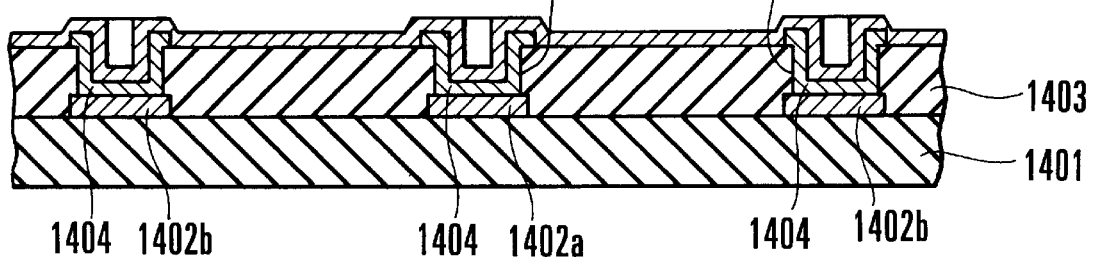
F I G. 15 B
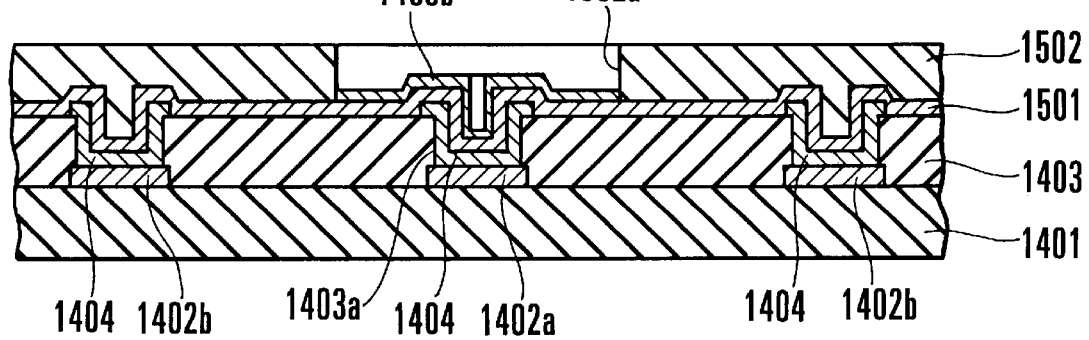
F I G. 15 C

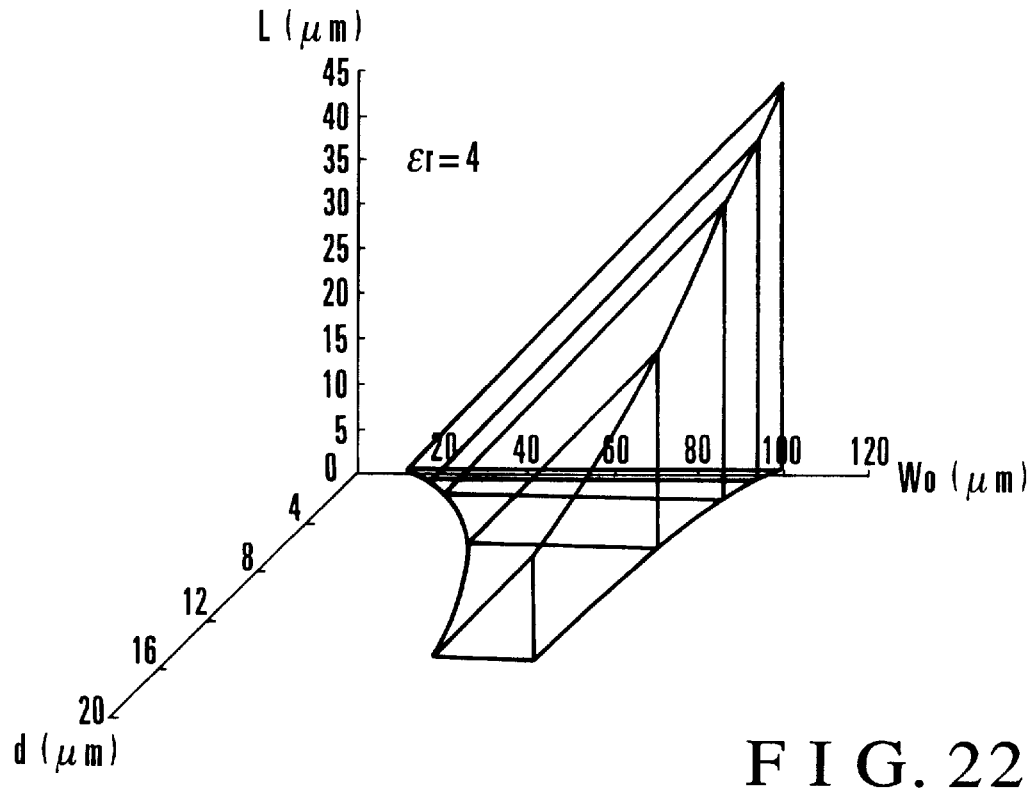
F I G. 22
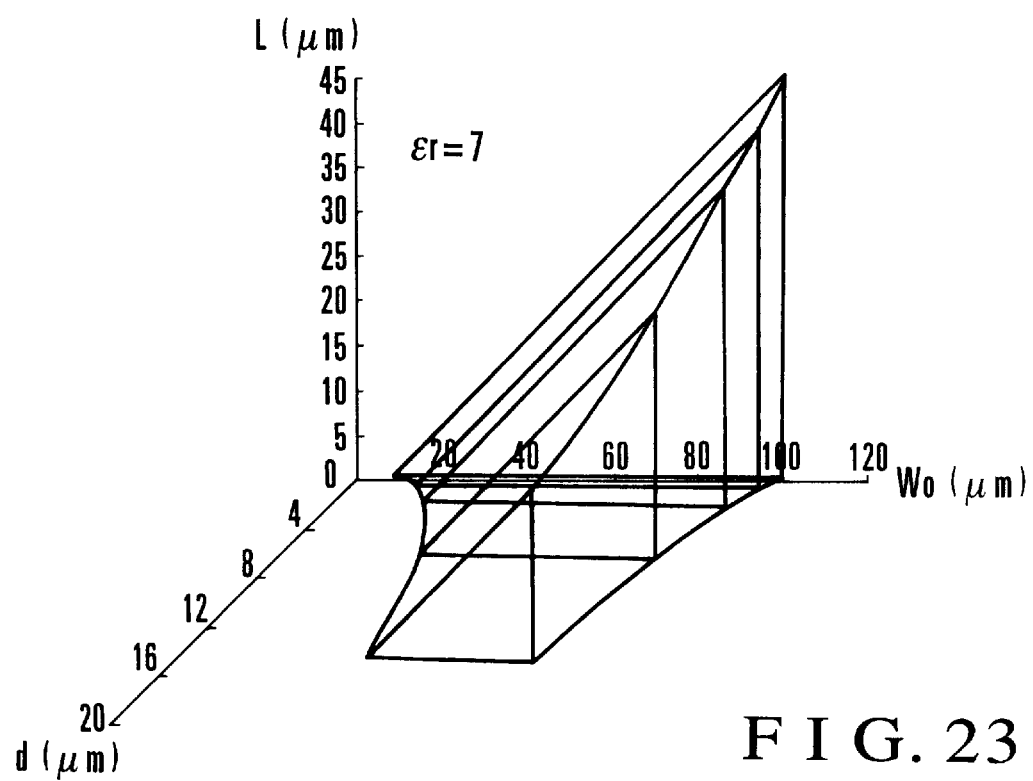
F I G. 23

— 6,060,756 —

SURFACE SHAPE RECOGNITION SENSOR AND METHOD OF FABRICATING THE SAME

BACKGROUND OF THE INVENTION

The present invention relates to a surface shape recognition sensor and a method of fabricating the same and, more particularly, to a surface shape recognition sensor for detecting fine three-dimensional patterns such as a human fingerprint and an animal noseprint and a method of fabricating the same.

Attention is now focusing on security techniques in the progression of the information-oriented society and environments in the present society. For example, in the information-oriented society, authentication techniques for the construction of an electronic cash system and the like have grown in importance. Recently, research and development have extensively made on authentication techniques for protection against theft and fraudulent use of cards (e.g., Yoshimasa Shimizu et al., "Study on IC Card Having Personal Authentication Function", Technical Report of IEICE, OFS92-32, pp. 25–30 (1992)).

Various authentication schemes for the prevention of fraud use fingerprints, voiceprints, and the like. Various fingerprint authentication techniques have been developed. These fingerprint authentication schemes are roughly classified into optical read schemes and schemes of detecting ridges/valleys on the skin of a finger by converting them into an electrical signal using human electrical characteristics.

An optical read scheme is a scheme of receiving a fingerprint as optical image data by mainly using reflection of light and a CCD image sensor and collating the fingerprint (Japanese Patent Laid-Open No. 61-221883). Another scheme that uses thin piezoelectric film to read the pressure difference between the ridge and valley on the skin of a finger has been developed (Japanese Patent Laid-Open No. 5-61965). As a scheme of detecting a fingerprint pattern by converting changes in electrical characteristics upon contact of the skin of a finger into an electrical signal distribution, an authentication scheme that uses pressure-sensitive sheets and is based on the change amounts of resistance and capacitance has been proposed (Japanese Patent Laid-Open No. 7-168930).

Of the techniques described above, the scheme using light is difficult to realize a compact system and hence is difficult to apply it for the general purpose. That is, the application of this scheme is limited. The scheme of detecting the ridges/valleys on the skin of a finger by using a pressure-sensitive sheet is difficult in practical use and has poor reliability because a special material is required and is difficult to process.

A capacitive fingerprint sensor based on LSI fabricating techniques has been developed (Marco Tartagni and Roberto Guerrieri, A 390 dpi Live Fingerprint Imager Based on Feedback Capacitive Sensing Scheme, 1997 IEEE International Solid-State Circuits Conference, pp. 200–201 (1997)). This is a method of detecting a ridge/valley pattern on the skin of a finger by the feedback capacitive sensing scheme using small sensors two-dimensionally arranged on an LSI chip. This capacitive sensor is designed such that two plates are formed on the uppermost LSI interconnection, and a passivation film is formed on the plates. When the tip of a finger touches this sensor, the surface of the skin serves as a third plate, and is isolated from the sensor through an insulating layer made of air. A fingerprint is detected by performing sensing operation in accordance with differences in distance between the ridges/valleys on the skin and the sensor. This structure allows a reduction in size because no special interface is required, as compared with the conventional optical scheme.

This fingerprint sensor is basically fabricated by forming sensor electrodes on a semiconductor substrate, and forming a passivation film on the sensor electrodes. In a method using this sensor, the capacitance between the skin and the sensor is detected through the passivation film to detect a fine ridge/valley pattern.

A conventional capacitive fingerprint sensor will be briefly described below with reference to FIGS. 24 and 25. This capacitive sensor has an arrangement like the one shown in FIG. 24. First of all, an interconnection 2403 is formed on a semiconductor substrate 2401, on which LSIs and the like are formed, through a lower insulating film 2402. An interlevel dielectric film 2404 is then formed on the interconnection 2403.

For example, sensor electrodes 2406 each having a rectangular planar shape are formed on the interlevel dielectric film 2404. Each sensor electrode 2406 is connected to the interconnection 2403 through a plug 2405 in a through hole formed in the interlevel dielectric film 2404. A passivation film 2407 is formed on the interlevel dielectric film 2404 to cover the sensor electrodes 2406, thereby forming sensor elements. These sensor elements are two-dimensionally arranged such that the sensor electrodes 2406 of the adjacent sensor elements do not come into contact with each other.

The operation of this capacitive sensor will be described. When a fingerprint is to be detected, a finger as a fingerprint detection target object touches the passivation film 2407. When the finger touches the film in this manner, the skin in contact with the passivation film 2407 serves as an electrode on the sensor electrodes 2406. As a result, capacitances are formed between the skin and the sensor electrodes 2406. The capacitances are detected through the interconnections 2403. A fingerprint is formed by the ridges/valleys on the skin of the finger. When, therefore, the finger touches the passivation film 2407, the distances from the skin serving as an electrode and the sensor electrodes 2406 differ in accordance with the ridges/valleys that form a fingerprint. These differences in distance are detected as differences in capacitance. By detecting a distribution of difference capacitances, the ridge pattern on the skin of the finger can be obtained. That is, a fine ridge/valley pattern on the skin can be detected by this capacitive sensor.

Such a capacitive fingerprint sensor can be made compact because no special interface is required, as compared with a conventional optical sensor.

This capacitive sensor can be mounted together with an LSI on the following integrated circuit (LSI) chip. More specifically, the above capacitive sensor can be mounted on an integrated circuit chip together with a storage section storing fingerprint data for collation and a recognition processing section integrated with the storage section to compare/collate fingerprint data prepared in a storage section with a read fingerprint. The formation of such components on one integrated circuit chip makes it difficult to tamper with information in data transfer between units, thus improving the security protection performance.

According to the above sensor, however, since the skin is used as an electrode, an LSI mounted on the substrate together with the sensor is susceptible to damage due to static electricity generated when the skin touches the sensor.

Demands have therefore arisen for a sensor for sensing a fine three-dimensional pattern such as a human fingerprint or animal noseprint and a method of fabricating the same, with consideration given to the stability, sensitivity, reliability, and the like of the sensor, miniaturization, and versatility.

SUMMARY OF THE INVENTION

The present invention has been made to solve the above problem, and has as its object to reliably perform stable, high-sensitivity surface shape detection without causing damage due to static electricity generated in sensing operation.

In order to achieve the above object, according to an aspect of the present invention, there is provided a surface shape recognition sensor comprising a plurality of capacitance detection elements having sensor electrodes stationarily arranged in one plane on an interlevel dielectric film formed on a semiconductor substrate to be insulated/isolated from each other, capacitance detection means for detecting capacitances of the respective capacitance detection elements, and a stationary electrode formed on the interlevel dielectric film to be insulated/isolated from the sensor electrodes.

With this arrangement, when an object to be recognized touches the sensor, the capacitances detected by the capacitance detection elements change in accordance with the recesses/projections on the surface of the object.

According to another aspect of the present invention, in the above arrangement, the sensor further comprises a counter electrode supported on the stationary electrode, disposed opposite the sensor electrodes to be disposed above the sensor electrodes at a predetermined distance therefrom, and having portions, located above the sensor electrodes, which can deform toward the sensor electrodes, and the capacitance detection means detect capacitances between the sensor electrodes and the counter electrode.

When, therefore, an object to be recognized touches the sensor, the counter electrode deforms in conformity to the recesses/projections on the surface of the object, and the capacitances between the sensor electrodes and the counter electrode change in accordance with the recesses/projections on the surface of the object. In this arrangement, the sensor may further comprise a film disposed on the counter electrode and having insulating properties, and the film may have projections at positions above the respective sensor electrodes. In this case, the film may be made of a material having thermoplasticity, e.g., polytetrafluoroethylene.

The sensor electrodes and the stationary electrode may be made of copper or gold. In addition, conductive protective films may be formed to cover the side and upper surfaces of the sensor electrodes and the upper surface of the stationary electrode. For example, the protective films may be made of ruthenium. Furthermore, first and second interconnections connected to the sensor electrodes and the stationary electrode may be formed under the interlevel dielectric film on the semiconductor substrate, and the sensor electrodes and the stationary electrode may be connected to the capacitance detection means through the first and second interconnections. Moreover, the capacitance detection means may be mounted on the semiconductor substrate together with the above elements.

According to still another aspect of the present invention, the sensor further comprises a passivation film made of an insulating member and formed on the interlevel dielectric film to cover the sensor electrodes, the stationary electrode is formed on the interlevel dielectric film to be partly exposed on an upper surface of the passivation film so as to come into contact with a surface of a surface shape recognition target object which is partly in contact with the upper surface of the passivation film and serves as one counter electrode, and the capacitance detection means detect capacitances between the sensor electrodes and the surface of the recognition target object.

With this arrangement, when an object to be recognized touches the sensor, the object serves as one counter electrode. While the object is in contact with the stationary electrode, capacitances are formed between the surface of the object and the sensor electrodes. In this arrangement, the sensor electrodes and the stationary electrode may be made of copper or gold. The passivation film may be made of polyimide. As this polyimide, polybenzaoxazole may be used. In addition, conductive protective films may be formed to cover the side and upper surfaces of the sensor electrodes and the upper surface of the stationary electrode. For example, the protective films may be made of gold or ruthenium. Furthermore, first and second interconnections connected to the sensor electrodes and the stationary electrode may be formed under the interlevel dielectric film on the semiconductor substrate, and the sensor electrodes and the stationary electrode may be connected to the capacitance detection means through the first and second interconnections. Moreover, the capacitance detection means may be mounted on the semiconductor substrate together with the above elements.

According to still another aspect of the present invention, in this arrangement, the stationary electrode has exposed portions formed into a matrix pattern on at least the upper surface of the passivation film, and the sensor electrodes are arranged in central portions of square portions formed by the stationary electrode. Therefore, all the distances between the sensor electrodes and the stationary electrode are made uniform. In this arrangement, if the stationary electrode is formed into a square matrix pattern, each square portion forms the capacitance detection element, and the passivation film has a thickness of 0.3 $\mu$m or more to 20 $\mu$m or less on the sensor electrode, the capacitances between the sensor electrodes and the surface shape recognition target object in contact with the passivation film on the sensor electrodes can be detected. When the state of a human fingerprint is to be detected, the intervals between the square portions of the matrix pattern of the stationary electrode are set to 100 $\mu$m or less. With this arrangement, for example, the relative dielectric constant of the passivation film may fall within the range of 2 to 7. When, for example, a material having a relative dielectric constant of 4 is used for a passivation film, and its thickness above each sensor electrode is set to 2 $\mu$m, each sensor electrode may have a square shape with one side having a length of 20 $\mu$m or more. It is especially preferable that the distance between each sensor electrode and the stationary electrode disposed therearound be 2 $\mu$m.

According to still another aspect of the present invention, the upper surface of the passivation film and exposed surfaces of the stationary electrode are substantially flat. In addition, the sensor further comprises first and second interconnections formed under the interlevel dielectric film on the semiconductor substrate to connect the sensor electrodes to the stationary electrode, and the sensor electrodes and the stationary electrode are connected to the capacitance detection means through the first and second interconnections. In this case, the capacitance detection means may be mounted on the semiconductor substrate together with the above elements.

According to one aspect of the present invention, there is provided a method of fabricating a surface shape recognition sensor, comprising the steps of forming a plurality of capacitance detection elements on a semiconductor substrate on which at least a semiconductor element is formed, and forming protective films on the plurality of capacitance detection elements, wherein each of the capacitance detection elements includes a sensor electrode disposed on the semiconductor substrate and a counter electrode disposed above the sensor electrode, the counter electrode of each of the capacitance detection elements is made of one common electrode member, and the counter electrode is supported by a stationary electrode disposed for each of the capacitance detection elements, the stationary electrode being made of a conductive member.

According to another aspect of the present invention, the method further comprises the steps of forming first and second interconnections through an interlevel dielectric film on the semiconductor substrate, forming connection electrodes on the first and second interconnections, forming a first metal film on a surface on which the connection electrodes are formed and then covering the first metal film with a first resist, forming a sensor electrode by forming an opening portion in the first resist on the first interconnection and continuously forming second and third metal films, forming a stationary electrode having conductivity by forming a second resist after removing the first resist, forming an opening portion in the second resist on the second interconnection, and sequentially forming fourth and fifth metal films in only the opening portion, etching the first metal film by using the third and fifth metal films as masks after removing the second resist, covering a major surface side of the semiconductor substrate with a sacrificial film having a thickness equal to or larger than the stationary electrode, exposing only the fifth metal films by etching the sacrificial film, forming a counter electrode on the sacrificial film to connect the fifth metal films to each other, and covering the counter electrode with a protective film after removing the sacrificial film.

According to still another aspect of the present invention, the method further comprises the steps of forming first and second interconnections through an interlevel dielectric film on the semiconductor substrate, forming connection electrodes on the first and second interconnections, forming a first metal film on a surface on which the connection electrodes are formed and then covering the first metal film with a first resist, forming a sensor electrode by forming an opening portion in the first resist on the first interconnection and continuously forming second and third metal films, covering only a portion above the second interconnection with a second resist after removing the first resist, etching the first metal film by using the third metal film and the second resist as masks, removing the second resist, forming a sacrificial film, and forming an opening portion in a portion above the second interconnection, forming a stationary electrode having conductivity by sequentially forming fourth and fifth metal films, forming a counter electrode on the sacrificial film to connect the fifth films to each other, and covering the counter electrode with a protective film after removing the sacrificial film.

According to still another aspect of the present invention, the method further comprises the steps of forming first and second interconnections through an interlevel dielectric film on the semiconductor substrate, forming connection electrodes on the first and second interconnections, forming a first metal film on a surface on which the connection electrodes are formed and then covering an entire surface of the first metal film with a first resist, forming a sensor electrode by forming an opening portion in the first resist on the first interconnection and continuously forming second and third metal films, forming a stationary electrode having conductivity by forming a second resist after removing the first resist, forming an opening portion in the second resist at a position above the second interconnection, and sequentially forming fourth and fifth metal films in only the opening portion, removing the second resist and etching the first metal film by using the third and fifth metal films as masks, and bonding a counter electrode, formed in advance under a protective film, on the stationary electrode through a conductive adhesive.

In addition, after the first metal film is formed, a new metal film made of the same material as that for the first metal film is formed, and then the third metal film is formed on the new metal film.

According to still another aspect of the present invention, there is provided a method of fabricating a surface shape recognition sensor, comprising the steps of forming first and second interconnections on a semiconductor substrate, forming an interlevel dielectric film on the semiconductor substrate to cover the first and second interconnections, forming a first metal film electrically connected to the first and second interconnections through first and second through holes formed in the interlevel dielectric film, forming a first mask pattern on the first metal film, the first mask pattern having an opening portion in a region above the first through hole, selectively forming a second metal film on an upper surface of the first metal film which is exposed on a bottom portion of the opening portion of the first mask pattern, forming a second mask pattern on the first and second metal films, the second mask pattern having a groove crossing over the second through hole and surrounding the second metal film, selectively forming a third metal film on an upper surface of the first metal film which is exposed on a bottom portion of the groove of the second mask pattern, the third metal film being thicker than the second metal film, forming a sensor electrode and a stationary electrode by removing the first metal film except for portions under the second and third metal films, the sensor electrode being made up of the first and second metal films and connected to the first interconnection through the first through hole, and the stationary electrode being made up of the first and third metal films and connected to the second interconnection through the second through hole, forming a sacrificial film on the interlevel dielectric film to cover the sensor electrodes and expose upper portions of the stationary electrode, forming a counter electrode on the sacrificial film and the stationary electrode, and selectively removing only the sacrificial film after forming the counter electrode, wherein the first and second interconnections are formed to be connected to capacitance detection means for detecting capacitances formed between the sensor electrodes and the counter electrode.

Therefore, the sensor electrodes are connected to the capacitance detection means through the first interconnections, and the counter electrode is connected to the capacitance detection means through the stationary electrode and the second interconnections.

In this fabricating process, the first, second, and third metal films may be made of copper.

Alternatively, the first, second, and third metal films may be made of gold. In addition, after the sensor electrodes and the stationary electrode are formed, protective films having conductivity may be formed to cover the side and upper surfaces of the sensor electrodes and stationary electrode. The protective films may be made of ruthenium or gold. Moreover, an insulating film having projections at positions above the sensor electrodes may be formed on the counter electrode.

According to still another aspect of the present invention, there is provided a method of fabricating a surface shape recognition sensor, comprising the steps of forming first and second interconnections on a semiconductor substrate, forming an interlevel dielectric film on the semiconductor substrate to cover the first and second interconnections, forming a first metal film electrically connected to the first and second interconnections through first and second through holes formed in the interlevel dielectric film, forming a first mask pattern on the first metal film, the first mask pattern having an opening portion above the first through hole, selectively forming a second metal film on an upper surface of the first metal film which is exposed on a bottom portion of the opening portion of the first mask pattern, forming a second mask pattern on the first and second metal films, the second mask pattern having a groove crossing over the second through hole and surrounding the second metal film, selectively forming a third metal film on an upper surface of the first metal film which is exposed on a bottom portion of the groove of the second mask pattern, the third metal film being thicker than the second metal film, forming a sensor electrode and a stationary electrode by removing the first metal film except for portions under the second and third metal films, the sensor electrode being made up of the first and second metal films and connected to the first interconnection via the first through hole, and the stationary electrode made up of the first and third metal films and connected to the second interconnection via the second through hole, and forming a passivation film on the interlevel dielectric film to cover the sensor electrode and expose an upper portion of the stationary electrode, wherein the first and second interconnections are connected to capacitance detection means for detecting a capacitance formed between the sensor electrode and the stationary electrode.

Therefore, the sensor electrodes are connected to the capacitance detection means through the first interconnections, and the stationary electrode is connected to the capacitance detection means through the second interconnections.

In this fabricating process, the first, second, and third metal films may be made of copper. Alternatively, the first, second, and third metal films may be made of gold. In addition, after the sensor electrodes and the stationary electrode are formed, protective films having conductivity may be formed to cover the side and upper surfaces of the sensor electrodes and stationary electrode. The protective films may be made of ruthenium. The passivation film may be made of polyimide. As this polyimide, polybenzaoxazole may be used.

BRIEF DESCRIPTION OF THE DRAWINGS

FIG. 1-B is a plan view showing the arrangement of the surface shape recognition sensor according to the first embodiment of the present invention;

FIG. 8 is a sectional view showing one capacitance detection element of a surface shape recognition sensor according to the third embodiment of the present invention;

FIG. 12-C is a plan view showing the arrangement of the surface shape recognition sensor according to the fifth embodiment of the present invention;

FIG. 14 is a sectional view showing the arrangement of one capacitance detection element of a surface shape recognition sensor according to the sixth embodiment of the present invention;

FIG. 22 is a graph showing the correlation between L, Wo, and d in the surface shape recognition sensor in FIG. 18 when the relative dielectric constant of the passivation film is set to 4;

FIG. 23 is a graph showing the correlation between L, Wo, and d in the surface shape recognition sensor in FIG. 18 when the relative dielectric constant of the passivation film is set to 7;

DESCRIPTION OF THE PREFERRED EMBODIMENTS

Figure 1A:
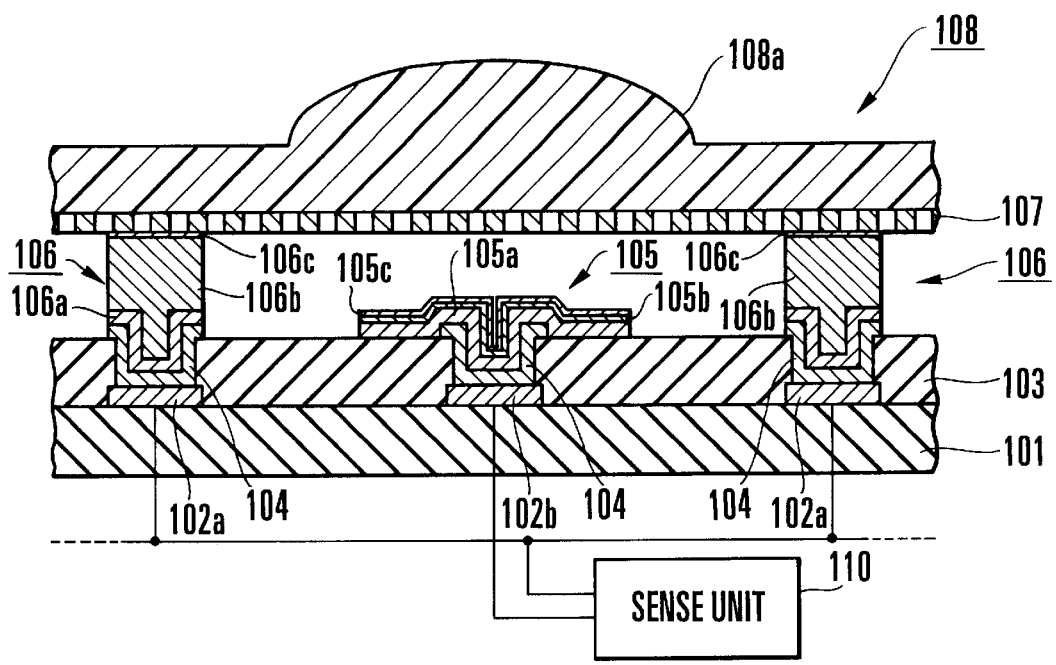
FIG. 1-A is a sectional view showing the arrangement of one capacitance detection element of a surface shape recognition sensor according to the first embodiment of the present invention.

The embodiments of the present invention will be described in detail below with reference to the accompanying drawings.

First Embodiment

FIGS. 1-A and 1-B show a surface shape recognition sensor (one capacitance detection element) according to the first embodiment of the present invention. As shown in FIG. 1-A, for example, a sensor electrode 105 80 μm square, consisting of copper, and a support electrode (stationary electrode) 106 are formed on an interlevel dielectric film 103 formed on an insulating film 101. Note that the insulating film 101 is formed on a semiconductor substrate on which integrated circuits such as a sense unit 110 (to be described later) and processing means (not shown) are formed. One capacitance detection element (to be referred to as a sensor element hereinafter) need not always have one sensor electrode 105, but may have a plurality of identical sensor electrodes.

As shown in FIG. 1-B, the support electrode 106 is formed into a matrix pattern consisting of square portions each 100 μm square. The sensor electrode 105 is placed in the central portion of each square portion. The support electrode 106 has about 300×300 square portions. That is, 300×300 sensor electrodes 105 are arranged in the form of a matrix.

An aluminum interconnection 102a is formed on the insulating film 101 to be connected to the sensor electrode 105 through a barrier film 104 made of titanium nitride. In this case, the sensor electrode 105 is made up of a lower electrode 105a having a thickness of about 0.1 μm and an upper electrode 105b having a thickness of about 0.3 μm and formed on the lower electrode 105a. The lower and upper electrodes 105a and 105b are made of copper. As will be described later, the sensor electrode 105 need not be divided into these two components.

Similarly, an aluminum interconnection 102b is formed on the insulating film 101 to be connected to the support electrode 106 through the barrier film 104 made of titanium nitride. The support electrode 106 is made up of a lower electrode 106a consisting of copper and having a thickness of 0.2 μm and an electrode pillar (support member) 106b consisting of copper and having a thickness of about 5 μm, which is formed on the lower electrode 106a.

A metal film 105c made of gold and a protective film 106c are respectively formed on the upper surfaces of the sensor electrode 105 and the support electrode 106. Note that the barrier film 104 is formed to restrict diffusion of, e.g., copper and is not limited to titanium nitride. The barrier film 104 may be made of a conductive material other than titanium nitride, which is capable of restricting interdiffusion, e.g., chromium, tungsten, tantalum, or one of nitrides of these elements.

Figure 2:
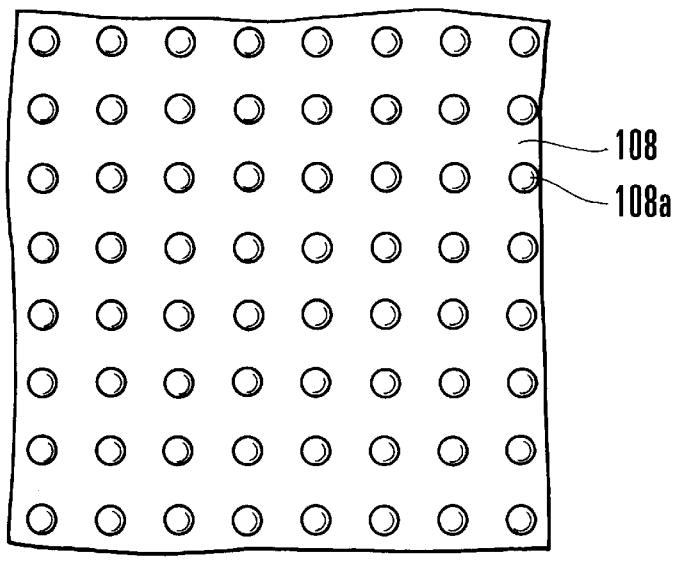
FIG. 2 is a plan view showing the arrangement of part of the surface shape recognition sensor according to the first embodiment of the present invention.
Figure 3A:
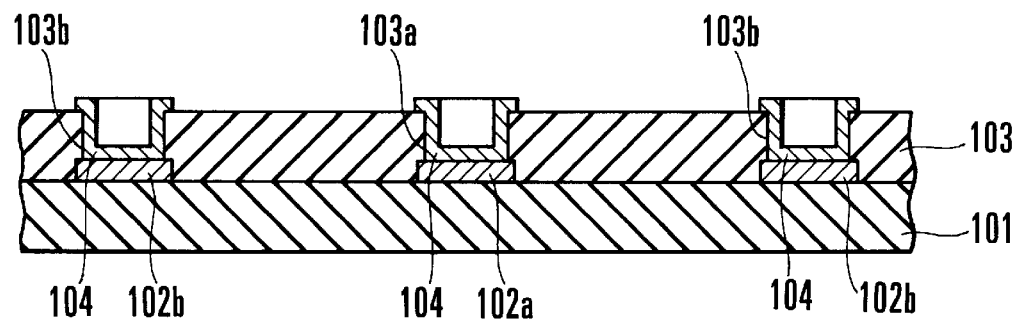
FIGS. 3-A to 3-K are views showing the steps in a process of fabricating the surface shape recognition sensor according to the first embodiment of the present invention.
Figure 3B:
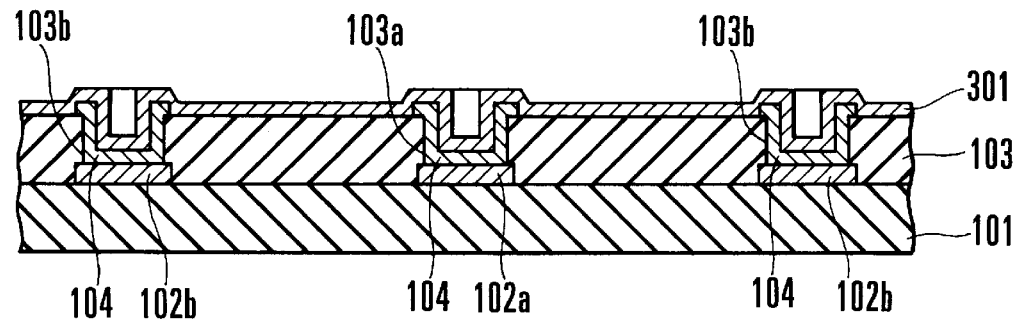
Figure 3C:
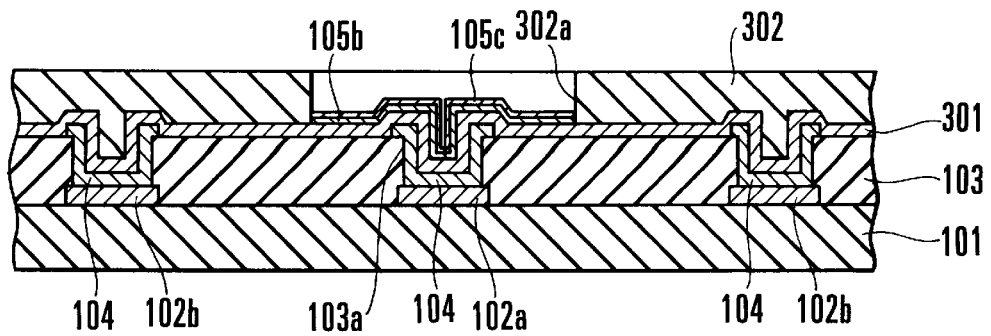
Figure 3D:
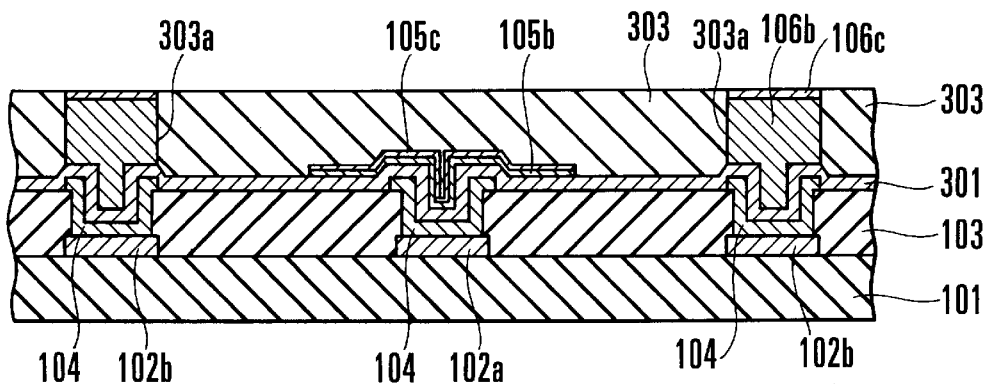
Figure 3E:
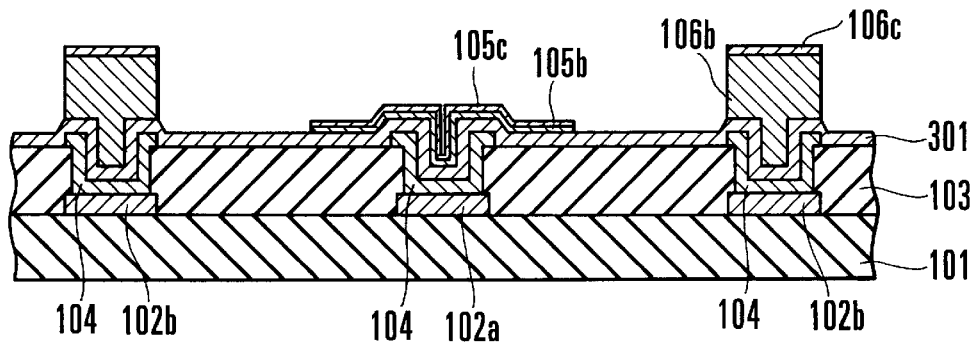
Figure 3F:
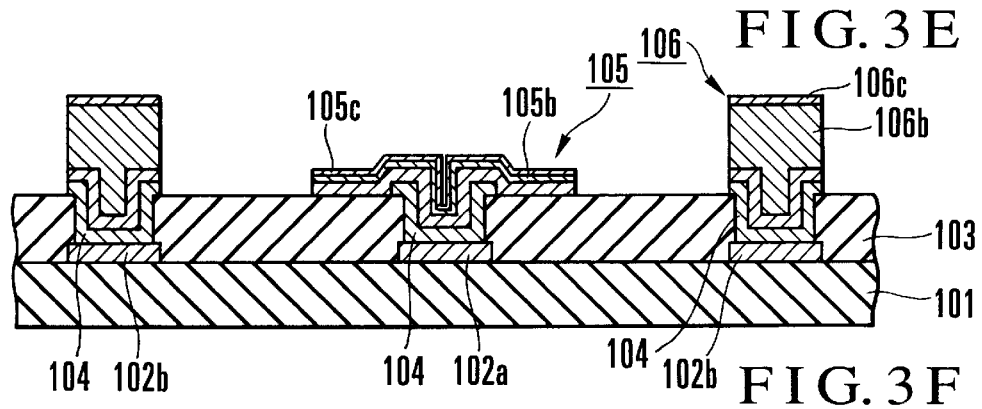
Figure 3G:
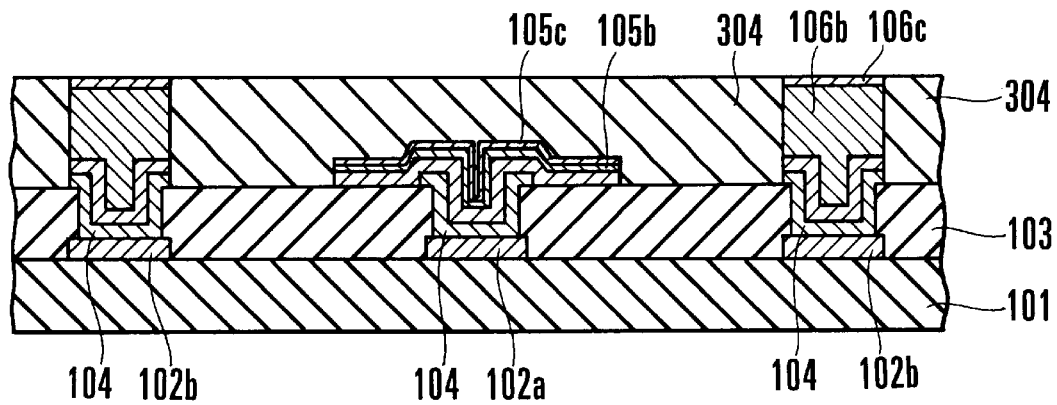
Figure 3H:
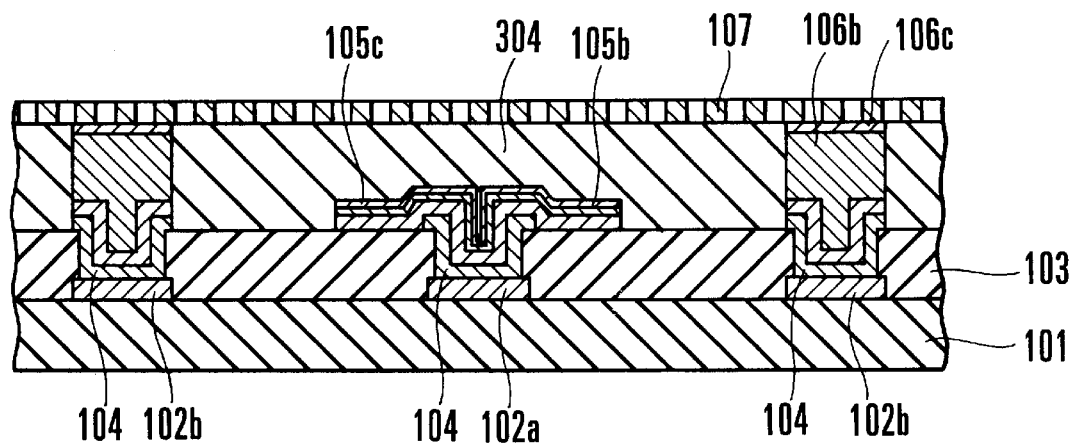
Figure 3I:
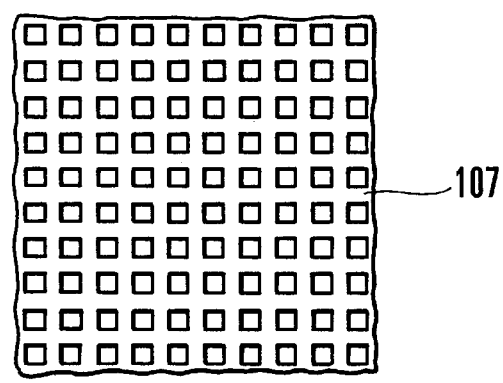
Figure 3J:
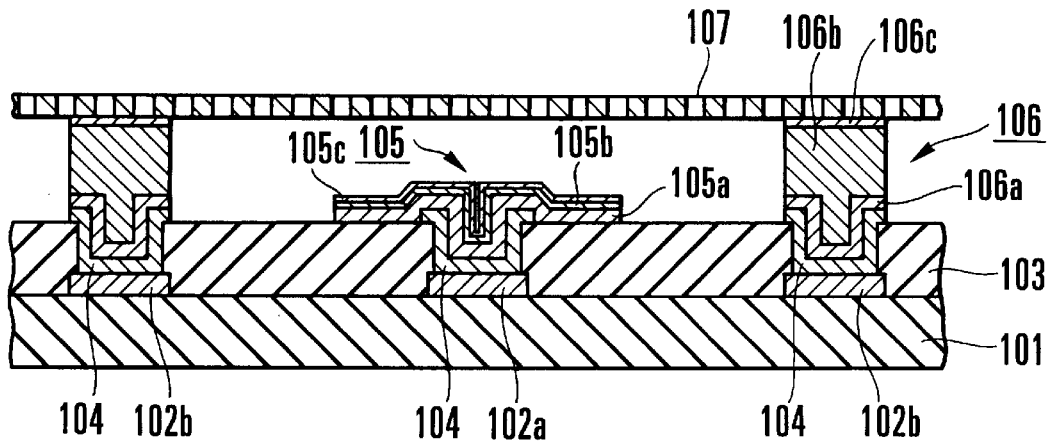
Figure 3K:
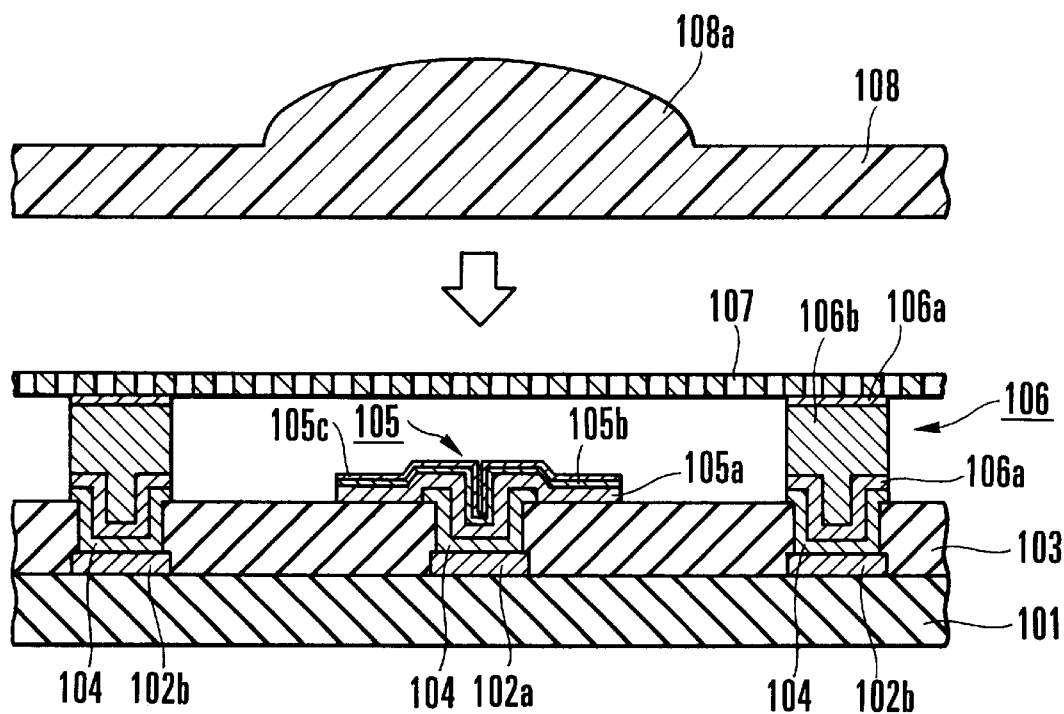
Figure 4A:
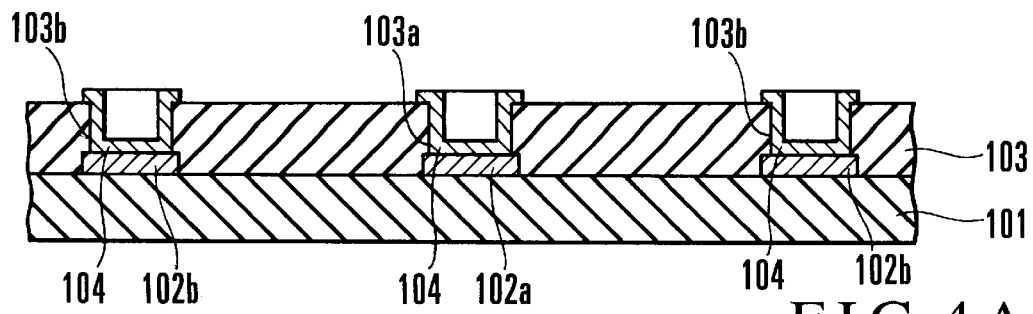
FIGS. 4-A to 4-F are sectional views showing the steps in another process of fabricating the surface shape recognition sensor according to the first embodiment of the present invention.
Figure 4B:
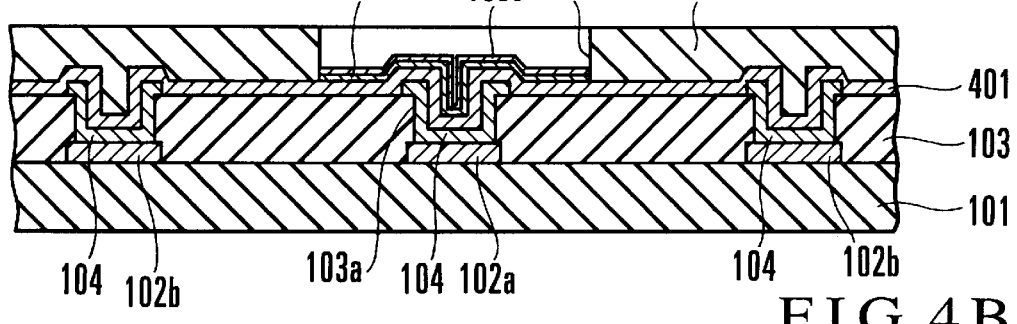
Figure 4C:
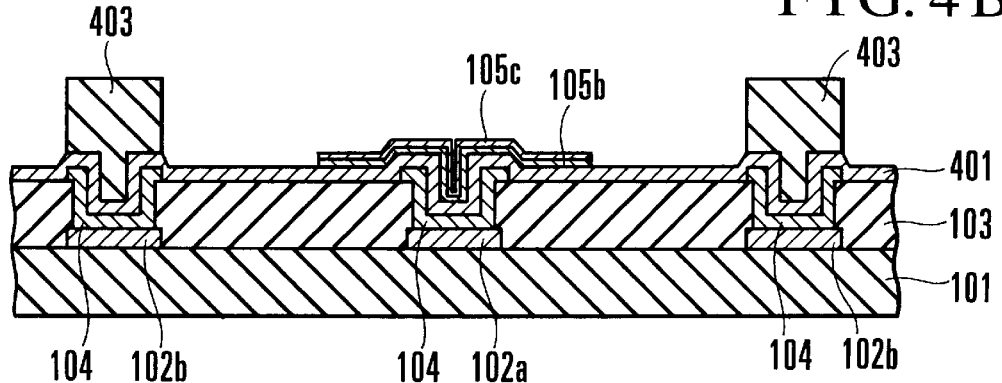
Figure 4D:
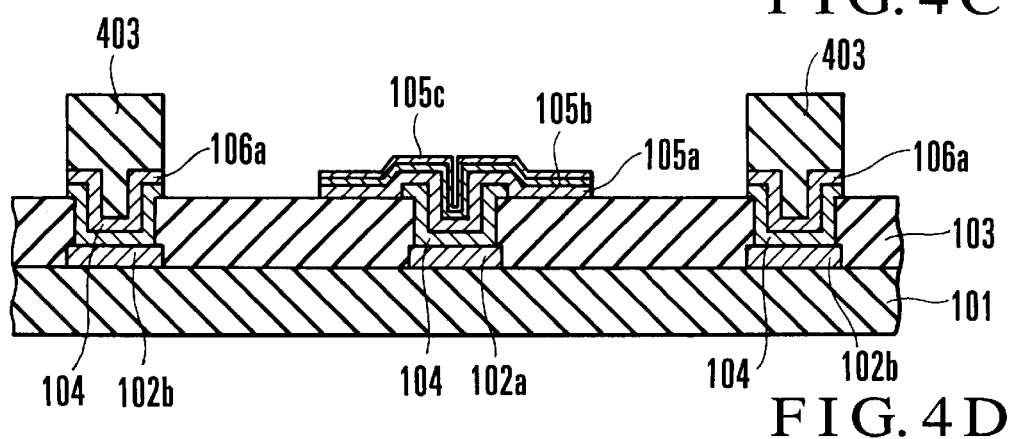
Figure 4E:
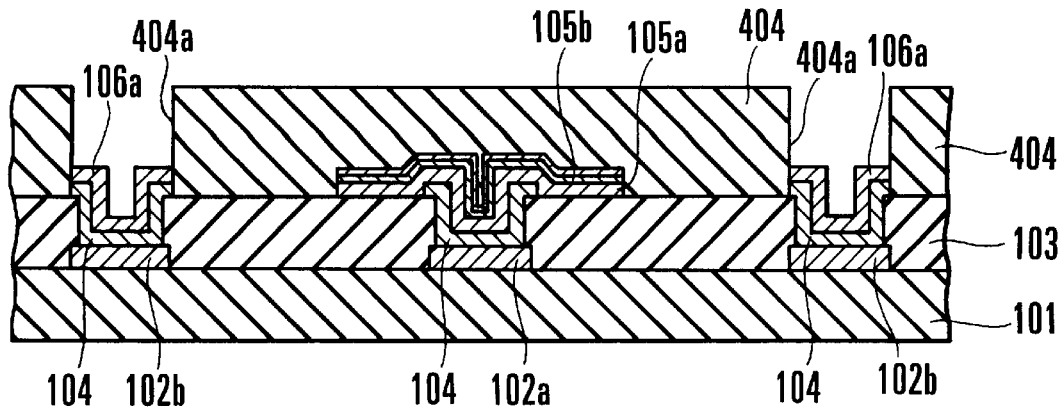
Figure 4F:
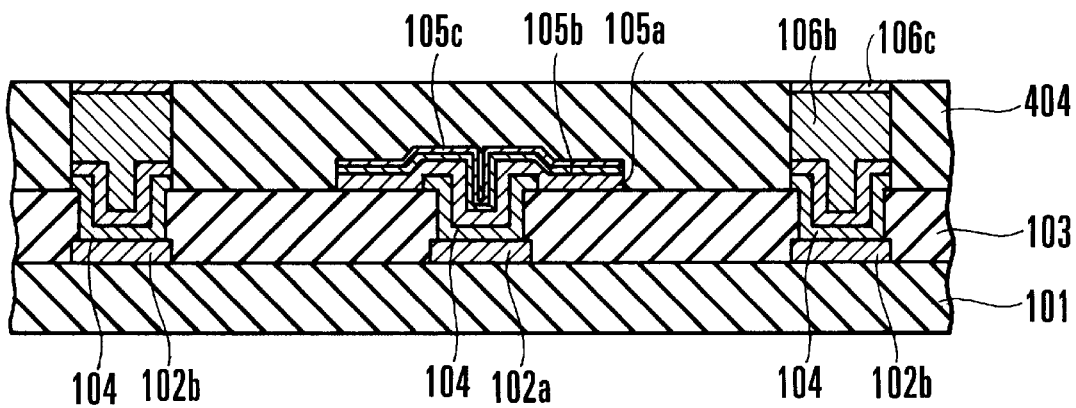

A counter electrode 107 is formed on almost the entire upper surface of the matrix-like support electrode (protective film 106c) 106. The counter electrode 107 bends downward at least at the central portion of each square portion of the support electrode 106. For convenience in fabricating (to be described later), the counter electrode 107 has a mesh pattern with holes each having a size smaller than that of the support electrode 106. A film 108 having projections 108a at the central portions of the respective square portions of the support electrode 106 is bonded/fixed on the counter electrode 107. With the projections 108a of on the surface of the film 108, the central portions of the respective sensor elements become highest to improve the sensitivity. FIG. 2 shows the surface shape recognition sensor when viewed from the above. That is, a plurality of projections 108a are formed on the surface which an object touches.

A plurality of sense units 110 are respectively connected to the sensor electrodes 105 and the support electrodes 106 through the interconnections 102a and 102b described above. These sense units 110 detect the capacitances formed between the support electrodes 106 and the sensor electrodes 105 and output signals corresponding to the capacitances. The outputs from the respective sense units 110 are processed by a processing means (not shown). This processing means converts the capacitances formed by the respective sensor electrodes 105 into halftone image data. In this case, each sense unit 110 need not be formed below the corresponding sensor electrode 105 as shown in FIG. 1-A, but may be formed in another region. In addition, one sense unit 110 need not be prepared for one sensor element, and may be connected to a plurality of sensor elements.

According to the surface shape recognition sensor having the above arrangement, when the tip of the finger touches the upper surface of the film 108, the projections 108a are depressed downward in accordance with the fingerprint pattern of the finger. As a result, the counter electrode 107 bends toward the sensor electrodes 105 at the corresponding portions. The capacitances formed between the sensor electrodes 105 and the counter electrode 107 change at the bent portions. That is, when the finger is placed on the film 108, the capacitances at the respective sensor electrodes 105 change in accordance with the fingerprint pattern (recesses/projections). The respective capacitances having undergone changes are detected by the sense units 110.

When the processing means generates halftone data in accordance with the respective capacitances detected at the sensor electrodes 105, the fingerprint pattern can be reproduced. If, for example, 300×300 sensor electrodes 105 are arranged at 100-μm intervals, a 300×300 dot fingerprint image can be obtained with a resolution of about 250 dots/inch.

Although not shown in FIG. 1-A, an integrated circuit in which a storage section storing fingerprint data for collation, a recognition processing section for comparing/collating the fingerprint data stored in the storage section with a read fingerprint image, and the like are integrated is placed in another region on the semiconductor substrate. All these components may be arranged on the semiconductor substrate at a position below the sensor electrode 105. With this arrangement, the detected fingerprint pattern can be compared/collated with the fingerprint data stored in the storage section by the recognition processing section formed in the integrated circuit in a more compact state.

According to the surface shape recognition sensor of the first embodiment, the finger is not used as one electrode when the fingerprint pattern is to be recognized. This suppresses damage to other integrated circuit portions formed below the electrodes due to static electricity. In addition, according to the first embodiment, since the support electrode is formed into the matrix pattern, and the sensor electrodes are arranged in the central portions of the respective square portions, the intervals between the support electrode and the respective sensor electrodes can be made equal to each other.

Since the above description is made by taking fingerprint detection as an example, the size of each square portion of the support electrode 106, i.e., the size of each sensor element, is set to be about 100 µm square. However, the present invention is not limited to this. When a fingerprint is to be detected, since the width of a ridge on the skin of the human finger is about 200 to 300 µm, each sensor element may be made smaller than the width of the ridge. If, therefore, the size of each sensor element is about 100 µm square, which is half the width of the ridge, a fingerprint pattern can be detected. If, for example, this size is set to 80 µm square, which is smaller than 100 µm square, a fingerprint can be detected with a high resolution of about 300 dots/inch. Obviously, the size of each sensor element may be arbitrarily changed in accordance with the shape, characteristics, and or the like of an object to be measured, and hence is not limited to the above values.

A method of fabricating the surface shape recognition sensor according to the first embodiment will be described next.

First Fabricating Method

First of all, other integrated circuits such as the sense units described above are formed on the semiconductor substrate. As shown in FIG. 3-A, then, the insulating film 101 made of a silicon oxide is formed on the semiconductor substrate to cover these integrated circuits. The aluminum interconnections 102a and 102b are formed on the insulating film 101. These interconnections 102a and 102b may be formed by forming aluminum films and patterning them by a known photolithography technique. The interlevel dielectric film 103 is formed on the insulating film 101 to cover the interconnections 102a and 102b. Through holes 103a and 103b are formed in predetermined portions of the interlevel dielectric film 103 which are located above the interconnections 102a and 102b.

The barrier films 104 made of titanium nitride are formed to cover at least the surfaces of the interconnections 102a and 102b which are exposed on the bottom portions of the through holes 103a and 103b. This barrier films 104 may be formed as follows. First of all, a titanium nitride film is formed on the interlevel dielectric film 103, in which the through holes 103a and 103b are formed, by sputtering or the like. A resist pattern is then formed to cover the through hole formation portions by the photolithography technique. The titanium nitride film is selectively removed by dry etching such as reactive ion etching (RIE) using this resist pattern as a mask, and the resist pattern is removed, thereby forming the barrier films 104. Note that the barrier film 104 is not limited to a titanium nitride film. As described above, the barrier film 104 may be made of another conductive material that can suppress interdiffusion, e.g., chromium, tungsten, or one of nitrides thereof.

As shown in FIG. 3-B, for example, a thin metal film 301 consisting of copper and having a thickness of about 0.1 µm is formed on the interlevel dielectric film 103 including the barrier films 104. For example, in this step, a copper film may be formed by sputtering.

As shown in FIG. 3-C, a resist pattern 302 having an opening portion 302a in a predetermined region corresponding to the upper portion of each through hole 103a is formed on the thin metal film 301 to have a thickness of about 5 µm. A 0.3-µm thick copper film is formed on the surface of the thin metal film 301 which is exposed on the bottom portion of the opening portion 302a by an electroplating method using the thin metal film 301 as a cathode, thus forming the upper electrode 105b. Note that the formation of this upper electrode 105b is not limited to electroplating. If, however, the thin metal film 301 is formed to have a thickness of about 0.4 µm, the upper electrode 105b need not be formed. In addition, the metal film 105c is formed on the upper electrode 105b by forming a metal film having a thickness of about 0.2 µm by electroplating.

After the resist pattern 302 is removed, a resist pattern 303 having a groove 303a surrounding the upper electrode 105b is formed to have a thickness of about 5 µm, as shown in FIG. 3-D. In this groove 303a, the support electrode 106 in FIGS. 1-A and 1B is placed. A copper film is grown to a thickness of about 5 µm on the surface of the thin metal film 301 which is exposed on the bottom portion of the groove 303a by the electroplating method using the thin metal film 301 as a cathode, thus forming the electrode pillar 106b. In addition, the protective film 106c is formed by growing a gold film to a thickness of about 0.1 µm on the electrode pillar 106b by the electroplating method using the thin metal film 301 as a cathode.

As shown in FIG. 3-E, the resist pattern 303 is removed. As shown in FIG. 3-F, the exposed portions of the thin metal film 301 are removed by etching. In this case, these portions may be removed by a wet etching process using an aqueous mixed acid solution made up of phosphoric acid, nitric acid, and acetic acid as an etchant.

As a result of the above process, the support electrode 106 is formed in a matrix pattern at a height of about 5 µm above the interlevel dielectric film 103. The sensor electrodes 105 are formed in the central portion of the respective square portions of the matrix-like support electrode 106.

As shown in FIG. 3-G, a sacrificial film 304 is formed to fill each square portion of the matrix-like support electrode 106. This sacrificial film 304 may be formed as follows. First of all, the interlevel dielectric film 103, on which the sensor electrode 105 and the support electrode 106 are formed, is coated with an SOG material three times by spin coating or the like. The resultant structure is then annealed at about 300° C. to form an SOG film. With this coating, the upper surface of the SOG film is planarized, absorbing the recesses/projections on the interlevel dielectric film 103 due to the support electrode 106 and the sensor electrode 105. When this flat SOG film is etched back until the surface of the metal film 106a is exposed, the resist pattern 303 having a flat surface can be formed to fill each square portion of the support electrode 106. This etching back step may be performing by dry etching using an oxygen gas plasma. Note that the etching back step may be performed by, for example, a chemical/mechanical polishing method. Obviously, the material for the sacrificial film 304 is not limited to the SOG film, and another material can be used as long as a sacrificial film that can be etched by mainly using an oxygen gas plasma can be formed.

As shown in FIG. 3-H, the counter electrode 107 is formed on the sacrificial film 304 and the support electrode 106. This counter electrode 107 is formed as follows. First of all, a copper film having a thickness of about 0.5 µm is formed on the entire surface of the above structure by sputtering or the like. This copper film is partly etched to form a plurality of fine holes. As a result, as indicated by the plan view of FIG. 3-I, the counter electrode 107 is processed into a mesh pattern.

Subsequently, the sacrificial film 304 is selectively etched by using a mixed gas plasma consisting of $CF_4$ and oxygen. Although inorganic materials such a metal used for the counter electrode 107 are hardly etched by the etching species generated by this plasma, the sacrificial film 304 is etched. Since a plurality of fine holes are formed in the counter electrode 107, the etching species generated by the plasma can reach the sacrificial film 304 through the holes. The sacrificial film 304 can therefore be selectively etched. As a result, as shown in FIG. 3-J, the counter electrode 107 is formed to be supported by the support electrode 106 so as to have a predetermined space above the sensor electrode 105.

As shown in FIG. 3-K, the film 108 having the projections 108a are bonded/fixed on the counter electrode 107, thereby obtaining the surface shape recognition sensor of the first embodiment shown in FIG. 1-A. This film 108 can be formed by processing a film made of an organic material such as PTFE (polytetrafluoroethylene) having thermoplasticity. This PTFE can be effectively used because it is resistant to soiling as well as having thermoplasticity. The flat surface of the film 108 is coated with a film-like adhesive and is mounted and fixed on the counter electrode 107 with the adhesive-coated surface facing the counter electrode 107. The resultant structure is then heated at 150° C. for 10 min. As a result, the film 108 is bonded/fixed on the counter electrode 107.

According to the above description, the support electrode is formed in a matrix pattern. However, the present invention is not limited to this, and the support electrode may have any pattern as long as the resultant structure can support the counter electrode with a predetermined space ensured above each sensor electrode.

Second Fabricating Method

The surface shape recognition sensor of the first embodiment may be fabricated as follows.

First of all, as shown in FIG. 4-A, the insulating film 101 made of silicon oxide is formed on the semiconductor substrate, on which other integrated circuits such as sense units (not shown) are formed, to cover the integrated circuits. The aluminum interconnections 102a and 102b are formed on the insulating film 101. The interlevel dielectric film 103 is formed on the insulating film 101 to cover the interconnections 102a and 102b. The through holes 103a and 103b are formed in predetermined portions of the interlevel dielectric film 103 which are located above the interconnections 102a and 102b. The barrier films 104 made of titanium nitride are formed to cover at least the surfaces of the interconnections 102a and 102b which are exposed on the bottom portions of the through holes 103a and 103b.

As shown in FIG. 4-B, for example, a thin metal film 401 consisting of copper and having a thickness of about 0.1 μm is formed on the interlevel dielectric film 103 including the barrier films 104. A resist pattern 402 having an opening portion 402a in a predetermined region above each through hole 103a is formed on the thin metal film 401 to have a thickness of about 5 μm. The upper electrode 105b is formed by forming a 0.3-μm thick copper film on the surface of the thin metal film 401 which is exposed on the bottom portion of the opening portion 402a by the electroplating method using the thin metal film 401 as a cathode. Subsequently, a gold film having a thickness of about 0.2 μm is formed by also using the electroplating method, thereby forming the metal film 105c on the upper electrode 105b.

The above process is the same as in the first fabricating method described above.

Figure 1B:
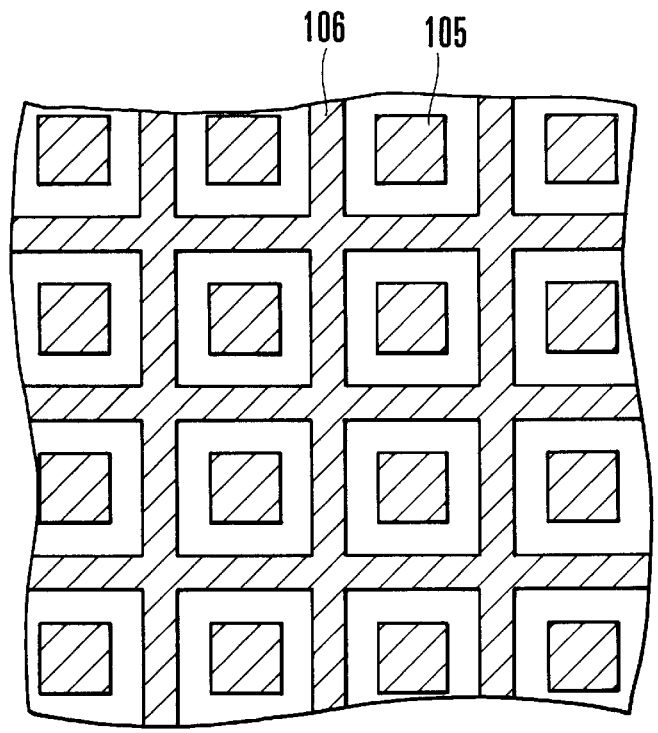

In the second fabricating method, after the resist pattern 402 is removed, a resist pattern 403 having a shape surrounding each upper electrode 105b is formed to have a thickness of about 5 μm, as shown on FIG. 4-C. The region occupied by this resist pattern 403 is the region in which the support electrode 106 is formed as shown in FIGS. 1A and 1B.

The exposed surface portions of the thin metal film 401 are then selectively etched by using the resist pattern 403 and the metal film 105c as masks to form the lower electrode 105a and the lower electrode 106a, as shown in FIG. 4-D. In this case, these portions may be removed by a wet etching process using an aqueous mixed acid solution made up of phosphoric acid, nitric acid, and acetic acid as an etchant. Since the resist pattern 403 and the metal film 105c made of gold are hardly etched by this wet etching process, the thin metal film 401 can be selectively removed.

After the resist pattern 403 is removed, a sacrificial film 404 consisting of polyimide and having a groove 404a surrounding the upper electrode 105b is formed to have a thickness of about 5 μm, as shown in FIG. 4-E. This groove 404a is the region in which the support electrode 106 is formed. Note that the material for the sacrificial film 404 is not limited to polyimide, and an SOG film may be used.

As shown in FIG. 4-F, for example, copper is selectively grown on the lower electrode 106a by electroless plating to fill the groove 404a with copper, thereby forming the electrode pillar 106b having a height of about 5 μm. The protective film 106c having a thickness of about 0.1 μm is formed on the electrode pillar 106b by continuously plating it with gold.

After this step, as in the above steps shown in FIGS. 3-H to 3-K, the counter electrode 107 is formed on the sacrificial film 404 and the support electrode 106, and only the sacrificial film 404 is selectively removed. The film 108 having the projections 108a is bonded/fixed on the counter electrode 107. As a result, the surface shape recognition sensor of the first embodiment shown in FIG. 1-A is obtained.

Third Fabricating Method

According to the above description, the counter electrode is formed after the sacrificial film is formed. However, the present invention is not limited to this. The counter electrode may be formed without forming the sacrificial film.

More specifically, for example, as shown in FIGS. 3-A to 3-F, the support electrode 106 is formed in a matrix pattern at a height of about 5 μm above the interlevel dielectric film 103, and the sensor electrode 105 is formed in the central portion of each square portion of the matrix-like support electrode 106.

Figure 5:
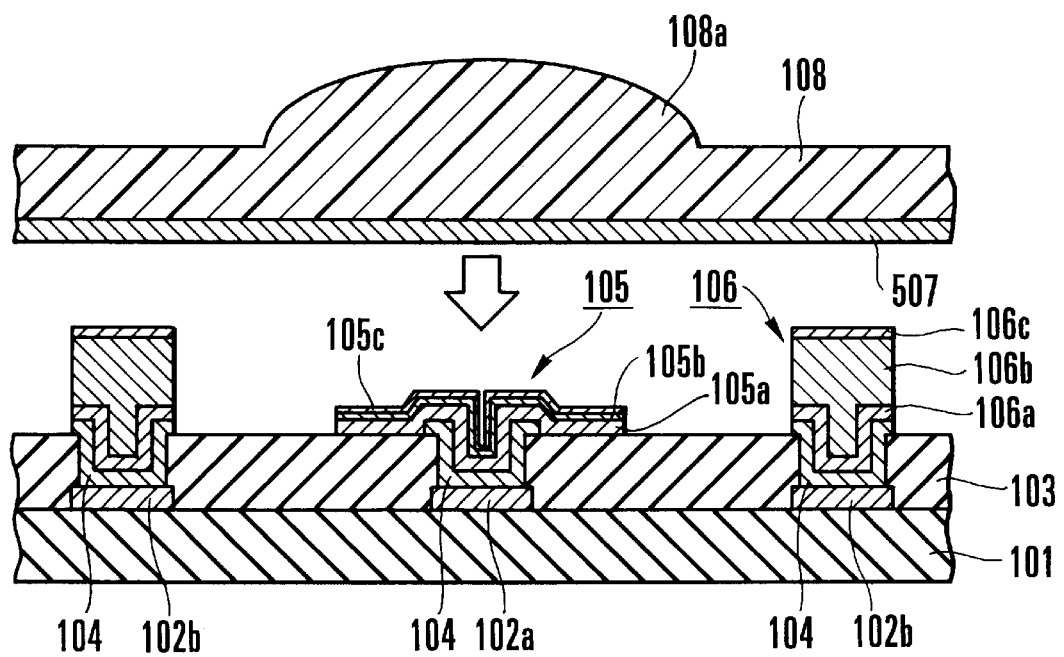
FIG. 5 is a sectional view showing still another process of fabricating the surface shape recognition sensor according to the first embodiment of the present invention.

Meanwhile, a counter electrode 507 made of a multilayer film consisting of chromium and gold is formed on a surface of the film 108 (FIG. 3-K) having the projections 108a on which no projections are formed, as shown in FIG. 5 by, for example, a mask deposition method. The counter electrode 507 and the surface of the protective film 106c of the support electrode 106 are bonded/fixed to each other with a conductive adhesive, thereby obtaining the surface shape recognition sensor of the first embodiment in FIG. 1-A. When the counter electrode and the protective films are to be fixed with an adhesive, for example, they may be brought into contact with each other through the conductive adhesive, and the resultant structure may be heated at about 150° C. for 10 min.

If the counter electrode 507 is formed in this manner, no sacrificial film is required. This can simplify the fabricating process as compared with the first and second fabricating methods.

Second Embodiment

Figure 6:
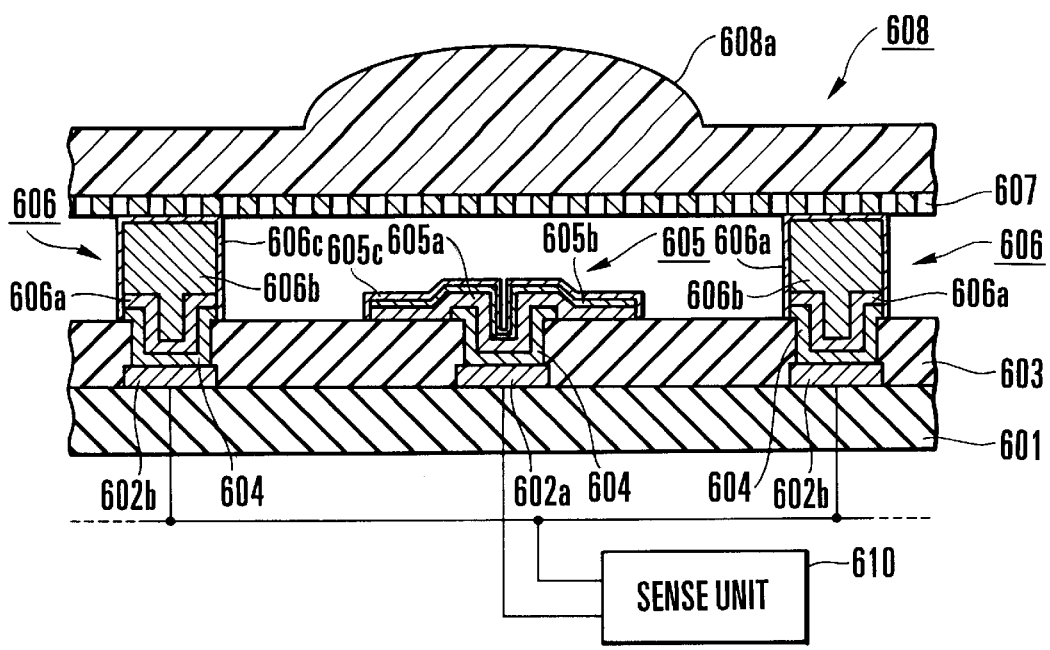
FIG. 6 is a sectional view showing the arrangement of one capacitance detection element of a surface shape recognition sensor according to the second embodiment of the present invention.
Figure 7A:
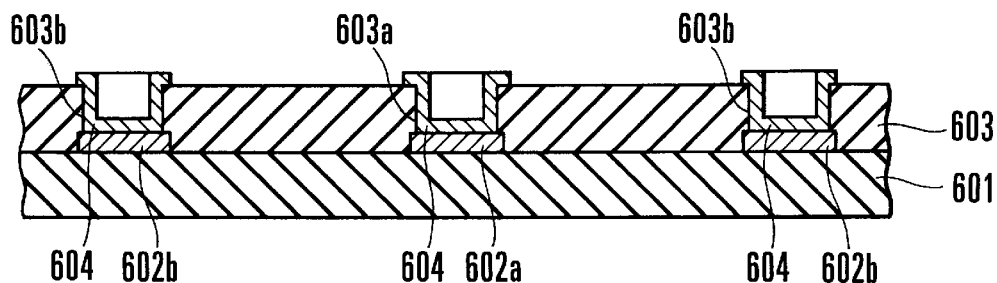
FIGS. 7-A to 7-I are sectional views showing the steps in a processing of fabricating the surface shape recognition sensor according to the second embodiment of the present invention.
Figure 7B:
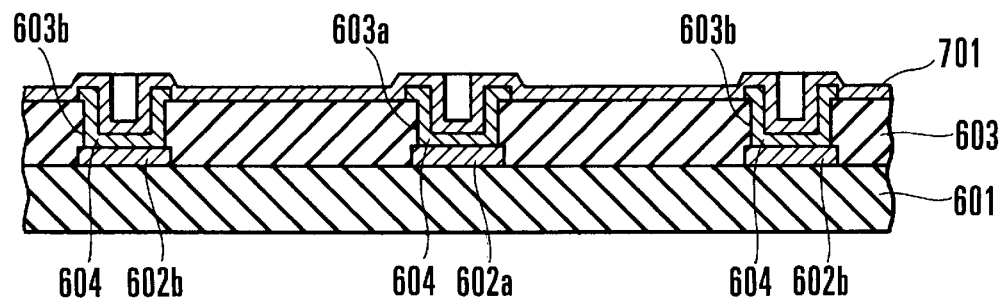
Figure 7C:
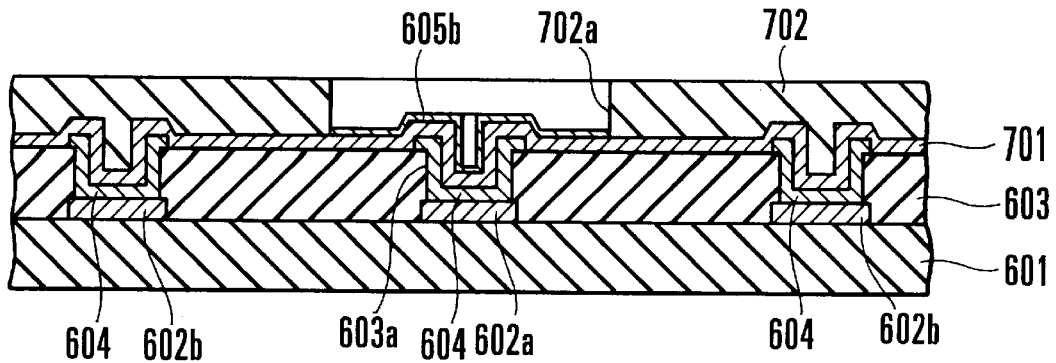
Figure 7D:
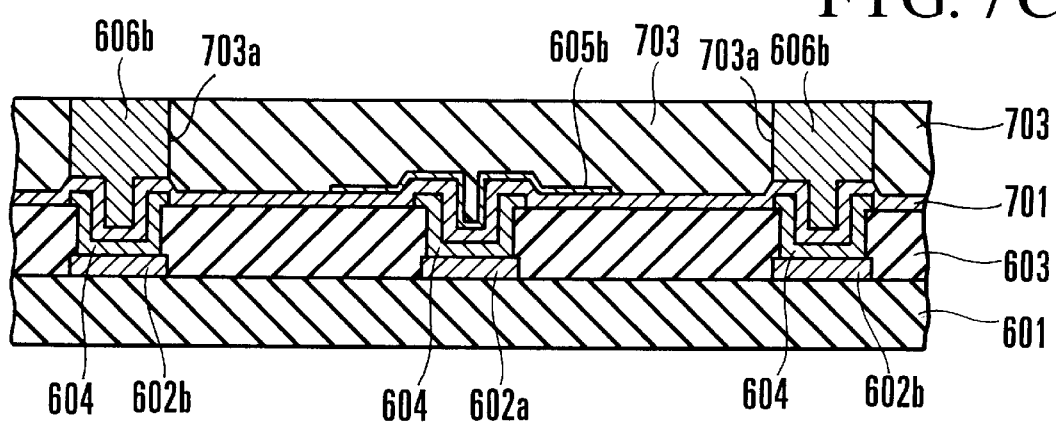
Figure 7E:
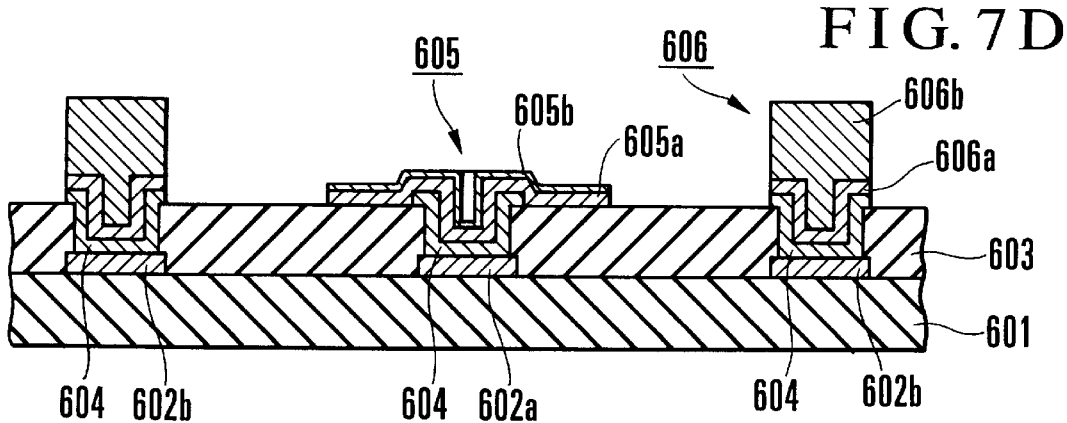
Figure 7F:
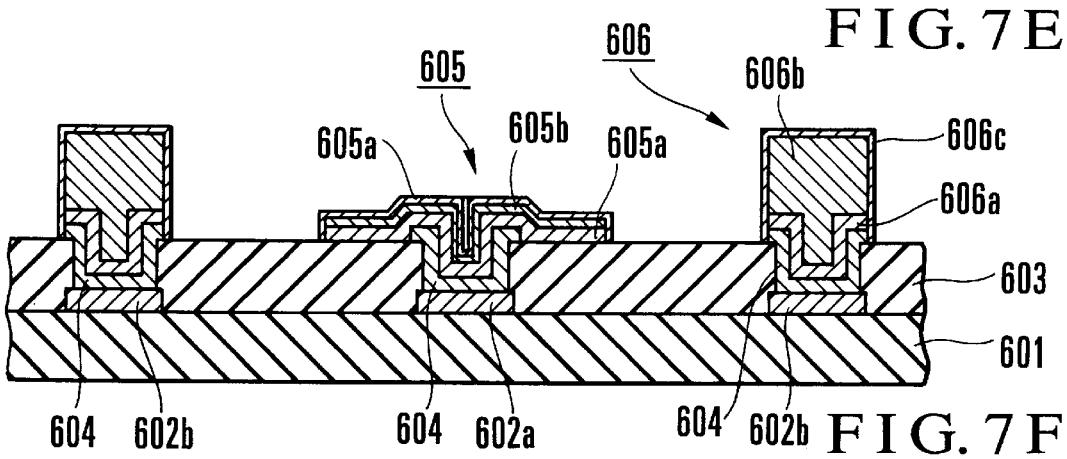
Figure 7G:
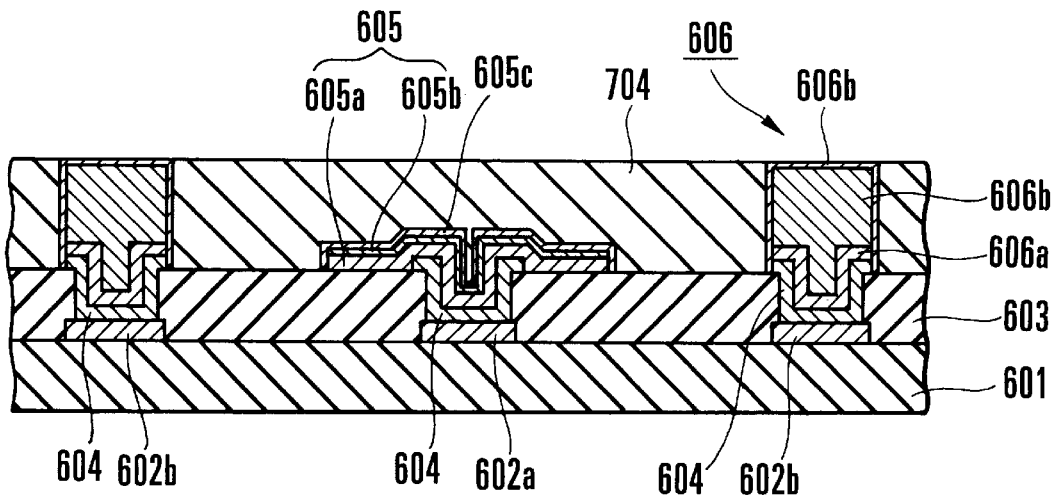
Figure 7H:
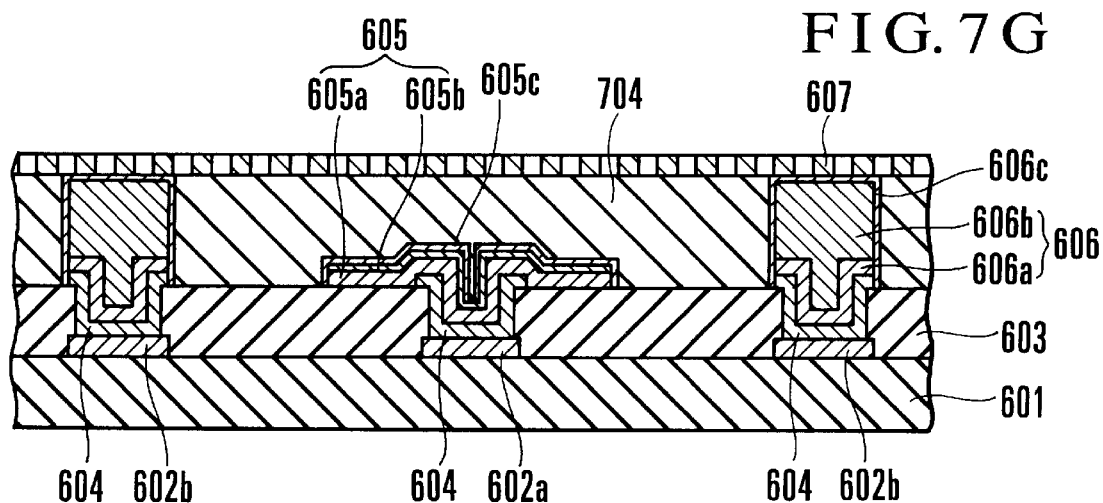
Figure 7I:
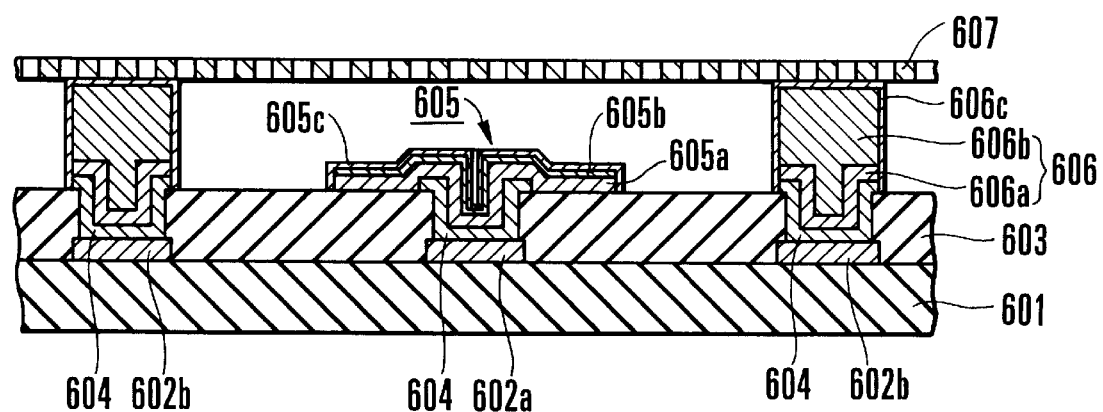
Figure 9E:
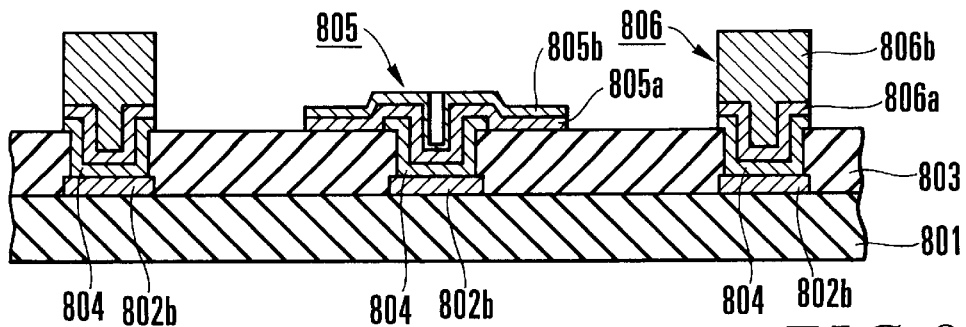
FIGS. 9-A to 9-H are sectional views showing the steps in a process of fabricating the surface shape recognition sensor according to the third embodiment of the present invention.
Figure 9F:
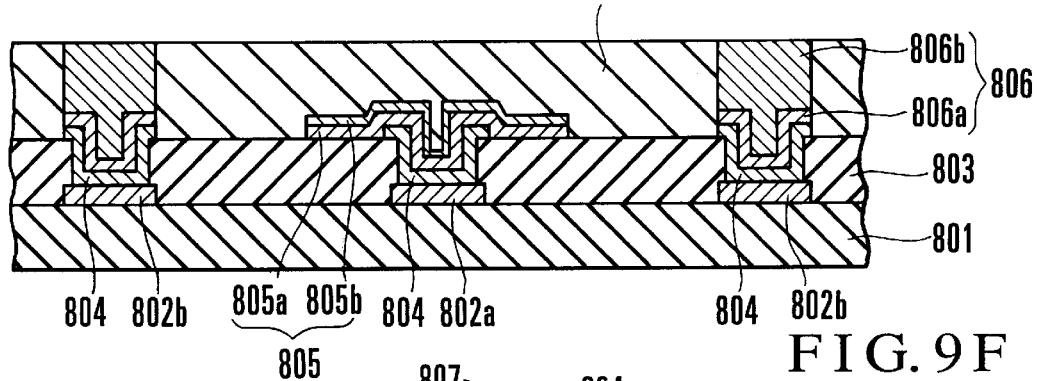
Figure 9G:
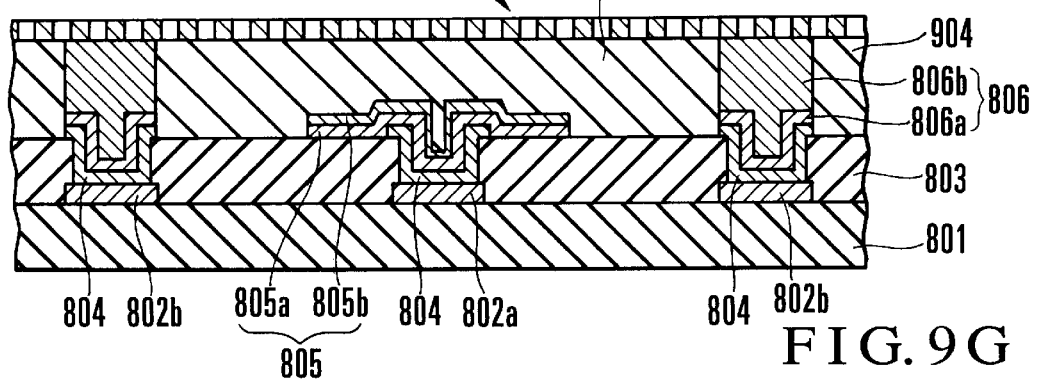
Figure 9H:
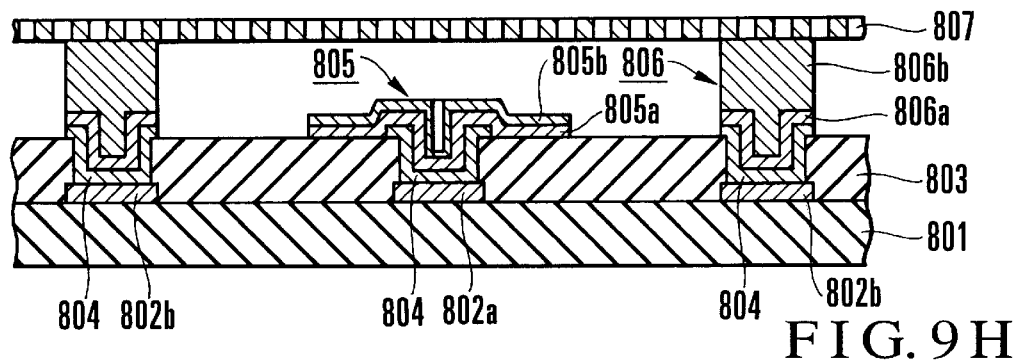

A surface shape recognition sensor according to the second embodiment of the present invention will be described next. As shown in FIG. 6, the surface shape recognition sensor of the second embodiment has sensor electrodes 605, each consisting of copper and a size of 80 μm square, and a support electrode 606 on an interlevel dielectric film 603 formed on an insulating film 601. Note that the insulating film 601 is formed on the semiconductor substrate on which integrated circuits such as sense units 610 (to be described later) and processing means (not shown) are formed.

In the second embodiment, as in the case shown in FIG. 1-B, the support electrode 606 is formed into a matrix pattern having square portions each 100 μm square. The sensor electrode 605 is formed in the central portion of each square portion. The support electrode 606 has about 300×300 square portions, and hence 300×300 sensor electrodes 605 are arranged in the form of a matrix.

An aluminum interconnection 602a is formed on the insulating film 601 to be connected to the sensor electrode 605 through a barrier film 604 made of titanium nitride. The sensor electrode 605 is made up of a lower electrode 605a having a thickness of about 0.2 μm and an upper electrode 605b having a thickness of about 0.3 μm, which is formed on the lower electrode 605a. In this case, the lower electrode 605a is a two-layer film including chromium and copper films each having a thickness of about 0.1 μm. The upper electrode 605b is made of copper.

Similarly, an aluminum interconnection 602b is formed on the insulating film 601 to be connected to the support electrode 606 through the barrier film 604 made of titanium nitride. The support electrode 606 is also made up of a 0.1-μm thick lower electrode 606a made of a two-layer film including chromium and copper layers, and an electrode pillar 606b consisting of copper and having a thickness of about 5 μm, which is formed on the lower electrode 606a. Protective films 605c and 606c made of ruthenium are formed to cover the upper and side surfaces of the sensor electrode 605 and support electrode 606. Note that a metal used for the lower layer of each of the lower electrodes 605a and 606a is not limited to chromium. For example, other metals such as titanium and nickel may be used, which can suppress diffusion of copper and improve the adhesion characteristics with respect to an insulating material.

Subsequently, a counter electrode 607 is formed on almost the entire upper surface of the matrix-like support electrode 606 (protective film 606c).

The counter electrode 607 bends downward at least at the central portions of the respective square portions of the support electrode 606. For convenience in fabricating (to be described later), the counter electrode 607 has a mesh pattern with holes each having a size smaller than that of the support electrode 106. A film 608 having projections 608a at the central portions of the respective square portions of the support electrode 606 is bonded/fixed on the counter electrode 607.

A plurality of sense units 610 are connected to the respective sensor electrodes 605 and the support electrode 606 through the interconnections 602a and 602b described above. The sense units 610 detect the capacitances formed between the support electrode 606 and the sensor electrodes 605, and output signals corresponding to the capacitances. The outputs from the respective sensor units 610 are processed by a processing means (not shown). This processing means converts the capacitances formed by the respective sensor electrodes 605 into halftone image data. In this case, each sense unit 610 need not be formed below the corresponding sensor electrode 605 as shown in FIG. 6, but may be formed in another region. In addition, one sense unit 610 need not be prepared for one sensor element, and may be connected to a plurality of sensor elements. These structures are the same as those in the first embodiment.

According to the surface shape recognition sensor having the above arrangement, when the tip of the finger touches the upper surface of the film 608, the projections 608a are depressed downward in accordance with the fingerprint pattern of the finger. As a result, the counter electrode 607 bends toward the sensor electrodes 605 at the corresponding portions. The c capacitances formed between the sensor electrodes 605 and the counter electrode 607 change at the bent portions. That is, when the finger is placed on the film 608, the capacitances at the respective sensor electrodes 605 change in accordance with the fingerprint pattern (recesses/projections). The respective capacitances having undergone changes are detected by the sense units 610.

When the processing means generates halftone data in accordance with the respective capacitances detected at the sensor electrodes 605, the fingerprint pattern can be reproduced. If, for example, 300×300 sensor electrodes 605 are arranged at 600-μm intervals, a 300×300 dot fingerprint image can be obtained with a resolution of about 250 dots/inch.

Although not shown in FIG. 6, an integrated circuit in which a storage section storing fingerprint data for collation, a recognition processing section for comparing/collating the fingerprint data stored in the storage section with a read fingerprint image, and the like are integrated is placed in another region on the semiconductor substrate. All these components may be arranged on the semiconductor substrate at a position below the sensor electrode 605. With this arrangement, the detected fingerprint pattern can be compared/collated with the fingerprint data stored in the storage section by the recognition processing section formed in the integrated circuit in a more compact state.

According to the surface shape recognition sensor of the second embodiment, as in the first embodiment, the finger is not used as one electrode when the fingerprint pattern is to be recognized. This suppresses damage to other integrated circuit portions formed below the electrodes due to static electricity.

In addition, according to the second embodiment, since the exposed surfaces of the sensor electrodes and support electrode are covered with the ruthenium films, deterioration of these electrode surfaces due to oxidation can be suppressed. Ruthenium oxide also exhibit conductivity and hence is generally used as a contact material. This material is suited for films for preventing oxidation of electrodes.

In the second embodiment as well, since the support electrode is formed into a matrix pattern, and the sensor electrodes are arranged in the central portions of the respective square portions, the spaces between the support electrodes and the respective sensor electrodes can be made equal to each other.

A method of fabricating a surface shape recognition sensor according to the second embodiment will be partly described next.

First of all, other integrated circuits such as the above sense units are formed on the semiconductor substrate. As shown in FIG. 7-A, the insulating film 601 made of silicon oxide is formed on the semiconductor substrate to cover these integrated circuits, and the aluminum interconnections 602a and 602b are formed on the insulating film 601. These interconnections 602a and 602b may be formed by forming an aluminum film and patterning it using a known photolithography technique. The interlevel dielectric film 603 is formed on the insulating film 601 to cover the interconnections 602a and 602b. Through holes 603a and 603b are formed in predetermined portions of the interlevel dielectric film 603 which are located above the interconnections 602a and 602b.

The barrier films 604 made of titanium nitride are formed to cover at least the upper surfaces of the interconnections 602a and 602b which are exposed on the bottom portions of the through holes 603a and 603b. The barrier films 604 may be formed as follows. First of all, a titanium nitride film is formed on the interlevel dielectric film 603, in which the through holes 603a and 603b are formed, by sputtering or the like. A resist pattern is then formed to cover the through hole formation portions by photolithography. The titanium nitride is selectively removed by dry etching such as RIE using this resist pattern as a mask. When the resist pattern is removed, the barrier films 604 are formed. Note that the barrier film 604 is not limited to a titanium nitride film. The barrier film 604 may be made of a conductive material other than titanium nitride, which is capable of restricting interdiffusion, e.g., chromium, tungsten, tantalum, or one of nitrides of these elements.

As shown in FIG. 7-B, a thin metal film 701 made of a two-layer film including a chromium layer having a thickness of 0.1 $\mu$m and a copper layer having a thickness of about 0.1 $\mu$m is formed on the interlevel dielectric film 603 including the barrier films 604. In this step, for example, the chromium layer may be formed by deposition, and the copper layer may be formed by sputtering. The formation of such a chromium film as a lower layer can suppress diffusion of copper and improve the adhesion characteristics with respect to copper. As described above, a metal that can suppress diffusion of copper and improve the adhesion characteristics with respect to an insulating material, e.g., titanium or nickel, may be used instead of chromium.

As shown in FIG. 7-C, a resist pattern 702 having an opening portion 702a in a predetermined region above each through hole 603a is formed on the thin metal film 701 to have a thickness of about 5 $\mu$m. A 0.3-$\mu$m thick copper film is formed on the upper surface of the thin metal film 701 which is exposed on the bottom portion of the opening portion 702a by an electroplating method using the thin metal film 701 as a cathode, thereby forming the upper electrode 605b. Note that the formation of this upper electrode 605b is not limited to electroplating.

After the resist pattern 702 is removed, a resist pattern 703 having a groove 703a surrounding the upper electrode 605b is formed to have a thickness of about 5 $\mu$m, as shown in FIG. 7-D. This groove 703a is the region in which the support electrode 606 is formed, as shown in FIG. 6. A copper film is grown on the surface of the thin metal film 701 which is exposed on the bottom portion of the groove 703a to a thickness of about 5 $\mu$m by the electroplating method using the thin metal film 701 as a cathode, thereby forming the electrode pillar 606b.

After the resist pattern 703 is removed, the exposed surface portions of the thin metal film 701 are etched, as shown in FIG. 7-E. In this etching, first of all, the upper copper layer may be removed by a wet etching process using an aqueous mixed acid solution made up of phosphoric acid, nitric acid, and acetic acid as an etchant. Then, the lower chromium layer may be removed by a wet etching process using a solution of potassium ferricyanide and sodium hydrooxide.

As a result of the above process, the matrix-like support electrode 606 is formed at a height of about 5 $\mu$m above the interlevel dielectric film 603. The sensor electrode 605 is formed in the central portion of each square portion of the matrix-like support electrode 606.

As shown in FIG. 7-F, the protective films 605c and 606c made of ruthenium are formed on the exposed surfaces of the sensor electrodes 605 and support electrode 606. These protective films can be formed by growing ruthenium films on only the upper surfaces of the electrodes made of copper to a thickness of about 0.1 $\mu$m by electroless plating.

As shown in FIG. 7-G, a sacrificial film 704 is formed to fill each square portion of the matrix-like support electrode 606. This sacrificial film 704 may be formed as follows. First of all, the interlevel dielectric film 603, on which the sensor electrode 605 and the support electrode 606 are formed, is coated with a polyimide material by spin coating or the like to form a polyimide film. As this polyimide material, for example, a polyimide resin containing a polybenzaoxazole precursor as a base is used.

With this coating, the upper surface of the polyimide film is planarized, absorbing the recesses/projections on the interlevel dielectric film 603 due to the support electrode 606 and the sensor electrode 605. After the polyimide film is formed by coating, the resultant structure is heated at about 310° C. to thermoset the polyimide film. When the thermoset polyimide film is etched back until the surface of the support electrode 606 is exposed, the sacrificial film 704 consisting of polyimide and having a flat surface can be formed to fill each square portion of the support electrode 606. This etching back step may be performing by dry etching using an oxygen gas plasma. Polyimide is an organic material and hence can be etched by using an oxygen gas plasma. Note that the etching back step may be performed by, for example, a chemical/mechanical polishing method.

As shown in FIG. 7-H, the counter electrode 607 is formed on the sacrificial film 704 and the support electrode 606. This counter electrode 607 is formed as follows. First of all, a chromium film having a thickness of about 0.2 $\mu$m is formed on the entire surface of the above structure by sputtering or the like. This film is then partly etched to from a plurality of fine holes to form the counter electrode 607 into a mesh pattern, as shown in the plan view of FIG. 3-I.

When the sacrificial film 704 is selectively etched by using a mixed gas plasma consisting of $CF_4$ and oxygen, the counter electrode 607 is formed to be supported by the support electrode 606 so as to have a predetermined space above the sensor electrode 605, as shown in FIG. 7-J.

When the film 608 having the projections 608a is bonded/fixed on the counter electrode 607, the surface shape recognition sensor of the second embodiment shown in FIG. 6 can be obtained. This film 608 can be formed by processing a film made of an organic material such as PTFE. The flat surface of the film 608 is coated with a film-like adhesive and is mounted and fixed on the counter electrode 607 with the adhesive-coated surface facing the counter electrode 607. The resultant structure is then heated at 150° C. for 10 min. As a result, the film 608 is bonded/fixed on the counter electrode 607.

According to the above description, the support electrode is formed in a matrix pattern. However, the present invention is not limited to this, and the support electrode may have any pattern as long as the resultant structure can support the counter electrode with a predetermined space being ensured above each sensor electrode.

Third Embodiment

A surface shape recognition sensor according to the third embodiment of the present invention will be described next. In this surface shape recognition sensor, as shown in FIG. 8, sensor electrodes 805, each 80 μm square, and a support electrode 806 are formed on an interlevel dielectric film 803 formed on an insulating film 801. In the second embodiment, these electrodes are made of gold.

Although not shown, the insulating film 801 is formed on a semiconductor substrate on which integrated circuits such as sense units and processing means (to be described later) are formed. The support electrode 806 is formed into a matrix pattern consisting of square portions each 100 μm square. The sensor electrode 805 is placed in the central portion of each square portion. The support electrode 806 has about 300×300 square portions. That is, 300×300 sensor electrodes 805 are arranged in the form of a matrix. These structures are the same as those in the second embodiment.

An aluminum interconnection 802a is formed on the insulating film 801 to be connected to the sensor electrode 805 through a barrier film 804 made of titanium nitride. The sensor electrode 805 is made up of a lower electrode 805a having a thickness of about 0.2 μm and an upper electrode 805b having a thickness of about 0.3 μm, which is formed on the lower electrode 805a. The lower electrode 805a is made of a two-layer film having chromium and gold layers each having a thickness of about 0.1 μm. The upper electrode 805b is made of gold. The formation of such a chromium film as a lower layer can improve the adhesion characteristics between the gold film and the interlevel dielectric film 803 formed thereunder. As in the second embodiment, a metal that improves the adhesion characteristics with respect to an insulating material, e.g., titanium or nickel, may be used instead of chromium.

Similarly, an aluminum interconnection 802b is formed on the insulating film 801 to be connected to the support electrode 806 through the barrier film 804. The electrode pillar 806b is also made up of a lower electrode 806a made of a two-layer film including chromium and gold films each having a thickness of about 0.1 μm and an electrode pillar 806b having a thickness of about 5 μm. As described above, in this embodiment, since gold that is noncorrosive is used, each electrode need not be covered with a protective film.

In the third embodiment as well, a counter electrode 807 is formed on almost the entire upper surface of the matrix-like support electrode 806 (protective film 806c). The counter electrode 807 bends downward at least at the central portion of each square portion of the support electrode 806. For convenience in fabricating (to be described later), the counter electrode 807 has a mesh pattern with holes each having a size smaller than that of the support electrode 806. A film 808 having projections 808a at the central portions of the respective square portions of the support electrode 806 is bonded/fixed on the counter electrode 807.

As in the above embodiments, a plurality of sense units are respectively connected to the sensor electrodes 805 and the support electrodes 806 through the interconnections 802a and 802b described above. These sense units detect the capacitances formed between the support electrodes 806 and the sensor electrodes 805 and output signals corresponding to the capacitances. The outputs from the respective sense units are processed by a processing means (not shown). This processing means converts the capacitances formed by the respective sensor electrodes 805 into halftone image data.

According to the surface shape recognition sensor having the above arrangement, when the tip of the finger touches the upper surface of the film 808, the projections 808a are depressed downward in accordance with the fingerprint pattern of the finger. As a result, the counter electrode 807 bends toward the sensor electrodes 805 at the corresponding portions. The capacitances formed between the sensor electrodes 805 and the counter electrode 807 change at the bent portions. That is, when the finger is placed on the film 808, the capacitances at the respective sensor electrodes 805 change in accordance with the fingerprint pattern (recesses/projections). The respective capacitances having undergone changes are detected by the sense units.

When the processing means generates halftone data in accordance with the respective capacitances detected at the sensor electrodes 805, the fingerprint pattern can be reproduced. If, for example, 300×300 sensor electrodes 805 are arranged at 100-μm intervals, a 300×300 dot fingerprint image can be obtained with a resolution of about 250 dots/inch.

Although not shown in FIG. 8, in the third embodiment as well, an integrated circuit in which a storage section storing fingerprint data for collation, a recognition processing section for comparing/collating the fingerprint data stored in the storage section with a read fingerprint image, and the like are integrated is placed in another region on the semiconductor substrate. All these components may be arranged on the semiconductor substrate at a position below the sensor electrode 805. With this arrangement, the detected fingerprint pattern can be compared/collated with the fingerprint data stored in the storage section by the recognition processing section formed in the integrated circuit in a more compact state.

According to the surface shape recognition sensor of the third embodiment as well, the finger is not used as one electrode when the fingerprint pattern is to be recognized. This suppresses damage to other integrated circuit portions formed below the electrodes due to static electricity.

In addition, according to the third embodiment, since the sensor electrodes and the support electrode are made of gold, the surfaces of these electrodes do not degrade due to oxidation. Furthermore, in the third embodiment as well, the support electrode is formed into the matrix pattern, and the sensor electrodes are arranged in the central portions of the respective square portions, the intervals between the support electrode and the respective sensor electrodes can be made equal to each other. Note that in the third embodiment as well, protective films made of ruthenium may be formed on the exposed surfaces of the sensor electrodes and support electrode.

A method of fabricating the surface shape recognition sensor according to the third embodiment will be partly described next.

Other integrated circuits such as the above sense units are formed on the semiconductor substrate. As shown in FIG. 9-A, then, the insulating film 801 made of silicon oxide is formed on the semiconductor substrate to cover these integrated circuits. The aluminum interconnections 802a and 802b are formed on the insulating film 801. These interconnections 802a and 802b may be formed by forming an aluminum film and patterning it by a known photolithography technique. The interlevel dielectric film 803 is formed on the insulating film 801 to cover the interconnections 802a and 802b. Through holes 803a and 803b are formed in predetermined portions of the interlevel dielectric film 803 which are located above the interconnections 802a and 802b.

The barrier films 804 made of titanium nitride are formed to cover at least the surfaces of the interconnections 802a and 802b which are exposed on the bottom portions of the through holes 803a and 803b. The barrier films 804 may be formed as follows. First of all, a titanium nitride film is formed on the interlevel dielectric film 803, in which the through holes 803a and 803b are formed, by sputtering or the like. A resist pattern is then formed to cover the through hole formation portions. The titanium nitride film is selectively removed by dry etching such as RIE using this resist pattern as a mask. The resist pattern is then removed. As a result, the barrier films 804 are formed. Note that the barrier film 804 is not limited to titanium nitride. The barrier film 804 may be made of a conductive material other than titanium nitride, which is capable of restricting interdiffusion, e.g., chromium, tungsten, or one of nitrides of these elements.

As shown in FIG. 9-B, a thin metal film 901 having a two-layer structure made up of chromium and gold layers is formed on the interlevel dielectric film 803 including the barrier film 804 to have a thickness of about 0.2 µm by deposition. The formation of the chromium film as the lower layer can suppress diffusion of gold and improve the adhesion characteristics with respect to the interlevel dielectric film 803. As described above, a metal that can suppress diffusion of gold and improve the adhesion characteristics, e.g., titanium or nickel, may be used instead of chromium.

As shown in FIG. 9-C, a resist pattern 902 having an opening portion 902a in a predetermined region above the through hole 803a is formed on the thin metal film 901 to have a thickness of about 5 µm. A 0.3-µm thick gold film is formed on the surface of the resist pattern 902 which is exposed on the bottom portion of the opening portion 902a by an electroplating method using the thin metal film 901 as a cathode, thereby forming the upper electrode 805b. The formation of the upper electrode 805b is not limited to the electroplating method.

After the resist pattern 902 is removed, a resist pattern 903 having a groove 903a surrounding the upper electrode 805b is formed, as shown in FIG. 9-D. This groove 903a is the region in which the support electrode 806 in FIG. 8 is formed. A 5-µm thick gold film is grown on the surface of the thin metal film 901 which is exposed on the bottom portion of the groove 903a so as to fill the groove 903a by the electroplating method using the thin metal film 901 as a cathode, thereby forming the electrode pillar 806b.

After the resist pattern 903 is removed, the exposed surface portions of the thin metal film 901 are removed by etching. In this etching, first of all, the upper gold layer may be removed by a wet etching process using a solution mixture of iodine, ammonium iodide, and ethanol as an etchant. In this case, the etching rate is about 0.5 µm/min. Then, the lower chromium layer may be removed by a wet etching process using an aqueous solution of potassium ferricyanide and sodium hydrooxide.

As a result of the above process, the support electrode 806 is formed in a matrix pattern at a height of about 5 µm above the interlevel dielectric film 803. The sensor electrode 805 is formed in the central portion of each square portion of the matrix-like support electrode 806.

As shown in FIG. 9-F, a sacrificial film 904 is formed to fill each square portion of the matrix-like support electrode 806. This sacrificial film 904 may be formed as follows. First of all, the upper surface of the interlevel dielectric film 803, on which the sensor electrode 805 and the support electrode 806 are formed, is coated with a polyimide material by spin coating to form a polyimide film. As this polyimide material, for example, a polyimide resin containing a polybenzoxazole precursor as a base is used. With this coating, the upper surface of the polyimide film is planarized, absorbing the recesses/projections on the interlevel dielectric film 803 due to the support electrode 806 and the sensor electrode 805.

After the polyimide film is formed by coating, the resultant structure is heated at about 310° C. to thermoset the polyimide film. When the thermoset polyimide film is etched back until the surface of the support electrode 806 is exposed, the sacrificial film 904 consisting of polyimide and having a flat surface can be formed to fill each square portion of the support electrode 806. This etching back step may be performing by dry etching using an oxygen gas plasma. Polyimide is an organic material and hence can be etched by using an oxygen gas plasma. Note that the etching back step may be performed by, for example, a chemical/mechanical polishing method. As described above, since the sensor electrodes 805 and the support electrode 806 are made of gold, excellent adhesion characteristics can be obtained with respect to the polyimide resin film. Even if, therefore, polishing is performed by the chemical/mechanical polishing method, the formed resin film does not peel off.

As shown in FIG. 9-G, the counter electrode 807 is formed on the sacrificial film 904 and the support electrode 806. This counter electrode 807 is processed into a mesh pattern as follows. First of all, a chromium film having a thickness of about 0.2 µm is formed on the entire surface of the above structure by sputtering or the like. This film is then partly etched to form a plurality of fine holes.

When the sacrificial film 904 is selectively etched by using a mixed gas of CF$_4$ and oxygen, the counter electrode 807 is formed to be supported by the support electrode 806 and have a predetermined space above the sensor electrode 805, as shown in FIG. 9-H.

As in the first and second embodiments described above, when the film 808 having the projections 808a is boned/fixed on the counter electrode 807, the surface shape recognition sensor of the third embodiment in FIG. 8 is obtained. This film 808 can be formed by processing a film made of an organic material having thermoplasticity, e.g., PTFE. The flat surface of the film 808 is coated with a film-like adhesive and is mounted and fixed on the counter electrode 807 with the adhesive-coated surface facing the counter electrode 807. The resultant structure is then heated at 150° C. for 10 min. As a result, the film 808 is bonded/fixed on the counter electrode 807.

According to the above description, the support electrode is formed in a matrix pattern. However, the present invention is not limited to this, and the support electrode may have any pattern as long as the resultant structure can support the counter electrode with a predetermined space being ensured above each sensor electrode.

Fourth Embodiment

Figure 10:
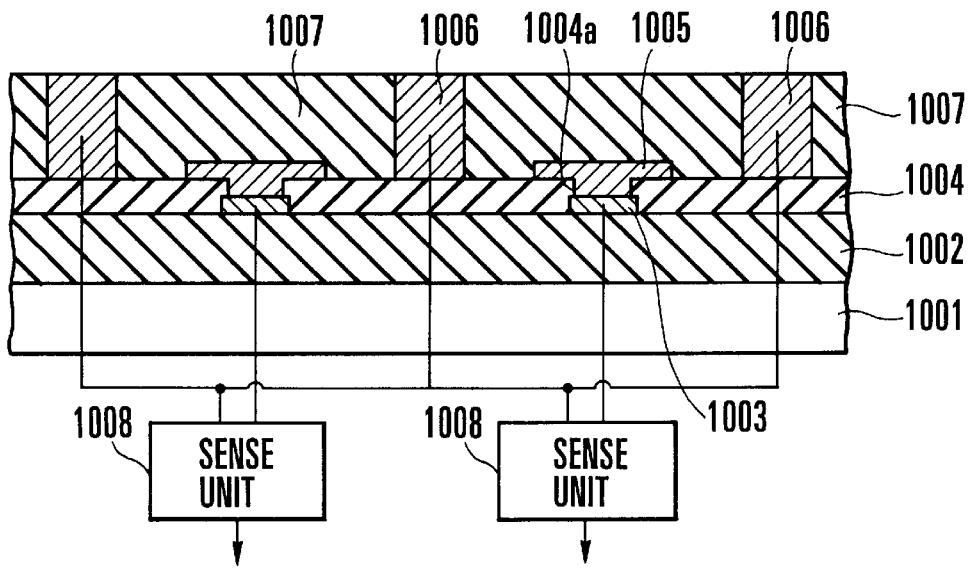
FIG. 10 is a sectional view showing the arrangement of one capacitance detection element of a surface shape recognition sensor according to the fourth embodiment of the present invention.
Figure 11A:
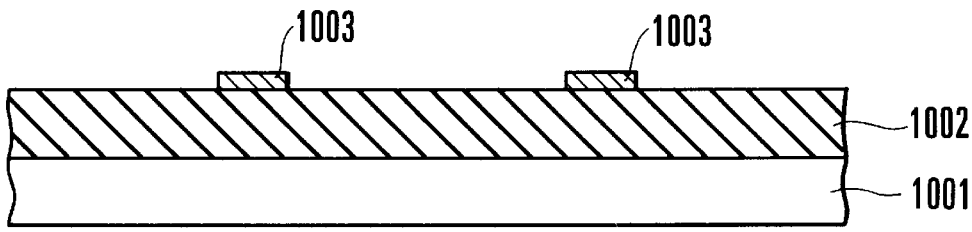
FIGS. 11-A to 11-F are sectional views showing the steps in a process of fabricating the surface shape recognition sensor according to the fourth embodiment of the present invention.
Figure 11B:
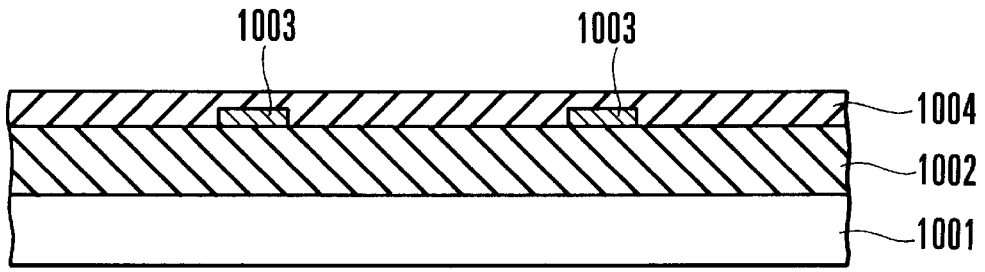
Figure 11C:
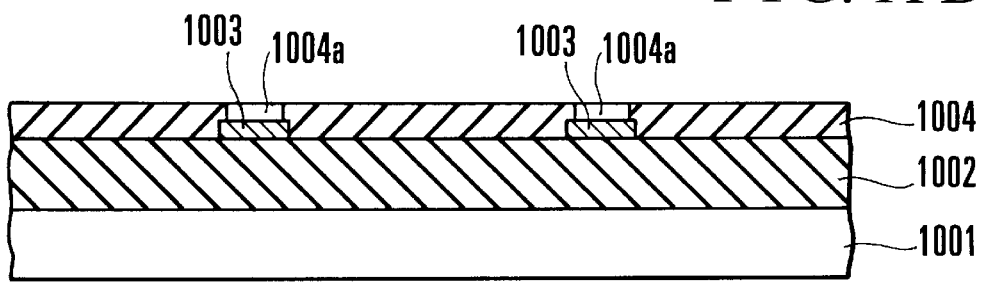
Figure 11D:
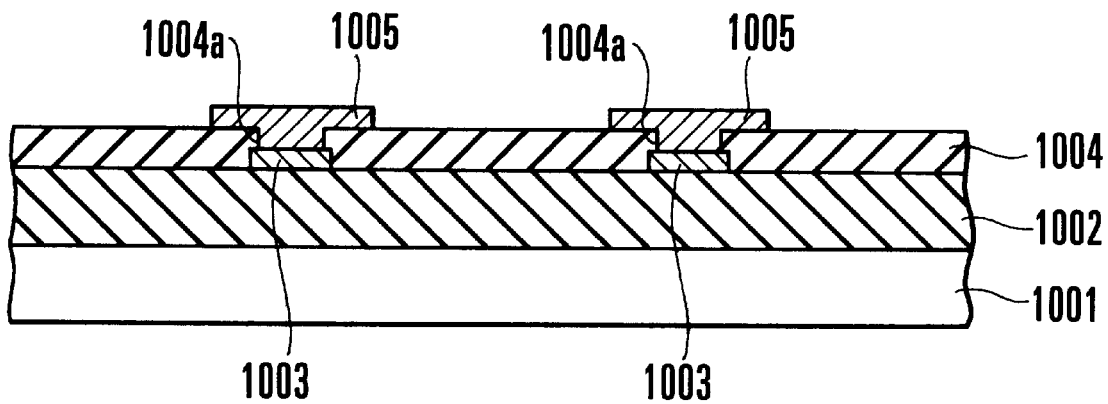
Figure 11E:
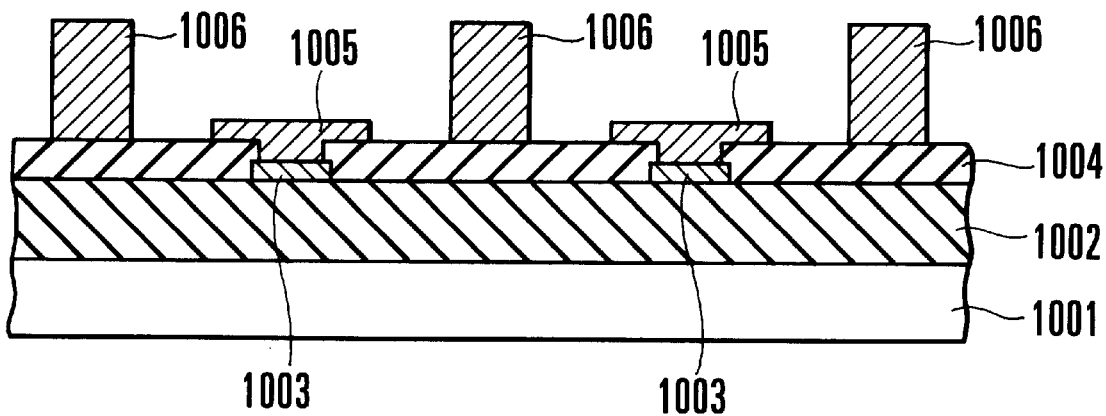
Figure 11F:
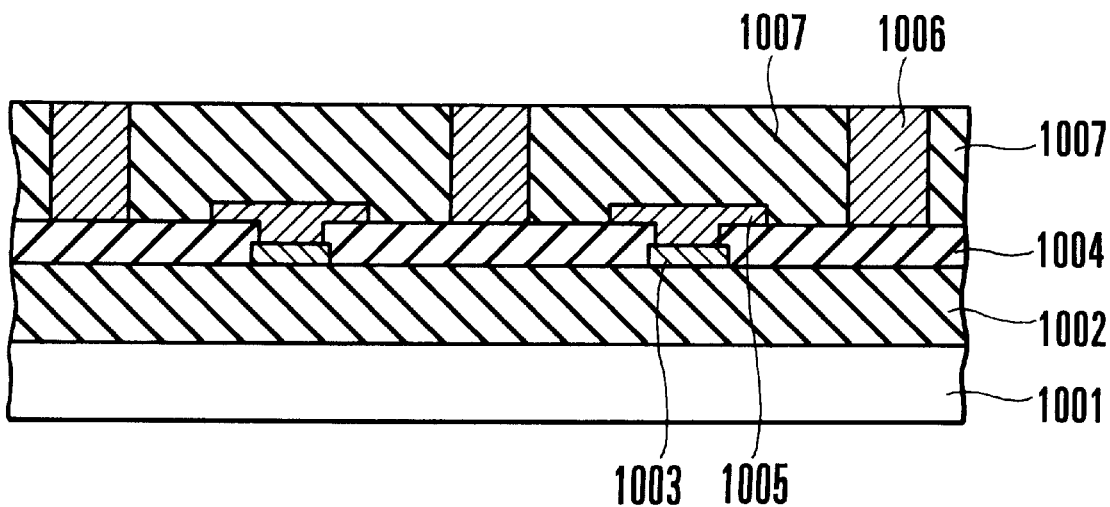

A surface shape recognition sensor according to the fourth embodiment of the present invention will be described next. FIG. 10 shows a structure corresponding to two sensor elements of the surface shape recognition sensor. This structure has sensor electrodes 1005, each 80 µm square, and ground electrodes 1006 on an interlevel dielectric film 1004 formed on a lower insulating film 1002 on a semiconductor substrate 1001. A case wherein one sensor electrode 1005 is prepared for one sensor element will be described. An interconnection (first interconnection) 1003 connected to the sensor electrode 1005 via a through hole (first through hole) 1004a is formed on the lower insulating film 1002. Although not shown in FIG. 10, interconnections (second interconnections) connected to the ground electrodes 1006 are formed on the lower insulating film 1002. These interconnections are also connected to the ground electrodes 1006 via through holes (second through holes) formed in the interlevel dielectric film 1004. A passivation film 1007 is formed to cover the sensor electrodes 1005. The upper portions of the ground electrodes 1006 are exposed on the upper surface of the passivation film 1007.

In this case, a plurality of sensor electrodes 1005, i.e., sensor elements, are arranged at 100-μm intervals. The passivation film 1007 is made of an insulating material having a relative dielectric constant of about 4.0, e.g., silicon oxide. The thickness of this film on the sensor electrode 1005 is about 5 μm.

A sense unit 1008 is formed on the semiconductor substrate 1001 at a position below each sensor element. The sense unit 1008 is connected to the ground electrodes 1006 and the sensor electrode 1005 through the above interconnection 1003 and the like. The sense unit 1008 detects the capacitance formed between the ground electrodes 1006 and the sensor electrode 1005. The output from each sense unit 1008 is processed by a processing means (not shown). This processing means converts the capacitances formed in the respective sensor electrodes 1005 into halftone image data. Note that one sense unit 1008 need not be formed at a position below each sensor element, but may be formed for a plurality of sensor elements. In addition, the sense units may be formed in other regions on the semiconductor substrate 1001, together with the processing means described above. This processing means may be placed below the sensor elements, together with the sense units. These sense units 1008 and processing means need not be integrated into a monolithic structure on the semiconductor substrate 1001. It is, however, preferable that the sensor electrodes 1005, the sense units 1008, and the processing means be arranged as near as possible.

According to the surface shape recognition sensor having the above arrangement, when the tip of the finger touches the upper surface of the passivation film 1007, ridges on the skin of the finger touch the upper portions of the ground electrodes 1006. Since the width of a ridge on the skin of the human finger is about 200 to 300 μm, ridges on the skin always touch the ground electrodes 1006 arranged at 100-μm intervals. As a result, the potential of each ridge on the skin of the fingertip placed on the passivation film 1007 becomes the same as that of the corresponding ground electrode 1006. Capacitances are therefore formed between the respective ridges on the skin of the fingertip and the sensor electrodes 1005 and are detected by the sense units 1008.

In this case, ridges on the skin of the fingertip placed on the passivation film 1007 are in contact with the passivation film 1007, whereas the valleys on the skin are separated from the passivation film 1007. A distance d1 between the surface of a ridge on the skin and the underlying sensor electrode 1005 therefore differs from a distance d2 between the surface of a valley on the skin and the underlying sensor electrode 1005, and more specifically, d1<d2. A capacitance C1 between the surface of the ridge on the skin and the underlying sensor electrode 1005 differs from a capacitance C2 between the surface of the valley on the skin and the underlying sensor electrode 1005. Consequently, different capacitances are detected between the sensor electrode 1005 below the ridge on the skin and the ground electrode 1006 and between the sensor electrode 1005 below the valley on the skin and the ground electrode 1006.

For example, in the above arrangement, the capacitance C1 is about 43 fF. Since the depth of a valley on the skin is about 100 μm, the capacitance C2 is about 2.3 fF. If the respective sensor electrodes 1005 are arranged in the form of a matrix, capacitances corresponding to the ridges/valleys on the skin can be detected in accordance with the arrangement of the sensor electrodes 1005. When the processing means generates halftone data in accordance with the respective capacitances detected at the sensor electrodes 1005, the fingerprint pattern can be reproduced. If, for example, 300×300 sensor electrodes are arranged at 100-μm intervals in the form of a matrix, a 300×300 dot fingerprint image can be obtained with a resolution of about 250 dots/inch.

Although not shown in FIG. 10, an integrated circuit in which a storage section storing fingerprint data for collation, a recognition processing section for comparing/collating the fingerprint data stored in the storage section with a read fingerprint image, and the like are integrated is placed in another region on the semiconductor substrate 1001. All these components may be arranged on the semiconductor substrate 1001 at a position below the sensor electrode 1005. With this arrangement, the detected fingerprint pattern can be compared/collated with the fingerprint data stored in the storage section by the recognition processing section formed in the integrated circuit in a more compact state.

According to the surface shape recognition sensor of the fourth embodiment, when, for example, a fingerprint pattern is to be recognized, a portion of the finger touches ground electrodes. As a result, static electricity is generated on the surface of the surface shape recognition sensor. However, the static electricity flows to the ground electrodes. This suppresses damage to other integrated circuit portions formed below the ground electrodes due to the static electricity.

A method of fabricating the surface shape recognition sensor according to the fourth embodiment will be described next partly and briefly.

First of all, other integrated circuits such as the above sense units are formed on the semiconductor substrate 1001. Then, as shown in FIG. 11-A, the lower insulating film 1002 is formed on the semiconductor substrate 1001 to cover these integrated circuits. The interconnections 1003 are formed on the lower insulating film 1002. Although not shown, interconnections to be connected to the ground electrodes 1006 (to be described later) are formed at the same time.

As shown in FIG. 11-B, the interlevel dielectric film 1004 is formed on the lower insulating film 1002 to cover the interconnections 1003. As shown in FIG. 11-C, the through holes 1004a are formed in predetermined portions of the interlevel dielectric film 1004 above the interconnections 1003. Although not shown, through holes are formed in portions corresponding to interconnections connected to the ground electrodes 1006 (to be described later) at the same time.

As shown in FIG. 11-D, the sensor electrodes 1005 connected to the interconnections 1003 via the through holes 1004a are formed on the interlevel dielectric film 1004.

As shown in FIG. 11-E, the ground electrodes 1006, each thicker than the sensor electrode 1005, are formed on the interlevel dielectric film 1004 to be spaced apart from the sensor electrodes 1005. The ground electrodes 1006 are connected to the corresponding interconnections (not shown) formed on the lower insulating film 1002 via through holes (not shown) formed in the interlevel dielectric film 1004.

As shown in FIG. 11-F, the passivation film 1007 is formed to fill the recess portions formed by the ground electrodes 1006 and cover the sensor electrodes 1005. At this time, the upper portions of the ground electrodes 1006 are exposed on the upper surface of the passivation film 1007.

With the above process, the electrode portion of the surface shape recognition sensor of the fourth embodiment shown in FIG. 10 can be formed.

Fifth Embodiment

Figure 12A:
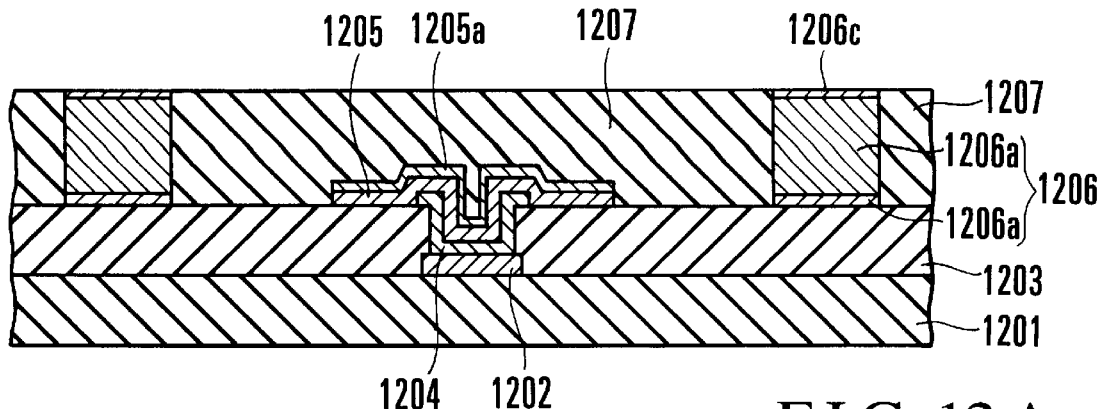
FIGS. 12-A and 12-B are sectional views showing the arrangement of a surface shape recognition sensor according to the fifth embodiment of the present invention.
Figure 12B:
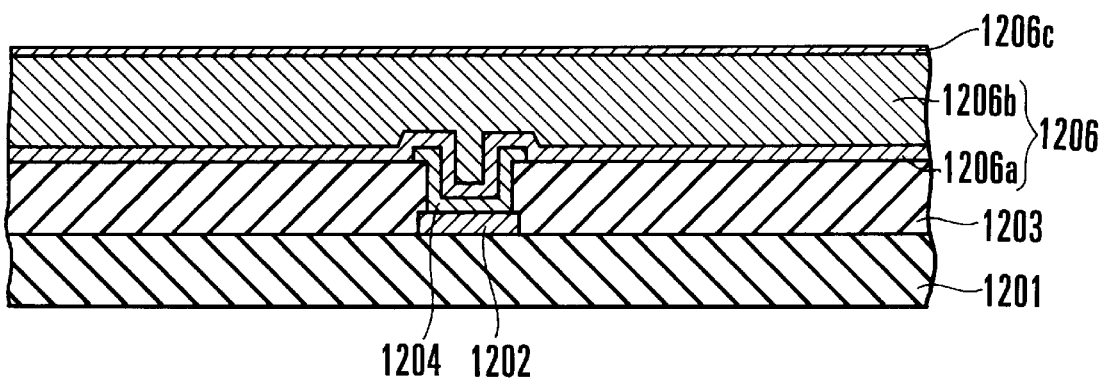
Figure 12C:
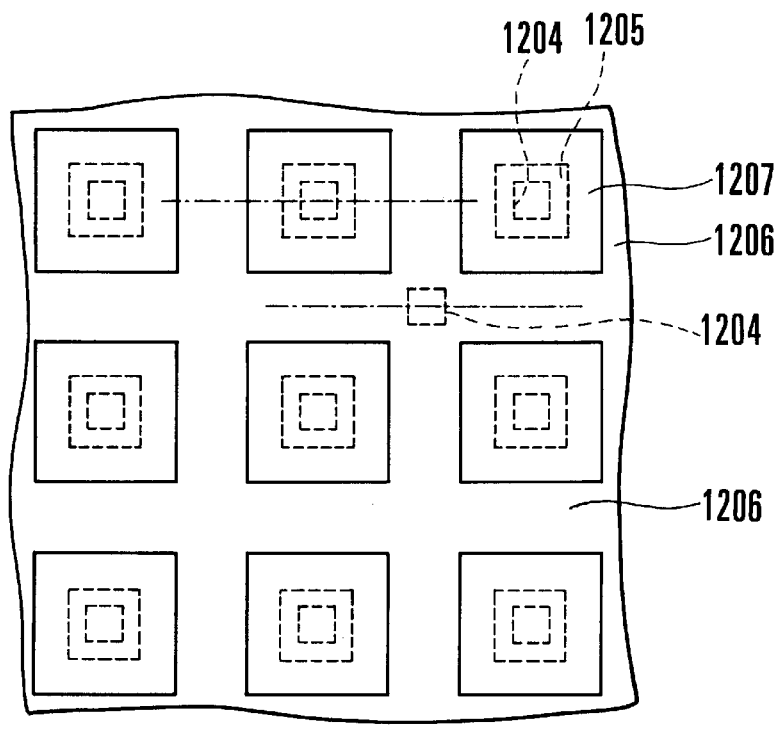

A surface shape recognition sensor according to the fifth embodiment of the present invention will be described next. FIGS. 12-A, 12-B, and 12-C show the arrangement of the surface shape recognition sensor of the fifth embodiment. FIGS. 12-A and 12-B are sectional views, and FIG. 12-C is a plan view. A sectional view taken along a line A–A' in FIG. 12-C corresponds to FIG. 12-A. A sectional view taken along a line B—B' in FIG. 12-C corresponds to FIG. 12-B.

In the fifth embodiment, first of all, sensor electrodes 1205, each 80 μm square, and a ground electrode 1206 are formed on an interlevel dielectric film 1203 formed on an insulating film 1201 on a semiconductor substrate (not shown). A case wherein one sensor electrode 1205 is formed for one sensor element will be described below. FIG. 12-A shows one sensor element of the surface shape recognition sensor of the fifth embodiment.

The sensor electrode 1205 is connected to an aluminum interconnection 1202 formed on the insulating film 1201 through a barrier film 1204 made of titanium nitride. Note that an aluminum interconnection 1202a is also formed on the insulating film 1201 and is connected to a ground electrode 1206 through the barrier film 1204, as shown in FIG. 12-B.

In this case, the ground electrode 1206 is made up of a lower electrode 1206a made of copper and an electrode pillar 1206b made of copper and formed on the lower electrode 1206a. A protective film 1206c made of gold is formed on the upper surface of the ground electrode 1206. A protective film 1205a made of gold is also formed on the upper surface of each sensor electrode 1205.

A passivation film 1207 made of, for example, silicon oxide is formed to cover each sensor electrode 1205, and each upper portion of the ground electrode 1206 is exposed on the upper surface of the passivation film 1207.

As shown in FIG. 12-C, the ground electrode 1206 is formed in a matrix pattern having square portions arranged at 100-μm intervals. The sensor electrodes 1205 are arranged in the central portions of the respective square portions at 100-μm intervals. In the fifth embodiment, therefore, one square portion of the matrix pattern forms one sensor element. FIG. 12-C shows a state in which nine sensor elements are arranged in the form of a matrix. The passivation film 1207 is made of an insulating material having a relative dielectric constant of about 4.0. This film is formed to fill the portions between the square portions of the matrix pattern of the ground electrode 1206 and have a thickness of about 5 μm on each sensor electrode 1205.

Although not shown, sense units are formed on the semiconductor substrate at positions below the respective sensor elements. These sense units are respectively connected to the ground electrode 1206 and the sensor electrodes 1205 through the interconnections 1202 and the like. The sense units detect the capacitances formed between the ground electrode 1206 and the respective sensor electrodes 1205 and output signals corresponding to the capacitances.

The output from each sense unit 1208 is processed by a processing means (not shown). This processing means converts the capacitances formed in the respective sensor electrodes 1205 into halftone image data. Note that these sense units and processing means need not be arranged on the semiconductor substrate (not shown) at positions below the sensor electrode s1205, but may be arranged on other regions of the semiconductor substrate.

According to the surface shape recognition sensor having the above arrangement, as in the fourth embodiment, when the tip of the finger touches the upper surface of the passivation film 1207, ridges on the skin of the finger touch the upper portions of the ground electrode 1206. Since the width of a ridge on the skin of the human finger is about 200 t0 300 μm, ridges on the skin always touch the ground electrodes 1206 formed into a matrix pattern having square portions arranged at 100-μm intervals. As a result, the potential of each ridge on the skin of the fingertip placed on the passivation film 1207 becomes the same as that of the ground electrode 1206. Capacitances are therefore formed between the respective ridges on the skin of the fingertip and the sensor electrodes 1205 and are detected by the sense units 1208.

In this case, ridges on the skin of the fingertip placed on the passivation film 1207 are in contact with the passivation film 1207, whereas the valleys on the skin are separated from the passivation film 1207. A distance d1 between the surface of a ridge on the skin and the underlying sensor electrode 1205 therefore differs from a distance d2 between the surface of a valley on the skin and the underlying sensor electrode 1205, and more specifically, d1<d2. A capacitance C1 between the surface of the ridge on the skin and the underlying sensor electrode 1205 differs from a capacitance C2 between the surface of the valley on the skin and the underlying sensor electrode 1205. Consequently, different capacitances are detected between the sensor electrode 1205 below the ridge on the skin and the ground electrode 1206 and between the sensor electrode 1205 below the valley on the skin and the ground electrode 1206.

For example, in the above arrangement, the capacitance C1 is about 43 fF. Since the depth of a valley on the skin is about 100 μm, the capacitance C2 is about 2.3 fF. If the respective sensor electrodes 1205 are arranged in the form of a matrix, capacitances corresponding to the ridges/valleys on the skin can be detected in accordance with the arrangement of the sensor electrodes 1205. When the processing means generates halftone data in accordance with the respective capacitances detected at the sensor electrodes 1205, the fingerprint pattern can be reproduced. If, for example, 300×300 sensor electrodes are arranged at 100-μm intervals in the form of a matrix, a 300×300 dot fingerprint image can be obtained with a resolution of about 250 dots/inch.

Although not shown in FIGS. 12-A to 12-C, an integrated circuit in which a storage section storing fingerprint data for collation, a recognition processing section for comparing/collating the fingerprint data stored in the storage section with a read fingerprint image, and the like are integrated is placed in another region on the semiconductor substrate. All these components may be arranged on the semiconductor substrate at a position below the sensor electrode 1205. With this arrangement, the detected fingerprint pattern can be compared/collated with the fingerprint data stored in the storage section by the recognition processing section formed in the integrated circuit in a more compact state.

According to the surface shape recognition sensor of the fifth embodiment, when, for example, a fingerprint pattern is to be recognized, a portion of the finger touches ground electrodes. As a result, static electricity is generated on the surface of the surface shape recognition sensor. However, the static electricity flows to the ground electrodes. This suppresses damage to other integrated circuit portions formed below the ground electrodes due to the static electricity.

In addition, according to the fifth embodiment, the exposed surface portions of the ground electrode are coated with gold to suppress the formation of oxide films on the contact surfaces of the ground electrode. Furthermore, according to the fifth embodiment, since the ground electrode is formed in a matrix pattern, and the sensor electrodes are formed in the central portions of the respective square portions, the distances between the ground electrode and the respective sensor electrodes are made equal to each other.

A method of fabricating the surface shape recognition sensor according to the fifth embodiment will be partly described next.

Figure 13:
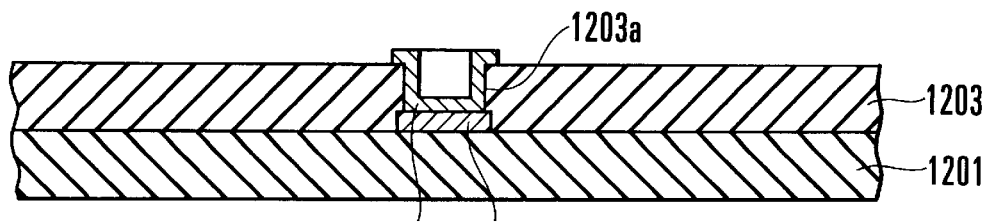
FIGS. 13-A to 13-I are views showing the steps in a process of fabricating the surface shape recognition sensor according to the fifth embodiment of the present invention.
Figure 13:
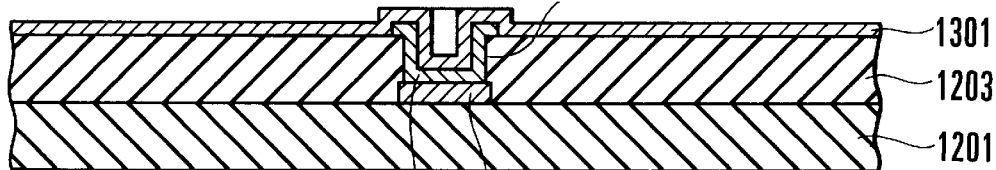
Figure 13:
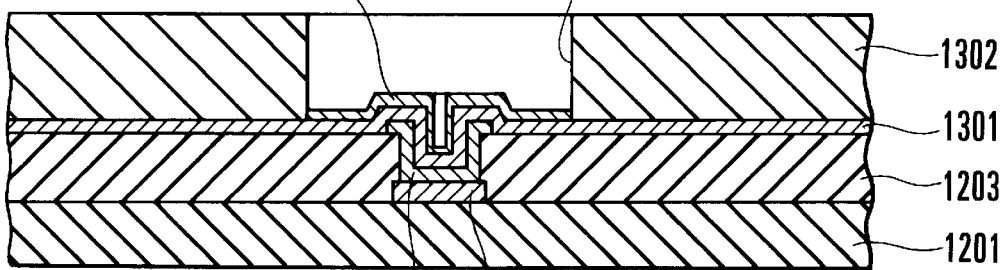
Figure 13:
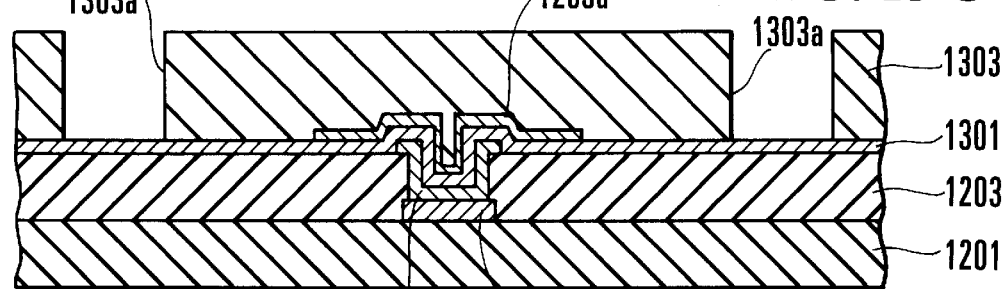
Figure 13:
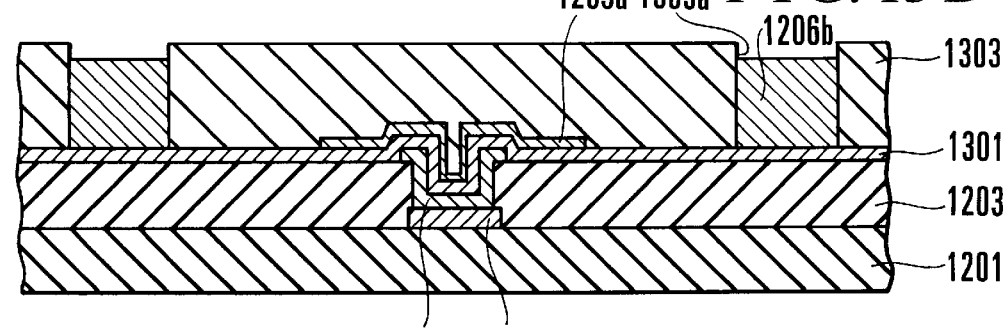
Figure 13:
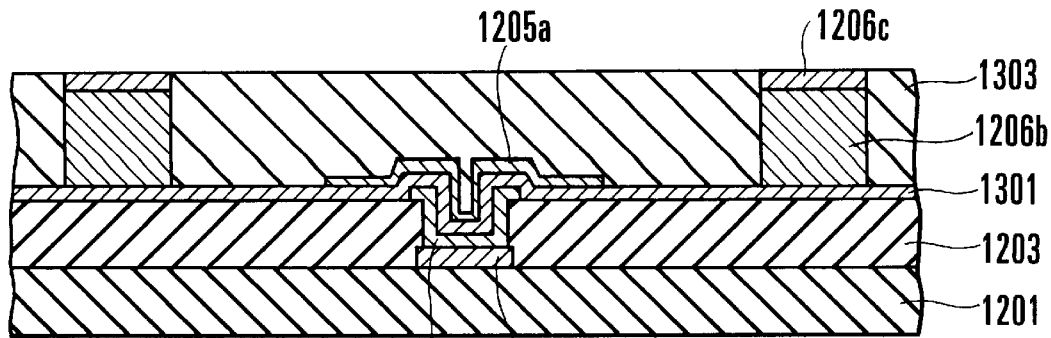
Figure 13:
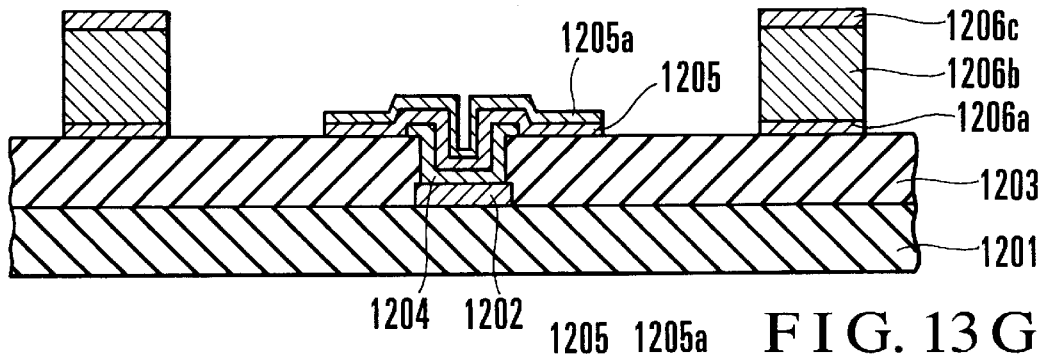
Figure 13:
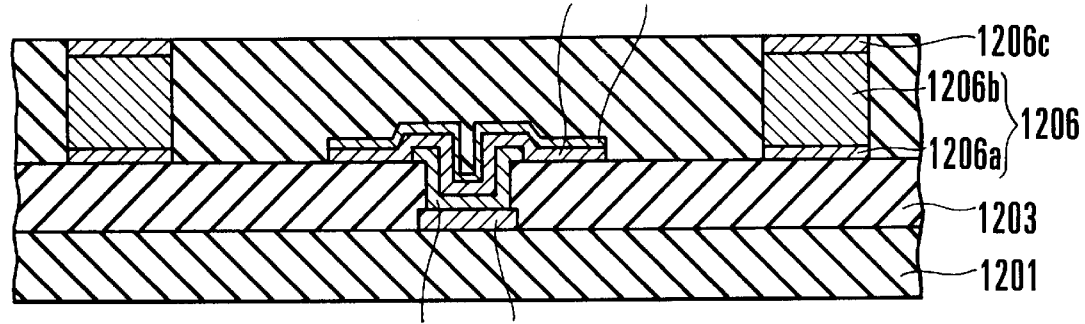
Figure 13:
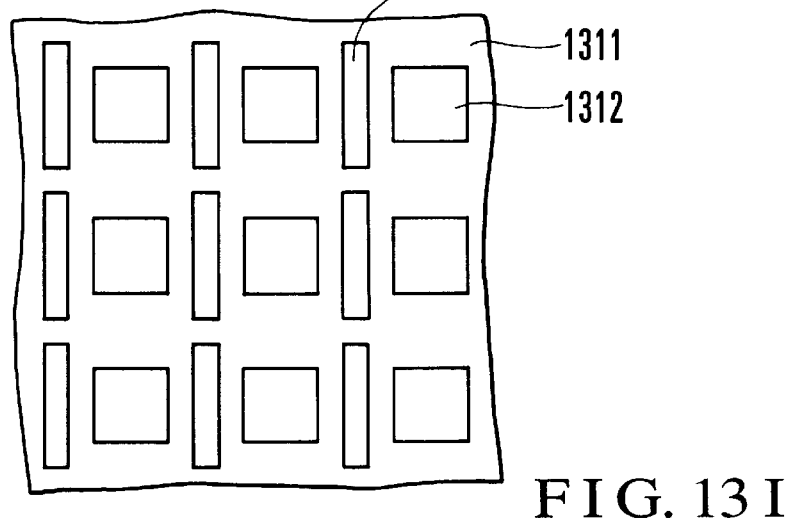

First of all, other integrated circuits such as the sense units described above are formed on the semiconductor substrate. Then, as shown in FIG. 13-A, the insulating film 1201 made of silicon oxide is formed on the semiconductor substrate to cover these integrated circuits. The aluminum interconnection 1202 is formed on the insulating film 1201. This interconnection 1202 may be formed by forming an aluminum film and pattering it by a known photolithography technique. The interlevel dielectric film 1203 is formed on the insulating film 1201 to cover the interconnection 1202. A through hole 1203a is formed in a predetermined portion of the interlevel dielectric film 1203 above the interconnection 1202.

The barrier film 1204 made of titanium nitride is formed to cover at least the surface portion of the interconnection 1202 which is exposed on the bottom portion of the through hole 1203a. This barrier film 1204 may be formed as follows. First of all, a titanium nitride film is formed on the interlevel dielectric film 1203, in which the through hole 1203a is formed, by sputtering or the like. A resist pattern is then formed to cover the through hole formation portion by photolithography. The titanium nitride film is selectively removed by dry etching such as RIE using this resist pattern as a mask. The resist pattern is then removed. As a result, the barrier film 1204 is formed. Note that the material for the barrier film 1204 is not limited to titanium nitride. Another conductive material that can suppress interdiffusion may be used for the barrier film 1204.

As shown in FIG. 13-B, a thin metal film 1301 consisting of copper and having a thickness of about 0.1 $\mu$m is formed on the interlevel dielectric film 1203 including the barrier film 1204. This film may be formed by sputtering.

As shown in FIG. 13-C, a resist pattern 1302 having an opening portion 1302a in a predetermined region above the through hole 1203a is formed on the thin metal film 1301. A 0.3-$\mu$m thick copper film and a 0.2-$\mu$m thick gold film are formed on the upper surface of the thin metal film 1301 which is exposed on the bottom portion of the opening portion 1302a by an electroplating method using the thin metal film 1301 as a cathode, thereby forming the protective film 1205a. The formation of this protective film 1205a is not limited to electroplating.

After the resist pattern 1302 is removed, a resist pattern 1303 having a groove 1303a surrounding the protective film 1205a is formed, as shown in FIG. 13-D. Note that this groove 1303a is formed such that a portion above the barrier film 1204 connected to the interconnection 1202a in FIG. 12-B is open.

As shown in FIG. 13-E, a copper film is grown to a thickness of about 5 $\mu$m on the upper surface of the thin metal film 1301 which is exposed on the bottom portion of the groove 1303a by the electroplating method using the thin metal film 1301 as a cathode, thereby forming the electrode pillar 1206b. Similarly, as shown in FIG. 13-F, a gold film is grown on the upper surface of the electrode pillar 1206b to a thickness of about 0.1 $\mu$m by electroplating to form the protective film 1206c. Note that, for example, the formation of the electrode pillar 1206b is not limited to electroplating, and electroless plating may be used.

After the resist pattern 1303 is removed, the thin metal film 1301 is selectively etched by using the protective films 1205a and 1206c as masks, as shown in FIG. 13-G. This etching may be performed by a wet etching process using an aqueous mixed acid solution made up of phosphoric acid, nitric acid, and acetic acid as an etchant.

As a result of the above process, the ground electrode 1206 is formed in a matrix pattern on the interlevel dielectric film 1203, and the sensor electrodes 1205 are formed in the central portions of the respective square portions of the ground electrode 1206.

As shown in FIG. 13-H, the passivation film 1207 is formed to fill the square portions of the ground electrode 1206. This passivation film 1207 may be formed as follows. First of all, the upper surface of the interlevel dielectric film 1203, on which the sensor electrodes 1205 and the ground electrode 1206 are formed, is coated with an SOG material by spin coating or the like to form an SOG film.

To form the SOG film thick, coating of the SOG material is performed three times. With this coating, the upper surface of the SOG film is planarized, absorbing recesses/ projections on the interlevel dielectric film 1203 due to the ground electrode 1206 and the sensor electrodes 1205. After the SOG film is formed by this coating, the resultant structure is heated at about 300° C. to transform the coating into a silicon oxide film. When the SOG film is etched back until the upper surface of the ground electrode 1206 is exposed, the passivation film 1207 having a flat upper surface can be formed to fill the respective square portions of the ground electrode 1206.

With the above process, the electrode portion of the surface shape recognition sensor of the fifth embodiment shown in FIGS. 12-A, 12-B, and 12-C can be formed.

Note that the passivation film 1207 need not be formed in the above manner. This film may be made of an insulating material and formed to have a flat upper surface, as shown in FIG. 13-H. Therefore, the passivation film 1207 having a flat upper surface may be formed by deposing a silicon oxide film to cover the ground electrode 1206 and cutting/ polishing the film by a chemical/mechanical polishing method until the upper surface of the ground electrode 1206 is exposed.

According to the above description, the ground electrode is formed into a matrix pattern. However, the present invention is not limited to this. For example, as shown in a plan view of FIG. 13-I, a plurality of ground electrodes 1313 may be formed such that each ground electrode is placed on one side of each sensor electrode 1312 buried in a passivation film 1311, and the ground electrodes are separated from each other on the upper surface of the passivation film 1311. Note that the ground electrodes 1313 are connected to each other through a lower interconnection layer and set at the same potential.

A pair of ground electrodes whose upper surfaces are exposed need not be formed near each sensor electrode, but one ground electrode may be formed for a plurality of sensor electrodes.

If, however, the ground electrode is formed into a matrix pattern, and sensor electrodes are arranged in the central portions of the respective square portions as in the fifth embodiment, the spaces between the respective sensor electrodes arranged in the form of a matrix and the ground electrode can be made equal.

Sixth Embodiment

A surface shape recognition sensor according to the sixth embodiment of the present invention will be described next.

In the sixth embodiment, as shown in FIG. 14, first of all, a sensor electrode 1405 80 $\mu$m square and a ground electrode (stationary electrode) 1406 are formed on an interlevel dielectric film 1403 formed on an insulating film 1401.

Although not shown, the insulating film 1401 is formed on a semiconductor substrate on which integrated circuits such as sense units and a processing means are formed. The ground electrode 1406 is formed into a matrix pattern having square portions each 100 $\mu$m square. The sensor electrodes 1405 are arranged in the central portions of the respective square portions. The ground electrode 1406 has about 300× 300 square portions, and hence 300×300 sensor electrodes 1405 are arranged in the form of a matrix.

An aluminum interconnection 1402a connected to the sensor electrode 1405 through a barrier film 1404 made of titanium nitride is formed on the insulating film 1401. The sensor electrode 1405 is made up of a lower electrode 1405a having a two-layer structure including chromium and copper layers each having a thickness of about 0.1 $\mu$m and an upper electrode 1405b having a thickness of about 0.3 $\mu$m, which is formed on the lower electrode 1405a. Note that the upper electrode 1405b is made of copper.

Similarly, an aluminum interconnection 1402b connected to the ground electrode 1406 through the barrier film 1404 made of titanium nitride is formed on the insulating film 1401. The ground electrode 1406 is also made up of a lower electrode 1406a having two-layer structure including chromium and copper layers and an electrode pillar 1406b consisting of copper and having a thickness of about 5 $\mu$m, which is formed on the lower electrode 1406a. As in the second embodiment, a metal used for the lower layer of each of the lower electrodes 1405a and 1406a is not limited to chromium. For example, other metals such as titanium and nickel may be used, which can suppress diffusion of copper and improve the adhesion characteristics with respect to an insulating material.

Protective films 1405c and 1406c made of ruthenium are formed to cover the upper and side surfaces of the sensor electrode 1405 and ground electrode 1406.

A passivation film 1407 made of polyimide is formed to cover the sensor electrode 1405. Upper portions of the ground electrode 1406 are exposed on the upper surface of the passivation film 1407. The passivation film 1407 is formed to fill the portions between the square portions of the ground electrode 1406 and have a thickness of about 5 $\mu$m above the sensor electrode 1405.

The above sense unit is connected to each sensor electrode 1405 and the ground electrode 1406 through the above interconnections 1402a and 1402b and the like. The sense units detect the capacitances formed between the ground electrodes 1406 and the respective sensor electrodes 1405 and output signals corresponding to the capacitances. The outputs from the respective sense units are processed by a processing means (not shown). This processing means converts the capacitances formed by the respective sensor electrodes 1405 into halftone image data.

These steps are the same as those in the fourth and fifth embodiments. More specifically, in the surface shape recognition sensor of the sixth embodiment as well, when the processing means generates halftone data in accordance with the respective capacitances detected at the sensor electrodes 1405, the fingerprint pattern can be reproduced.

Although not shown in FIG. 14, an integrated circuit in which a storage section storing fingerprint data for collation, a recognition processing section for comparing/collating the fingerprint data stored in the storage section with a read fingerprint image, and the like are integrated is placed in another region on the semiconductor substrate. All these components may be arranged on the semiconductor substrate at a position below the sensor electrode 1405. With this arrangement, the detected fingerprint pattern can be compared/collated with the fingerprint data stored in the storage section by the recognition processing section formed in the integrated circuit in a more compact state.

According to the surface shape recognition sensor of the sixth embodiment, when, for example, a fingerprint pattern is to be recognized, a portion of the finger touches ground electrodes. As a result, static electricity is generated on the surface of the surface shape recognition sensor. However, the static electricity flows to the ground electrodes. This suppresses damage to other integrated circuit portions formed below the ground electrodes due to the static electricity in the surface shape recognition sensor of the sixth embodiment.

In addition, according to the sixth embodiment, the exposed surface portions of the ground electrode are coated with ruthenium to suppress the formation of oxide films on the contact surfaces of the ground electrode. Furthermore, according to the sixth embodiment, since the ground electrode is formed in a matrix pattern, and the sensor electrodes are formed in the central portions of the respective square portions, the distances between the ground electrode and the respective sensor electrodes are made equal to each other.

A method of fabricating the surface shape recognition sensor according to the sixth embodiment will be partly described next.

Figure 15:
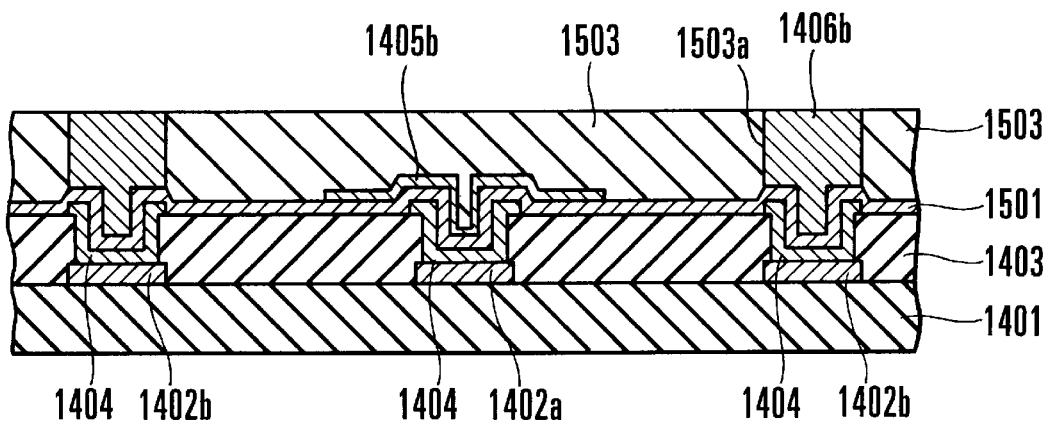
FIGS. 15-A to 15-F are sectional views showing the steps in a process of fabricating the surface shape recognition sensor according to the sixth embodiment of the present invention.
Figure 15:
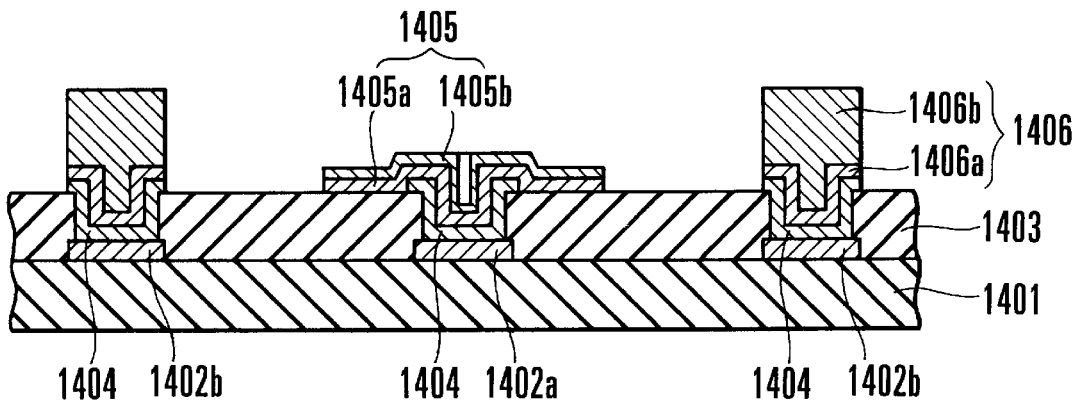
Figure 15:
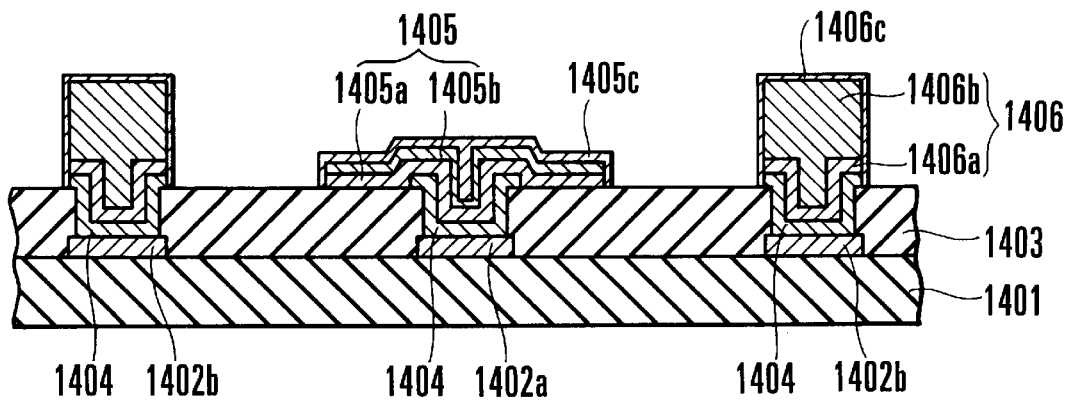

First of all, other integrated circuits such as the above sense units are formed on the semiconductor substrate. Then, as shown in FIG. 15-A, the insulating film 1401 made of silicon oxide is formed on the semiconductor substrate to cover these integrated circuits. The aluminum interconnections 1402a and 1402b are formed on the insulating film 1401. These interconnections 1402a and 1402b may be formed by forming an aluminum film and patterning it by a known photolithography technique. The interlevel dielectric film 1403 is formed on the insulating film 1401 to cover the interconnections 1402a and 1402b. Through holes 1403a and 1403b are formed in predetermined portions of the interlevel dielectric film 1403 above the interconnections 1402a and 1402b.

The barrier films 1404 made of titanium nitride are formed to cover at least the upper surfaces of the interconnections 1402a and 1402b which are exposed on the bottom portions of the through holes 1403a and 1403b. The barrier films 1404 may be formed as follows. First of all, a titanium nitride film is formed on the interlevel dielectric film 1403, in which the through holes 1403a and 1403b are formed, by sputtering or the like. A resist pattern is then formed to cover the through hole formation portions by photolithography. The titanium nitride film is selectively removed by dry etching such as RIE using this resist pattern as a mask. When the resist pattern is removed, the barrier films 1404 are formed. Note that the barrier films 1404 need not be made of titanium nitride. Another conductive material that can suppress interdiffusion may be used for the barrier films 1404.

As shown in FIG. 15-B, a thin metal film 1501 having a two-layer structure including chromium and copper layers each having a thickness of about 0.1 $\mu$m is formed on the interlevel dielectric film 1403 including the barrier films 1404. For example, this chromium film may be formed by deposition, and the copper film may be formed by sputtering. The formation of such a chromium film under the copper film can suppress diffusion of copper and improve the adhesion characteristics with respect to copper. Note that a metal that can suppress diffusion of copper and improve the adhesion characteristics, e.g., titanium or nickel, may be used instead of chromium.

As shown in FIG. 15-C, a resist pattern 1502 having an opening portion 1502a in a predetermined region above the through hole 1403a is formed on the thin metal film 1501 to have a thickness of about 5 $\mu$m. A 0.3-$\mu$m thick copper film is formed on the upper * surface of the thin metal film 1501 which is exposed on the bottom portion of the opening portion 1502a by an electroplating method using the thin metal film 1501 as a cathode, thereby forming the upper electrode 1405b. Note that the formation of the upper electrode 1405b is not limited to electroplating.

After the resist pattern 1502 is removed, a resist pattern 1503 having a groove 1503a surrounding the upper electrode 1405b is formed to have a thickness of about 5 $\mu$m, as shown in FIG. 15-D. This groove 1503a is the region in which the ground electrode 1406 shown in FIG. 14 is formed. A copper film is grown to a thickness of about 5 $\mu$m on the upper surface of the thin metal film 1501 which is exposed on the bottom portion of the groove 1503a by the electroplating method using the thin metal film 1501 as a cathode, thereby forming the electrode pillar 1406b.

After the resist pattern 1503 is removed, the exposed upper surface portions of the thin metal film 1501 are removed by etching, as shown in FIG. 15-E. In this etching, first of all, the upper copper layer may be removed by a wet etching process using an aqueous mixed acid solution made up of phosphoric acid, nitric acid, and acetic acid as an etchant. Then, the lower chromium layer may be removed by a wet etching process using an aqueous solution of potassium ferricyanide and sodium hydrooxide.

Ada As a result of the above process, the matrix-like ground electrode 1406 is formed at a height of about 5 $\mu$m above the interlevel dielectric film 1403. The sensor electrode 1405 is formed in the central portion of each square portion of the matrix-like support electrode 1406.

As shown in FIG. 15-F, the protective films 1405c and 1406c made of ruthenium are formed on the exposed surfaces of the sensor electrode 1405 and ground electrode 1406. These protective films can be formed by growing ruthenium films on only the upper surfaces of the electrodes made of copper to a thickness of about 0.1 $\mu$m by electroless plating.

As shown in FIG. 14, the passivation film 1407 is formed to fill each square portion of the matrix-like ground electrode 1406. This passivation film 1407 may be formed as follows.

First of all, the interlevel dielectric film 1403, on which the sensor electrode 1405 and the ground electrode 1406 are formed, is coated with a polyimide material by spin coating or the like to form a polyimide film. As this polyimide material, for example, a polyimide resin containing a polybenzaoxazole precursor as a base is used. With this coating, the upper surface of the polyimide film is planarized, absorbing the recesses/projections on the interlevel dielectric film 1403 due to the ground electrode 1406 and the sensor electrode 1405. After the polyimide film is formed by coating, the resultant structure is heated at about 310° C. to thermoset the polyimide film.

When the thermoset polyimide film is etched back until the surface of the ground electrode 1406 is exposed, the passivation film 1407 consisting of polyimide and having a flat surface can be formed to fill each square portion of the ground electrode 1406. This etching back step may be performing by dry etching using an oxygen gas plasma. Polyimide is an organic material and hence can be etched by using an oxygen gas plasma. Note that the etching back step may be performed by, for example, a chemical/mechanical polishing method.

With the above process, the surface shape recognition sensor of the sixth embodiment shown FIG. 14 can be formed.

According to the above description, the ground electrode 1406 is formed into a matrix pattern. However, the present invention is not limited to this. For example, a plurality of ground electrodes 1403 may be formed such that each ground electrode is placed on one side of each sensor electrode 1405 buried in a passivation film 1407, and the ground electrodes are separated from each other on the upper surface of the passivation film 1407. Note that the ground electrodes 1403 are connected to each other through a lower interconnection layer and set at the same potential.

A pair of ground electrodes whose upper surfaces are exposed need not be formed near each sensor electrode, but one ground electrode may be formed for a plurality of sensor electrodes.

If, however, the ground electrode is formed into a matrix pattern, and sensor electrodes are arranged in the central portions of the respective square portions as in the sixth embodiment, the spaces between the respective sensor electrodes arranged in the form of a matrix and the ground electrode can be made equal.

Seventh Embodiment

A surface shape recognition sensor according to the seventh embodiment of the present invention will be described next.

Figure 16:
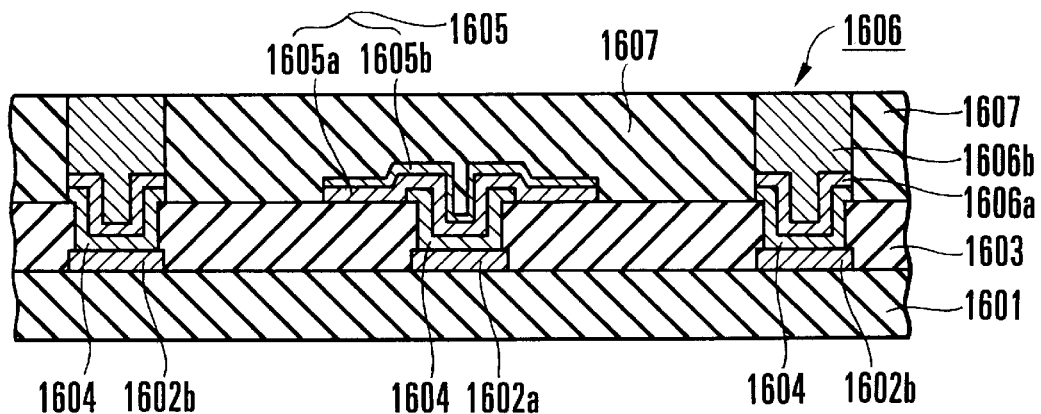
FIG. 16 is a sectional view showing the arrangement of one capacitance detection element of a surface shape recognition-sensor according to the seventh embodiment of the present invention.
Figure 17A:
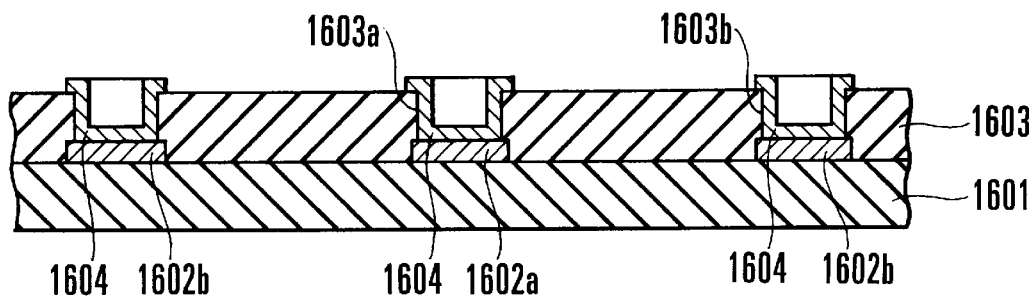
FIGS. 17-A to 17-D are sectional views showing the steps in a process of fabricating the surface shape recognition sensor according to the seventh embodiment of the present invention.
Figure 17B:
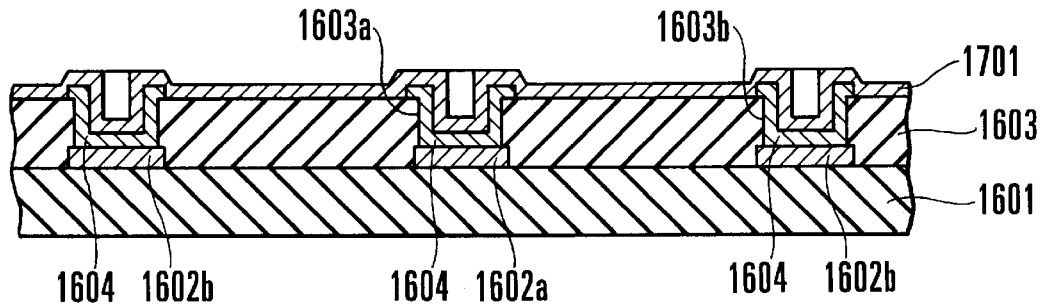
Figure 17C:
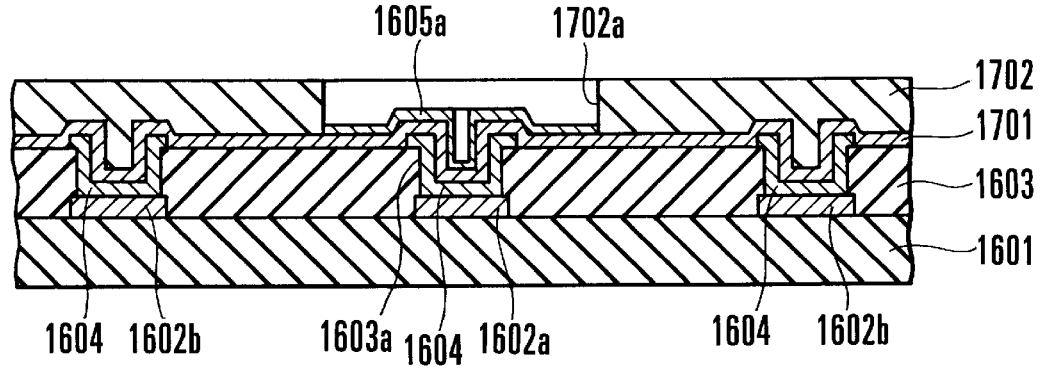
Figure 17D:
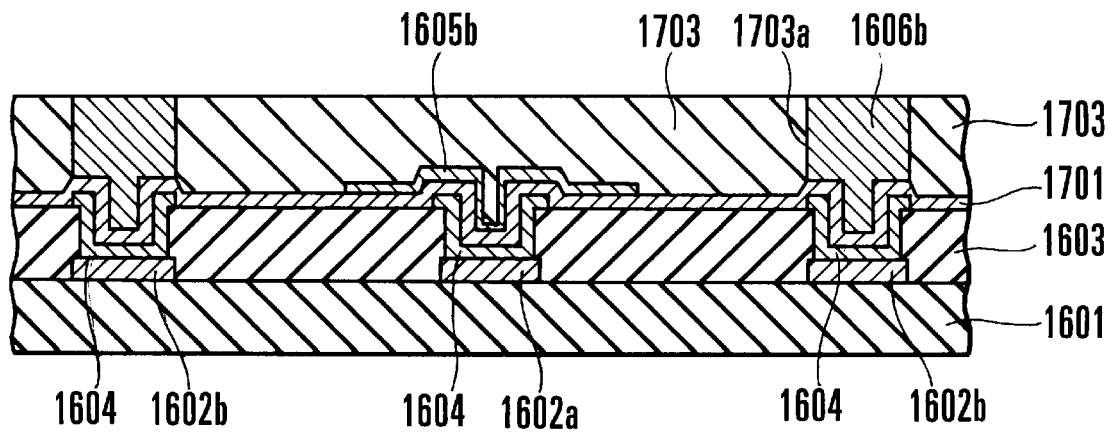

In the seventh embodiment, as shown in FIG. 16, a sensor electrode 1605 80 $\mu$m square and a ground electrode 1606 are formed on an interlevel dielectric film 1603 formed on an insulating film 1601. Although not shown in FIG. 16, the insulating film 1601 is formed on a semiconductor substrate on which integrated circuits such as sense units and a processing means (to be described later) are formed.

As in the sixth embodiment, the ground electrode 1606 is formed into a matrix pattern having square portions each 100 $\mu$m square. The sensor electrodes 1605 are arranged in the central portions of the respective square portions. The ground electrode 1606 has about 300×300 square portions, and hence 300×300 sensor electrodes 1605 are arranged in the form of a matrix.

An aluminum interconnection 1602a connected to the sensor electrode 1605 through a barrier film 1604 made of titanium nitride is formed on the insulating film 1601. The sensor electrode 1605 is made up of a lower electrode 1605a having a two-layer structure including chromium and gold layers each having a thickness of about 0.1 $\mu$m and an upper electrode 1605b consisting of gold and having a thickness of about 0.3 $\mu$m, which is formed on the lower electrode 1605a.

Similarly, an aluminum interconnection 1602b connected to the ground electrode 1606 through the barrier film 1604 made of titanium nitride is formed on the insulating film 1601. The ground electrode 1606 is made up of a lower electrode 1606a having a two-layer structure including chromium and gold layers and an electrode pillar 1606b consisting of gold and having a thickness of about 5 $\mu$m, which is formed on the lower electrode 1606a. The formation of such a chromium film as a lower layer can improve the adhesion characteristics between the gold film and the underlying interlevel dielectric film 1603. Note that a metal such as titanium or nickel that can suppress diffusion of gold and improve the adhesion characteristics with respect to an insulating material may be used instead of chromium.

In addition, a passivation film 1607 made of polyimide covers each sensor electrode 1605. The upper portions of the ground electrode 1606 are exposed on the upper surface of the passivation film 1607. The passivation film 1607 is formed to fill the portions between the square portions of the ground electrode 1606 and have a thickness of about 5 µm above each sensor electrode 1605.

As described above, in the seventh embodiment, since the sensor electrodes 1605 and the ground electrode 1606 are made of gold, no corrosion occurs. Hence, any protective films and the like need not be formed. In addition, since a polyimide material containing polybenzaoxazole is used for the passivation film 1607, good adhesion characteristics with respect to gold can be obtained. For this reason, even if gold is used for the sensor electrodes 1605 and the ground electrode 1606, peeling of the passivation film 1607 can be almost prevented.

Furthermore, the above sense units are respectively connected to the corresponding sensor electrodes 1605 and the ground electrode 1606 through the interconnections 1602a and 1602b and the like. The sense units detect the capacitances formed between the ground electrodes 1606 and the respective sensor electrodes 1605 and output signals corresponding to the capacitances. The outputs from the respective sense units are processed by a processing means (not shown). This processing means converts the capacitances formed by the respective sensor electrodes 1605 into halftone image data.

According to the surface shape recognition sensor having the above arrangement, when the tip of the finger touches the upper surface of the passivation film 1607, ridges on the skin of the finger touch the upper portions of the ground electrode 1606. Since the width of a ridge on the skin of the human finger is about 200 to 300 µm, ridges on the skin always touch the ground electrode 1606 arranged at 100-µm intervals. As a result, the potential of each ridge on the skin of the fingertip placed on the passivation film 1607 becomes the same as that of the ground electrode 1606. Capacitances are therefore formed between the respective ridges on the skin of the fingertip and the sensor electrodes 1605 and are detected by the sense units.

As described in the fourth embodiment, different capacitances are detected between the sensor electrode 1605 below the ridge on the skin and the ground electrode 1606 and between the sensor electrode 1605 below the valley on the skin and the ground electrode 1006. When the processing means generates halftone data in accordance with the respective capacitances detected at the sensor electrodes 1605, the fingerprint pattern can be reproduced.

Although not shown in FIG. 16, an integrated circuit in which a storage section storing fingerprint data for collation, a recognition processing section for comparing/collating the fingerprint data stored in the storage section with a read fingerprint image, and the like are integrated is placed in another region on the semiconductor substrate. All these components may be arranged on the semiconductor substrate at a position below the sensor electrode 1605. With this arrangement, the detected fingerprint pattern can be compared/collated with the fingerprint data stored in the storage section by the recognition processing section formed in the integrated circuit in a more compact state.

According to the surface shape recognition sensor of the seventh embodiment as well, when, for example, a fingerprint pattern is to be recognized, a portion of the finger touches the ground electrode. As a result, static electricity is generated on the surface of the surface shape recognition sensor. However, the static electricity flows to the ground electrode. This suppresses damage to other integrated circuit portions formed below the ground electrode due to the static electricity in the surface shape recognition sensor of the seventh embodiment.

In addition, according to the seventh embodiment, the ground electrode is made of gold, no oxide film is formed on the contact surfaces of the ground electrode. In addition, according to the seventh embodiment, since the ground electrode is formed in a matrix pattern, and the sensor electrodes are formed in the central portions of the respective square portions, the distances between the ground electrode and the respective sensor electrodes are made equal to each other. In the seventh embodiment as well, the side and upper surfaces of the sensor electrodes and ground electrode may be coated with protective films made of, e.g., ruthenium. As in this case, when these portions are covered with protective films, the adhesion characteristics with respect to the passivation film can be improved sometimes.

A method of fabricating the surface shape recognition sensor according to the seventh embodiment will be partly described next.

First of all, other integrated circuits such as the above sense units are formed on the semiconductor substrate. Then, as shown in FIG. 17-A, the insulating film 1601 made of silicon oxide is formed on the semiconductor substrate to cover the integrated circuits. The aluminum interconnections 1602a and 1602b are formed on the insulating film 1601. These interconnections 1602a and 1602b may be formed by forming an aluminum film and patterning it by a known photolithography technique.

The interlevel dielectric film 1603 is formed on the insulating film 1601 to cover the interconnections 1602a and 1602b. Through holes 1603a and 1603b are formed in predetermined portions of the interlevel dielectric film 1603 which are located above the interconnections 1602a and 1602b.

As in the first to third embodiments described above, the barrier films 1604 made of titanium nitride are formed to cover at least the surfaces of the interconnections 1602a and 1602b which are exposed on the bottom portions of the through holes 1603a and 1603b.

As shown in FIG. 17-B, a thin metal film 1701 made of chromium and gold is formed on the interlevel dielectric film 1603 including the barrier film 1604 to have a thickness of about 0.2 µm. For example, this film may be formed by deposition. The formation of the chromium film under the gold film can suppress diffusion of gold and improve the adhesion characteristics of gold with respect to the interlevel dielectric film 1603. Note that a metal such as titanium or nickel that can suppress diffusion of gold and improve the adhesion characteristics with respect to an insulating material may be used instead of chromium.

As shown in FIG. 17-C, a resist pattern 1702 having an opening portion 1702a in a predetermined region above the through hole 1603a is formed on the thin metal film 1701 to have a thickness of about 5 µm. A 0.3-µm thick gold film is formed on the upper surface of the thin metal film 1701 which is exposed on the bottom portion of the opening portion 1702a by an electroplating method using the thin metal film 1701 as a cathode, thereby forming the upper electrode 1605b.

After the resist pattern 1702 is removed, a resist pattern 1703 having a groove 1703a surrounding the upper electrode 1605b is formed to have a thickness of about 5 µm, as shown in FIG. 17-D. This groove 1703a is the region in which the ground electrode 1606 shown in FIG. 16 is formed. A gold film is grown to a thickness of about 5 µm on the upper surface of the thin metal film 1701 which is exposed on the bottom portion of the groove 1703a by the electroplating method using the thin metal film 1701 as a cathode, thereby forming the electrode pillar 1606b.

After the resist pattern 1703 is removed, the exposed surface portions of the thin metal film 1701 are removed by etching. In this etching, first of all, the upper gold layer may be removed by a wet etching process using a solution mixture of iodine, ammonium iodide, ethanol as an etchant. In this case, the etching rate is about 0.05 μm. Then, the lower chromium layer may be removed by a wet etching process using an aqueous solution of potassium ferricyanide and sodium hydrooxide.

As a result of the above process, the ground electrode 1606 is formed in a matrix pattern at a height of about 5 μm above the interlevel dielectric film 1603. The sensor electrode 1605 is formed in the central portion of each square portion of the matrix-like ground electrode 1606.

As in the sixth embodiment described above, when the passivation film 1607 is formed to fill the square portions of the matrix-like ground electrode 1606, the surface shape recognition sensor of the seventh embodiment shown in FIG. 16 is formed.

In the seventh embodiment as well, the ground electrode 1606 need not be formed into a matrix pattern. For example, a plurality of ground electrodes 1603 may be formed such that each ground electrode is placed on one side of each sensor electrode 1605 buried in the passivation film 1607, and the ground electrodes are separated from each other on the upper surface of the passivation film 1607.

As described above, when the ground electrode is formed into a matrix pattern, and the sensor electrodes are arranged in the central portions of the respective square portions, the ground electrode and the sensor electrodes are located near each other. As a result, parasitic capacitances are generated between them. If these parasitic capacitances are excessively large, it becomes difficult to detect the capacitances between the sensor electrodes and the skin of the finger in contact with the upper surface of the passivation film.

In consideration of detection of a human fingerprint, a resolution of 250 to 500 dpi is required for a surface shape recognition sensor. To satisfy this requirement, the size of each of the sensor elements arranged in the form of matrix, i.e., the pitch of the sensor elements, needs to be, for example, 100 μm square.

Figure 18:
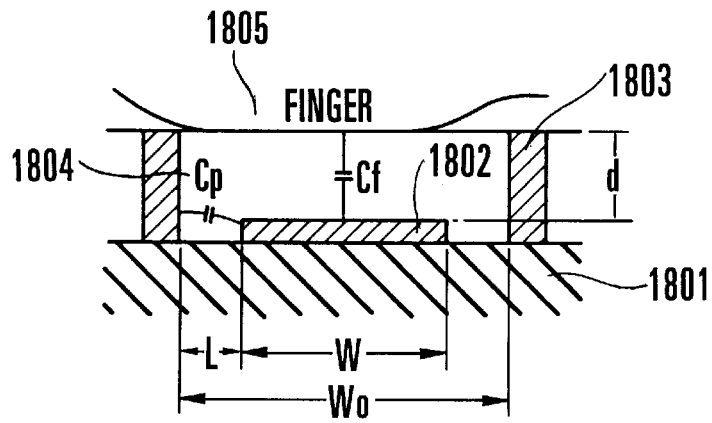
FIG. 18 is a sectional view schematically showing the arrangement of one capacitance detection element of the surface shape recognition sensor according to the seventh embodiment of the present invention.

Consider a sectional view of a sensor element, as shown in FIG. 18. A square sensor electrode 1802 and ground electrodes 1803 in a matrix form are arranged on an interlevel dielectric film 1801, and a passivation film 1804 having a relative dielectric constant of 4 is formed to fill the space between the ground electrodes 1803. When a fingerprint is to be detected, a finger 1805 touches the upper surface of the passivation film 1804. Note that the finger 1805 is touching the ground electrode 1803 in a region (not shown).

In this case, a capacitance is formed between the finger 1805, the ground electrode 1803, and the sensor electrode 1802. Since a parasitic capacitance Cp is formed between the sensor electrode 1802 and the ground electrode 1803, a capacitance Cf associated with surface shape detection can be obtained by subtracting the parasitic capacitance Cp from the capacitance generated when the ground electrode 1803 touches the ground electrode 1803.

Figure 19:
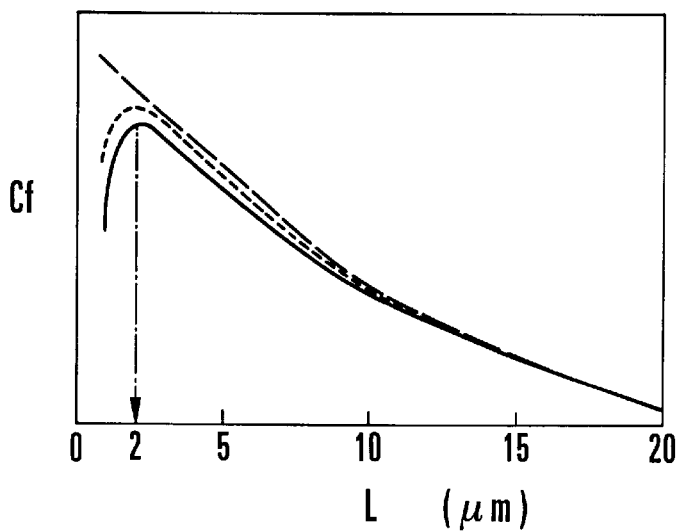
FIG. 19 is a graph showing the result obtained by simulating the relationship between a capacitance Cf and a distance L between a sensor electrode and a ground electrode in the surface shape recognition sensor shown in FIG. 18.

The relationship between the capacitance Cf and a distance L between the sensor electrode 1802 and the ground electrode 1803 can be simulated as shown in FIG. 19, provided that the size of one sensor element is 80 μm square, and the space between the ground electrodes 1803 is almost zero, i.e., Wo=80 μm. In this case, the thickness of the passivation film 1804 on the sensor electrode 1802 is 2 μm, and the relative dielectric constant is 2. Referring to FIG. 19, the dashed line indicates a case wherein the parasitic capacitance Cp is generated only between a side surface of the sensor electrode 1802 and the ground electrode 1803. In practice, however, the parasitic capacitances Cp are generated between a side surface and upper surface of the sensor electrode 1802 and the ground electrode 1803. The dotted and solid lines indicate the results obtained in consideration of this. The result indicated by the solid line is obtained with greater consideration given to the effect on the upper surface.

Referring to FIG. 19, since the maximum region in which the sensor electrode 1802 can be formed is smaller than a region 80 μm square, the area of the sensor electrode 1802 and the capacitance Cf decrease as the distance L increases. In contrast to this, as the size of the sensor electrode 1802 increases, i.e., the distance L decreases, the capacitance Cf that can be detected increases.

Assuming that the parasitic capacitance Cp is formed on only a side surface, the capacitance Cf that can be detected increases as the distance L decreases to the minimum value. In practice, however, since a parasitic capacitance is also formed between the upper surface of the sensor electrode 1802 and the ground electrode 1803, the parasitic capacitance Cp increases with an increase in the area of the sensor electrode 1802. As a result, the capacitance Cf that can be detected decreases, as indicated by the dotted and solid lines. As is apparent from FIG. 19, when the distance L between the sensor electrode 1802 and the ground electrode 1803 is 2 μm, the capacitance Cf that can be detected becomes the maximum value. As described above, when a ground electrode is formed into a matrix pattern, and sensor electrodes are arranged in the respective square portions, the best result can be obtained by setting the distance between each sensor electrode and the ground electrode to about 2 μm, as in the case with the sixth and seventh embodiments.

As described above, as the distance L increases, the area of the sensor electrode 1802 decreases, and hence the capacitance Cf that can be detected decreases. If the distance L excessively increases, the capacitance Cf becomes too small to be detected by the sense unit. Therefore, the distance L is defined by the sensitivity limit of the sense unit.

In consideration of fingerprint detection, the upper limit of the size of one sensor element, i.e., the upper limit of Wo in FIG. 18, is about 100 μm.

Figure 20:
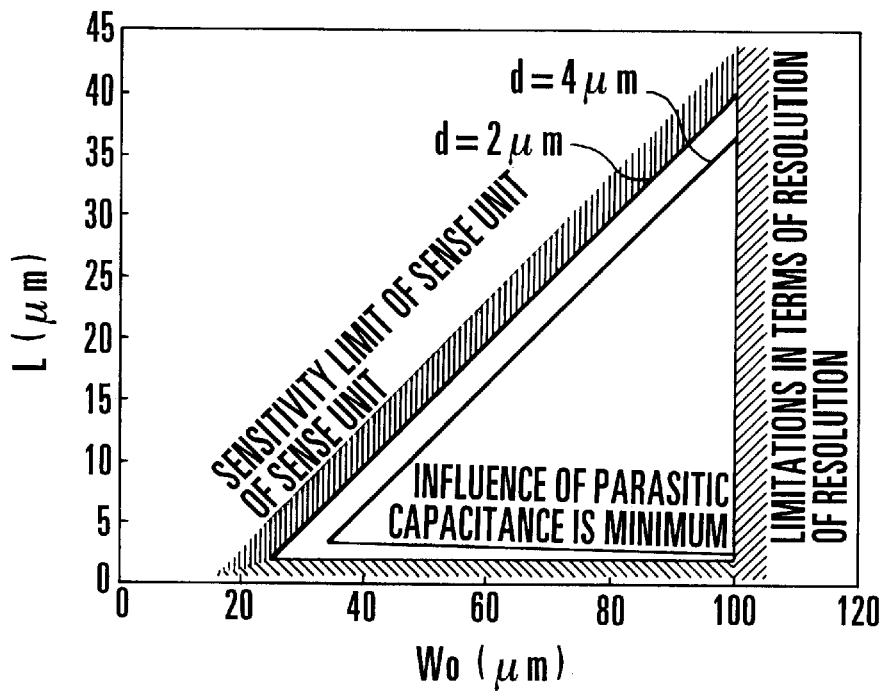
FIG. 20 is a graph showing the correlation between L and Wo in the surface shape recognition sensor in FIG. 18.

FIG. 20 shows the relationship L and Wo in consideration of the above situations. Referring to FIG. 20, a thickness d of the passivation film 1804 on the sensor electrode 1802 is set to 2 μm and 4 μm. As shown in FIG. 20, when Wo is set to 100 μm or less owing to limitations in terms of resolution, the influence of the parasitic capacitance Cp is reduced to a minimum when the distance L is near 2 μm, as shown in FIG. 19 as well, kept almost constant even with changes in Wo, and uniquely determined in accordance with the thickness d. If the distance L excessively decreases, the capacitance Cf that can be detected abruptly decreases, as shown in FIG. 19. It is therefore preferable that the distance L be set not to be excessively small as compared with 2 μm. If the distance L excessively increases from 2 μm, since the area of the sensor electrode 1802 decreases, the capacitance Cf that can be detected also decreases. As described above, if the distance L excessively increases, the capacitance Cf cannot be detected by the sense unit. In general, the capacitance that can be detected is about several fF. That is, when the passivation film 1804 has a relative dielectric constant of about 4 and a thickness of about 2 μm, the capacitance Cf cannot be detected unless the area of the sensor electrode 1802 is 400 $\mu m^2$ or more. In general, therefore, one side W of the square sensor electrode 1802 needs to be 20 $\mu$m or more. In this case, since Wo=W+2L and L=(Wo−W)/2, L≦(Wo/2)−10, as shown in FIG. 20.

Figure 21:
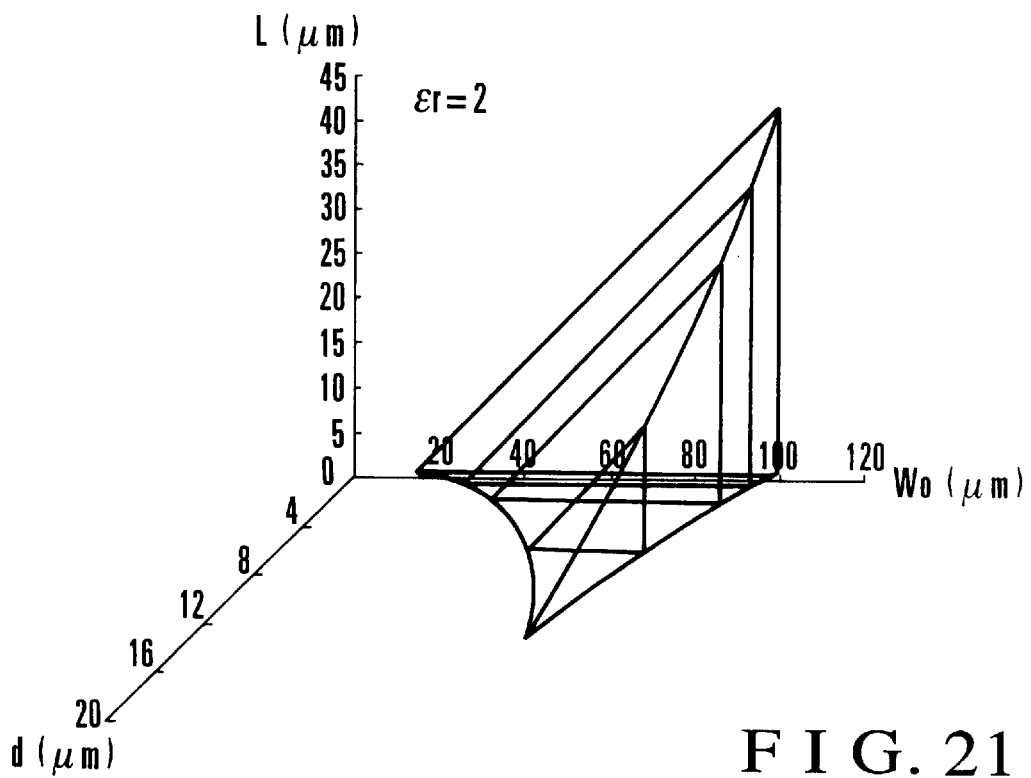
FIG. 21 is a graph showing the correlation between L, Wo, and d in the surface shape recognition sensor in FIG. 18 when the relative dielectric constant of a passivation film is set to 2.
Figure 24:
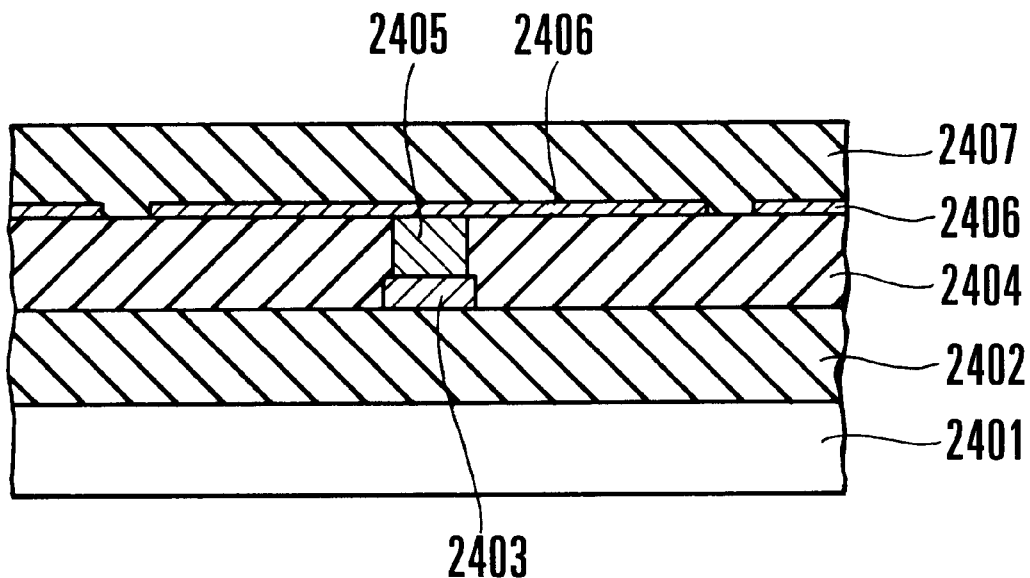
FIG. 24 is a sectional view schematically showing the arrangement of one capacitance detection element of a conventional surface shape recognition sensor.
Figure 25:
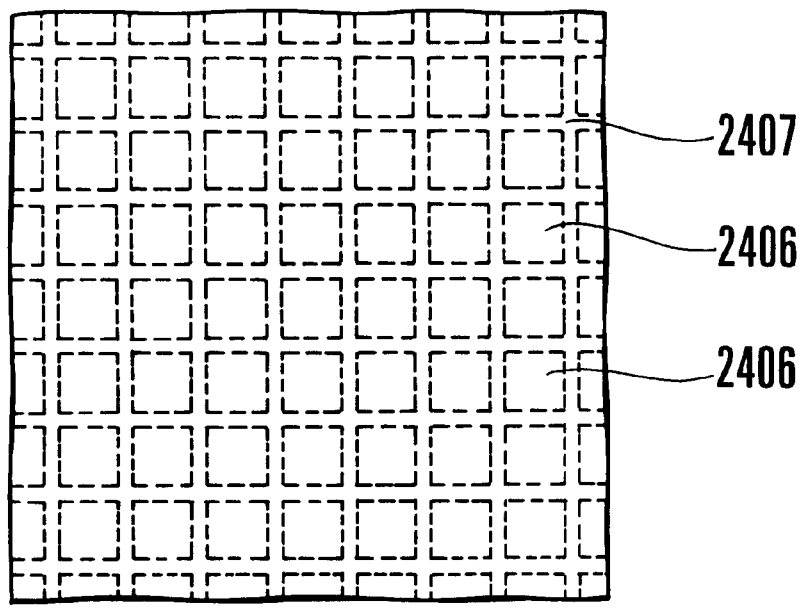
FIG. 25 is a plan view schematically showing the arrangement of the conventional surface shape recognition sensor.

Note that as the passivation film 1804 increases in relative dielectric constant and decreases in thickness, the triangular area shown in FIG. 20 can extend upward and changes as shown in FIGS. 21, 22, and 23.

As described above, according to the present invention, there is provided a surface shape recognition sensor comprising a plurality of capacitance detection elements having sensor electrodes stationarily arranged in one plane on an interlevel dielectric film formed on a semiconductor substrate to be insulated/isolated from each other, capacitance detection means for detecting capacitances of the respective capacitance detection elements, and a stationary electrode formed on the interlevel dielectric film to be insulated/isolated from the sensor electrodes.

With this arrangement, when an object to be recognized touches the sensor, the capacitances detected by the capacitance detection elements change in accordance with the recesses/projections on the surface of the object. The addition of the stationary electrode suppresses damage to elements mounted together with the sensor due to static electricity generated in sensing operation. According to the present invention, stable, high-sensitivity surface shape detection allows recognition of a surface shape with high reliability.

According to another aspect of the present invention, in the above arrangement, the sensor further comprises a counter electrode supported on the stationary electrode, disposed opposite the sensor electrodes to be disposed above the sensor electrodes at a predetermined distance therefrom, and having portions, located above the sensor electrodes, which can deform toward the sensor electrodes, and the capacitance detection means detect capacitances between the sensor electrodes and the counter electrode.

When, therefore, an object to be recognized touches the sensor, the counter electrode deforms in conformity to the recesses/projections on the surface of the object, and the capacitances between the sensor electrodes and the counter electrode change in accordance with the recesses/projections on the surface of the object. Since the object is not used as one electrode, damage to elements mounted together with the sensor due to static electricity generated in sensing operation is suppressed. As a result, according to the present invention, stable, high-sensitivity surface shape detection allows recognition of a surface shape with high reliability.

According to the surface shape recognition sensor of the present invention, the sensor further comprises a passivation film made of an insulating member and formed on the interlevel dielectric film to cover the sensor electrodes, the stationary electrode is formed on the interlevel dielectric film to be partly exposed on an upper surface of the passivation film so as to come into contact with a surface of a surface shape recognition target object which is partly in contact with the upper surface of the passivation film and serves as one counter electrode, and the capacitance detection means detect capacitances between the sensor electrodes and the surface of the recognition target object.

With this arrangement, when an object to be recognized touches the sensor, the object serves as one counter electrode. While the object is in contact with the stationary electrode, capacitances are formed between the surface of the object and the sensor electrodes. These capacitances are detected by the capacitance detection means. Even if, therefore, static electricity is generated when the object touches the sensor, the electricity flows to the stationary electrode to suppress damage to elements mounted together with the sensor due to the static electricity. As a result, according to the present invention, stable, high-sensitivity surface shape detection allows recognition of a surface shape with high reliability.

According to the surface shape recognition sensor of the present invention, in this arrangement, the stationary electrode has exposed portions formed into a matrix pattern on at least the upper surface of the passivation film, and the sensor electrodes are arranged in central portions of square portions formed by the stationary electrode. Therefore, all the distances between the sensor electrodes and the stationary electrode are made uniform. If the stationary electrode is formed into a square matrix pattern, each square portion forms the capacitance detection element, and the passivation film has a thickness of 0.3 $\mu$m or more to 20 $\mu$m or less on the sensor electrode, the capacitances between the sensor electrodes and a surface shape recognition target object that touches the passivation film can be detected. When the state of a human fingerprint is to be detected, the intervals between the square portions of the matrix pattern of the stationary electrode are set to 100 $\mu$m or less. With this arrangement, for example, the relative dielectric constant of the passivation film may fall within the range of 2 to 7. When, for example, a material having a relative dielectric constant of 4 is used for a passivation film, and its thickness above each sensor electrode is set to 2 $\mu$m, each sensor electrode may have a square shape with one side having a length of 20 $\mu$m or more. It is especially preferable that the distance between each sensor electrode and the stationary electrode disposed therearound be 2 $\mu$m.

There is provided a method of fabricating a surface shape recognition sensor, comprising the steps of forming a plurality of capacitance detection elements on a semiconductor substrate on which at least a semiconductor element is formed, and forming protective films on the plurality of capacitance detection elements, wherein each of the capacitance detection elements includes a sensor electrode disposed on the semiconductor substrate and a counter electrode disposed above the sensor electrode, the counter electrode of each of the capacitance detection elements is made of one common electrode member, and the counter electrode is supported by a stationary electrode disposed for each of the capacitance detection elements, the stationary electrode being made of a conductive member. As described above, according to the present invention, a surface shape recognition sensor can be easily fabricated.

The method of fabricating the surface shape recognition sensor according to the present invention further comprises the steps of forming first and second interconnections through an interlevel dielectric film on the semiconductor substrate, forming connection electrodes on the first and second interconnections, forming a first metal film on a surface on which the connection electrodes are formed and then covering the first metal film with a first resist, forming a sensor electrode by forming an opening portion in the first resist on the first interconnection and continuously forming second and third metal films, forming a stationary electrode having conductivity by forming a second resist after removing the first resist, forming an opening portion in the second resist on the second interconnection, and sequentially forming fourth and fifth metal films in only the opening portion, etching the first metal film by using the third and fifth metal films as masks after removing the second resist, covering a major surface side of the semiconductor substrate with a sacrificial film having a thickness equal to or larger than the stationary electrode, exposing only the fifth metal films by etching the sacrificial film, forming a counter electrode on the sacrificial film to connect the fifth metal films to each other, and covering the counter electrode with a protective film after removing the sacrificial film. As described above, a surface shape recognition sensor can be easily fabricated.

The method of fabricating the surface shape recognition sensor according to the present invention further comprises the steps of forming first and second interconnections through an interlevel dielectric film on the semiconductor substrate, forming connection electrodes on the first and second interconnections, forming a first metal film on a surface on which the connection electrodes are formed and then covering the first metal film with a first resist, forming a sensor electrode by forming an opening portion in the first resist on the first interconnection and continuously forming second and third metal films, covering only a portion above the second interconnection with a second resist after removing the first resist, etching the first metal film by using the third metal film and the second resist as masks, removing the second resist, forming a sacrificial film, and forming an opening portion in a portion above the second interconnection, forming a stationary electrode having conductivity by sequentially forming fourth and fifth metal films, forming a counter electrode on the sacrificial film to connect the fifth films to each other, and covering the counter electrode with a protective film after removing the sacrificial film. As described above, a surface shape recognition sensor can be easily fabricated.

The method of fabricating the surface shape recognition sensor according to the present invention further comprises the steps of forming first and second interconnections through an interlevel dielectric film on the semiconductor substrate, forming connection electrodes on the first and second interconnections, forming a first metal film on a surface on which the connection electrodes are formed and then covering an entire surface of the first metal film with a first resist, forming a sensor electrode by forming an opening portion in the first resist on the first interconnection and continuously forming second and third metal films, forming a stationary electrode having conductivity by forming a second resist after removing the first resist, forming an opening portion in the second resist at a position above the second interconnection, and sequentially forming fourth and fifth metal films in only the opening portion, removing the second resist and etching the first metal film by using the third and fifth metal films as masks, and bonding a counter electrode, formed in advance under a protective film, on the stationary electrode through a conductive adhesive. As described above, a surface shape recognition sensor can be easily fabricated.

A method of fabricating a surface shape recognition sensor according to the present invention comprises the steps of forming first and second interconnections on a semiconductor substrate, forming an interlevel dielectric film on the semiconductor substrate to cover the first and second interconnections, forming a first metal film electrically connected to the first and second interconnections through first and second through holes formed in the interlevel dielectric film, forming a first mask pattern on the first metal film, the first mask pattern having an opening portion in a region above the first through hole, selectively forming a second metal film on an upper surface of the first metal film which is exposed on a bottom portion of the opening portion of the first mask pattern, forming a second mask pattern on the first and second metal films, the second mask pattern having a groove crossing over the second through hole and surrounding the second metal film, selectively forming a third metal film on an upper surface of the first metal film which is exposed on a bottom portion of the groove of the second mask pattern, the third metal film being thicker than the second metal film, forming a sensor electrode and a stationary electrode by removing the first metal film except for portions under the second and third metal films, the sensor electrode being made up of the first and second metal films and connected to the first interconnection through the first through hole, and the stationary electrode being made up of the first and third metal films and connected to the second interconnection through the second through hole, forming a sacrificial film on the interlevel dielectric film to cover the sensor electrodes and expose upper portions of the stationary electrode, forming a counter electrode on the sacrificial film and the stationary electrode, and selectively removing only the sacrificial film after forming the counter electrode, wherein the first and second interconnections are formed to be connected to capacitance detection means for detecting capacitances formed between the sensor electrodes and the counter electrode.

Therefore, the sensor electrodes are connected to the capacitance detection means through the first interconnections, and the counter electrode is connected to the capacitance detection means through the stationary electrode and the second interconnections. In this fabricating process, the first, second, and third metal films may be made of copper. Alternatively, the first, second, and third metal films may be made of gold. In addition, after the sensor electrodes and the stationary electrode are formed, protective films having conductivity may be formed to cover the side and upper surfaces of the sensor electrodes and stationary electrode. The protective films may be made of ruthenium or gold. Moreover, an insulating film having projections at positions above the sensor electrodes may be formed on the counter electrode. As described above, according to the present invention, a surface shape recognition sensor can be easily fabricated.

A method of fabricating a surface shape recognition sensor according to the present invention comprises the steps of forming first and second interconnections on a semiconductor substrate, forming an interlevel dielectric film on the semiconductor substrate to cover the first and second interconnections, forming a first metal film electrically connected to the first and second interconnections through first and second through holes formed in the interlevel dielectric film, forming a first mask pattern on the first metal film, the first mask pattern having an opening portion above the first through hole, selectively forming a second metal film on an upper surface of the first metal film which is exposed on a bottom portion of the opening portion of the first mask pattern, forming a second mask pattern on the first and second metal films, the second mask pattern having a groove crossing over the second through hole and surrounding the second metal film, selectively forming a third metal film on an upper surface of the first metal film which is exposed on a bottom portion of the groove of the second mask pattern, the third metal film being thicker than the second metal film, forming a sensor electrode and a stationary electrode by removing the first metal film except for portions under the second and third metal films, the sensor electrode being made up of the first and second metal films and connected to the first interconnection via the first through hole, and the stationary electrode made up of the first and third metal films and connected to the second interconnection via the second through hole, and forming a passivation film on the interlevel dielectric film to cover the sensor electrode and expose an upper portion of the stationary electrode, wherein the first and second interconnections are connected to capacitance detection means for detecting a capacitance formed between the sensor electrode and the stationary electrode.

Therefore, the sensor electrodes are connected to the capacitance detection means through the first interconnections, and the stationary electrode is connected to the capacitance detection means through the second interconnections.

In this fabricating process, the first, second, and third metal films may be made of copper. Alternatively, the first, second, and third metal films may be made of gold. In addition, after the sensor electrodes and the stationary electrode are formed, protective films having conductivity may be formed to cover the side and upper surfaces of the sensor electrodes and stationary electrode. The protective films may be made of ruthenium. The passivation film may be made of polyimide. As this polyimide, polybenzaoxazole may be used. As described above, according to the present invention, a surface shape recognition sensor can be easily fabricated.

What is claimed is:

1. A surface shape recognition sensor comprising:
   a plurality of capacitance detection elements having sensor electrodes stationarily arranged in one plane on an interlevel dielectric film formed on a semiconductor substrate to be insulated/isolated from each other;
   capacitance detection means for detecting capacitances of said respective capacitance detection elements; and
   a stationary electrode formed on said interlevel dielectric film to be insulated/isolated from said sensor electrodes.

2. A sensor according to claim 1, wherein said sensor further comprises a counter electrode supported on said stationary electrode, disposed opposite said sensor electrodes to be disposed above said sensor electrodes at a predetermined distance therefrom, and having portions, located above said sensor electrodes, which can deform toward said sensor electrodes, and
   said capacitance detection means detect capacitances between said sensor electrodes and said counter electrode.

3. A sensor according to claim 2, wherein said sensor further comprises a film disposed on said counter electrode and having insulating properties, and
   said film has projections at positions above said respective sensor electrodes.

4. A sensor according to claim 3, wherein said film is made of a material having thermoplasticity.

5. A sensor according to claim 4, wherein said film is made of polytetrafluoroethylene.

6. A sensor according to claim 3, wherein said counter electrode is processed into a mesh pattern.

7. A sensor according to claim 2, wherein said sensor electrodes and said stationary electrode are made of copper.

8. A sensor according to claim 2, wherein said sensor electrodes and said stationary eTectrode are made of gold.

9. A sensor according to claim 1, wherein said sensor further comprises a passivation made of an insulating member and formed on said interlevel dielectric film to cover said sensor electrodes,
   said stationary electrode is formed on said interlevel dielectric film to be partly exposed on an upper surface of said passivation film so as to come into contact with a surface of a surface shape recognition target object which is partly in contact with the upper surface of said passivation film and serves as a counter electrode, and
   said capacitance detection means detect capacitances between said sensor electrodes and the surface of the recognition target object.

10. A sensor according to claim 9, wherein said sensor electrodes and said stationary electrode are made of copper.

11. A sensor according to claim 9, wherein said sensor electrodes and said stationary electrode are made of gold.

12. A sensor according to claim 9, wherein said passivation film is made of polyimide.

13. A sensor according to claim 9, wherein said polyimide is polybenzaoxazole.

14. A sensor according to claim 2, further comprising protective films having conductivity and formed to cover side and upper surfaces of said sensor electrodes and side and upper surfaces of said stationary electrode.

15. A sensor according to claim 9, further comprising protective films having conductivity and formed to cover side and upper surfaces of said sensor electrodes and side and upper surfaces of said stationary electrode.

16. A sensor according to claim 15, wherein said protective films are made of a conductive material which is more resistant to oxidation than a material used for said sensor electrodes and said stationary electrode.

17. A sensor according to claim 16, wherein said protective films are made of ruthenium.

18. A sensor according to claim 17, wherein said protective films are made of gold.

19. A sensor according to claim 9, wherein said stationary electrode has exposed portions formed into a matrix pattern on at least the upper surface of said passivation film, and
   said sensor electrodes are arranged in central portions of square portions formed by said stationary electrode.

20. A sensor according to claim 19, wherein said stationary electrode is formed into a square matrix pattern, each square portion forms said capacitance detection element, and
   said passivation film has a thickness of not less than 0.3 $\mu$m to not more than 20 $\mu$m on said sensor electrode.

21. A sensor according to claim 20, wherein intervals between the square portions of the matrix pattern of said stationary electrode are not more than 100 $\mu$m.

22. A sensor according to claim 20, wherein said passivation film has a relative dielectric constant of more than 2 to less than 7.

23. A sensor according to claim 21, wherein said passivation film has a relative dielectric constant of more than 2 to less than 7.

24. A sensor according to claim 23, wherein said passivation film has a relative dielectric constant of 4 and a thickness of 2 $\mu$m on said sensor electrode, and said sensor electrode is formed into a square with one side having a length of not less than 20 $\mu$m.

25. A sensor according to claim 24, wherein a distance between said sensor electrode and said stationary electrode disposed around said sensor electrode is 2 $\mu$m.

26. A sensor according to claim 9, wherein the upper surface of said passivation film and exposed surfaces of said stationary electrode are substantially flat.

27. A sensor according to claim 1, wherein said sensor further comprises first and second interconnections formed under said interlevel dielectric film on said semiconductor substrate to connect said sensor electrodes to said stationary electrode, and
   said sensor electrodes and said stationary electrode are connected to said capacitance detection means through said first and second interconnections.

28. A sensor according to claim 1, wherein said capacitance detection means are mounted on said semiconductor substrate together with said sensor.

* * * * *

UNITED STATES PATENT AND TRADEMARK OFFICE
CERTIFICATE OF CORRECTION

PATENT NO. : 6,060,756
DATED : May 9, 2000
INVENTOR(S) : Machida, et. al.

It is certified that error appears in the above-indentified patent and that said Letters Patent is hereby corrected as shown below:

Title page, item
[75], line 1, delete "Katsuyuki Machida; Satoshi Shigematsu; Hiroki Morimura, all of Tokyo; Akihiko Hirata, Toko, all of Japan" and insert "Katsuyuki Machida; Satoshi Shigematsu; Hiroki Morimura; Akihiko Hirata, all of Tokyo, Japan".

In column 8, line 45, delete "recognition-sensor" and insert -- recognition sensor --.

In column 16, line 13, delete "The c capacitances" and insert -- The capacitances --.

In column 31, line 7, delete "the upper * surface" and insert -- the upper surface --.

In column 31, line 33, delete "Ada As a result" and insert -- As a result --.

UNITED STATES PATENT AND TRADEMARK OFFICE
CERTIFICATE OF CORRECTION

PATENT NO. : 6,060,756
DATED : May 9, 2000
INVENTOR(S) : Machida, et. al.

It is certified that error appears in the above-indentified patent and that said Letters Patent is hereby corrected as shown below:

In column 41, line 60, delete "stationary eTectrode are" and insert -- stationary electrode are --.

In column 41, line 62, delete "passivation made of" and insert -- passivation film made of --.

Signed and Sealed this

Tenth Day of April, 2001

Attest:

NICHOLAS P. GODICI

Attesting Officer   Acting Director of the United States Patent and Trademark Office